United States Patent
Cannan et al.

(10) Patent No.: US 10,301,536 B2
(45) Date of Patent: May 28, 2019

(54) ELECTRICALLY-CONDUCTIVE PROPPANT AND METHODS FOR MAKING AND USING SAME

(71) Applicant: CARBO Ceramics Inc., Houston, TX (US)

(72) Inventors: Chad Cannan, Cypress, TX (US); Todd Roper, Katy, TX (US); Steve Savoy, Austin, TX (US); Daniel R. Mitchell, Austin, TX (US); Chris DiBiase, Fulshear, TX (US)

(73) Assignee: CARBO CERAMICS INC., Houston, TX (US)

( * ) Notice: Subject to any disclaimer, the term of this patent is extended or adjusted under 35 U.S.C. 154(b) by 453 days.

(21) Appl. No.: 14/826,965

(22) Filed: Aug. 14, 2015

(65) Prior Publication Data
US 2016/0168452 A1    Jun. 16, 2016

Related U.S. Application Data

(63) Continuation-in-part of application No. 14/572,486, filed on Dec. 16, 2014, now Pat. No. 9,434,875.

(51) Int. Cl.
*C09K 8/80* (2006.01)
*C23C 18/40* (2006.01)
(Continued)

(52) U.S. Cl.
CPC .......... *C09K 8/805* (2013.01); *C23C 18/1639* (2013.01); *C23C 18/1889* (2013.01);
(Continued)

(58) Field of Classification Search
CPC ...................................................... C09K 8/805
(Continued)

(56) References Cited

U.S. PATENT DOCUMENTS 3,120,495 A * 2/1964 Innes ...................... B01J 21/04
502/9
4,078,610 A * 3/1978 Arnold .................... E21B 43/24
166/280.1
(Continued)

OTHER PUBLICATIONS

International Search Report and Written Opinion for International Application No. PCT/US2015/065354 dated Jun. 30, 2016.

*Primary Examiner* — Tabatha L Penny
(74) *Attorney, Agent, or Firm* — Patterson + Sheridan, LLP

(57) ABSTRACT

Methods for manufacturing electrically-conductive proppant particles are disclosed. The methods can include preparing a slurry containing water, a binder, and a raw material having an alumina content, atomizing the slurry into droplets, and coating seeds containing alumina with the droplets to form a plurality of green pellets. The green pellets can be contacted with an activation solution containing at least one catalytically active material to provide activated green pellets including the at least one catalytically active material. The method can include sintering the activated green pellets to provide a plurality of proppant particles. The plurality of proppant particles can be contacted with a plating solution containing one or more electrically-conductive material to provide electrically-conductive proppant particles.

19 Claims, 22 Drawing Sheets

(51) Int. Cl.
    *C23C 18/34*     (2006.01)
    *C23C 18/18*     (2006.01)
    *C23C 18/16*     (2006.01)

(52) U.S. Cl.
    CPC .............. *C23C 18/34* (2013.01); *C23C 18/40* (2013.01); *C23C 18/1619* (2013.01)

(58) Field of Classification Search
    USPC ........................................................ 427/212
    See application file for complete search history.

(56) References Cited

U.S. PATENT DOCUMENTS

| | | | |
|---|---|---|---|
| 7,387,752 B2* | 6/2008 | Canova | B01D 1/18 264/12 |
| 2003/0196805 A1 | 10/2003 | Boney et al. | |
| 2010/0252263 A1* | 10/2010 | Ferrero | C04B 33/138 166/280.2 |
| 2012/0279703 A1 | 11/2012 | McDaniel et al. | |
| 2014/0190686 A1 | 7/2014 | Cannan et al. | |
| 2014/0338906 A1 | 11/2014 | Monastiriotis et al. | |

\* cited by examiner

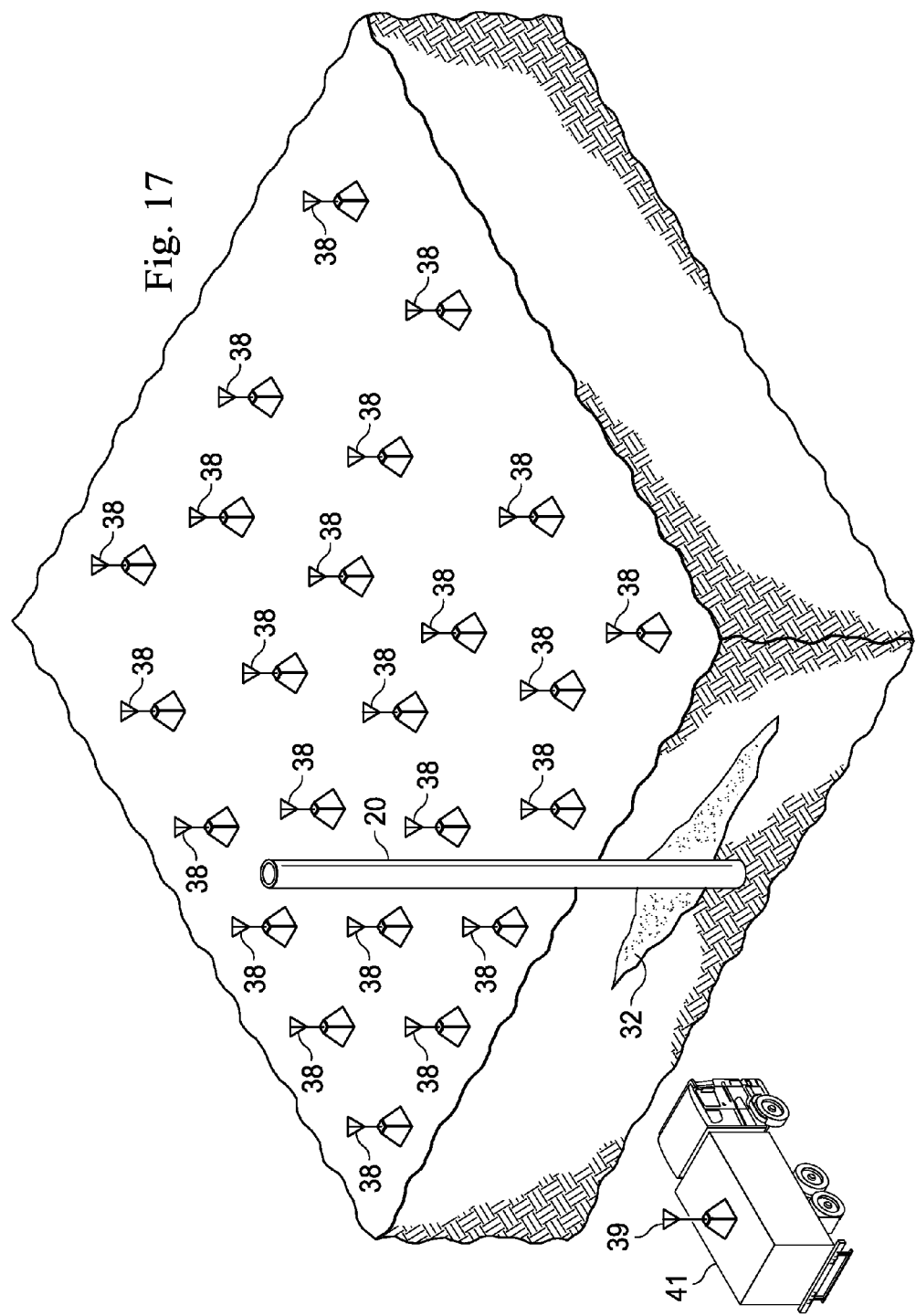

ELECTRICALLY-CONDUCTIVE PROPPANT AND METHODS FOR MAKING AND USING SAME

CROSS-REFERENCE TO RELATED PATENT APPLICATIONS

This application is a continuation-in-part of U.S. patent application Ser. No. 14/572,486 filed on Dec. 16, 2014, which is incorporated herein by reference in its entirety.

FIELD

Embodiments of the present invention relate generally to hydraulic fracturing of geological formations, and more particularly to electrically-conductive proppants used in the hydraulic fracture stimulation of gas, oil, or geothermal reservoirs.

BACKGROUND

In order to stimulate and more effectively produce hydrocarbons from downhole formations, especially formations with low porosity and/or low permeability, induced fracturing (called "frac operations", "hydraulic fracturing", or simply "fracing") of the hydrocarbon-bearing formations has been a commonly used technique. In a typical frac operation, fluids are pumped downhole under high pressure, causing the formations to fracture around the borehole, creating high permeability conduits that promote the flow of the hydrocarbons into the borehole. These frac operations can be conducted in horizontal and deviated, as well as vertical, boreholes, and in either intervals of uncased wells, or in cased wells through perforations.

In cased boreholes in vertical wells, for example, the high pressure fluids exit the borehole via perforations through the casing and surrounding cement, and cause the formations to fracture, usually in thin, generally vertical sheet-like fractures in the deeper formations in which oil and gas are commonly found. These induced fractures generally extend laterally a considerable distance out from the wellbore into the surrounding formations, and extend vertically until the fracture reaches a formation that is not easily fractured above and/or below the desired frac interval. The directions of maximum and minimum horizontal stress within the formation determine the azimuthal orientation of the induced fractures. Normally, if the fluid, sometimes called slurry, pumped downhole does not contain solids that remain lodged in the fracture when the fluid pressure is relaxed, then the fracture re-closes, and most of the permeability conduit gain is lost.

These solids, called proppants, are generally composed of sand grains or ceramic particles, and the fluid used to pump these solids downhole is usually designed to be sufficiently viscous such that the proppant particles remain entrained in the fluid as it moves downhole and out into the induced fractures. Prior to producing the fractured formations, materials called "breakers", which are also pumped downhole in the frac fluid slurry, reduce the viscosity of the frac fluid after a desired time delay, enabling these fluids to be easily removed from the fractures during production, leaving the proppant particles in place in the induced fractures to keep them from closing and thereby substantially precluding production fluid flow there through.

The proppants can also be placed in the induced fractures with a low viscosity fluid in fracturing operations referred to as "water fracs" or "slick water fracs". The fracturing fluid in water fracs is water with little or no polymer or other additives. Water fracs are advantageous because of the lower cost of the fluid used. Also when using cross-linked polymers, it is essential that the breakers be effective or the fluid cannot be recovered from the fracture, effectively restricting flow of formation fluids. Water fracs, because the fluid is not cross-linked, do not rely on the effectiveness of breakers.

Commonly used proppants include naturally occurring sands, resin coated sands, and ceramic proppants. Ceramic proppants are typically manufactured from naturally occurring materials such as kaolin and bauxitic clays, and offer a number of advantages compared to sands or resin coated sands principally resulting from the compressive strength of the manufactured ceramics and their highly spherical particle shape.

Although induced fracturing has been a highly effective tool in the production of hydrocarbon reservoirs, the amount of stimulation provided by this process depends to a large extent upon the ability to generate new fractures, or to create or extend existing fractures, as well as the ability to maintain connection to the fractures through appropriate placement of the proppant. Without appropriate placement of the proppant, fractures generated during the hydraulic fracturing can tend to close, thereby diminishing the benefits of the hydraulic fracturing treatment. However, reliable methods for detecting, locating and characterizing the placement of proppant within fractures at relatively far distances from the wellbore and thus confirming whether or not such placement has been appropriate are not available.

Current state of the art proppant identification techniques are limited to relatively short distances (12 inches to 18 inches maximum) from the wellbore. Radioactive and non-radioactive tracers and proppants are currently used to infer the presence of proppant in the near well bore region. A better understanding of proppant placement in the far field regions of a hydraulic fracture is needed.

Previous work for massive hydraulic fracture mapping is summarized in Bartel, L. C., McCann, R. P., and Keck, L. J., Use of potential gradients in massive hydraulic fracture mapping and characterization, prepared for the 51st Annual Fall Technical Conference and Exhibition of Society of Petroleum Engineers, New Orleans, Oct. 3-6, 1976 paper SPE 6090. In this previous work, the electric potential differences were measured between two concentric circles of voltage electrodes around a vertical fracture well at the earth's surface. The well was electrically energized at the top of the well casing or at the depth of the fracture. The electrical ground was established at a well located at a distance of approximately one mile from the fracture well. At that time, the fact that the grounding wire acted as a transmitting antenna was not taken into account. The water used for the fracture process contained potassium chloride (KCl) to enhance its electrical conductivity and the fracture was propped using non-conducting sand. A 1 Hz repetition rate square wave input current waveform was used and only the voltage difference amplitudes were measured. Voltages using an elementary theory based on current leakage from the well casing and the fracture into a homogeneous earth were used to produce expected responses. Comparing the field data to results from the elementary model showed that a fracture orientation could be inferred, however, since the model did not account for the details of the fracture, other fracture properties could not be determined using the elementary model.

A method of detecting, locating and characterizing the location of the proppant as placed in a hydraulic fracture at distances of more than several inches from the cased wellbore is currently unavailable and would be beneficial. A need exists, therefore, for a proppant particle that can be detected and located in a hydraulic fracture. It would be particular desirable to obtain a proppant particle that is suitable for propping open a fracture and being detected in the fracture after a period of time. It would also be desirable to obtain an economical method of making such a detectable proppant particle.

BRIEF DESCRIPTION OF THE DRAWINGS

The invention may best be understood by referring to the following description and accompanying drawings that are used to illustrate embodiments of the invention. In the drawings:

FIG. 17 is a schematic perspective illustration of a hydraulic fracture mapping system.

DETAILED DESCRIPTION

Figure 1:
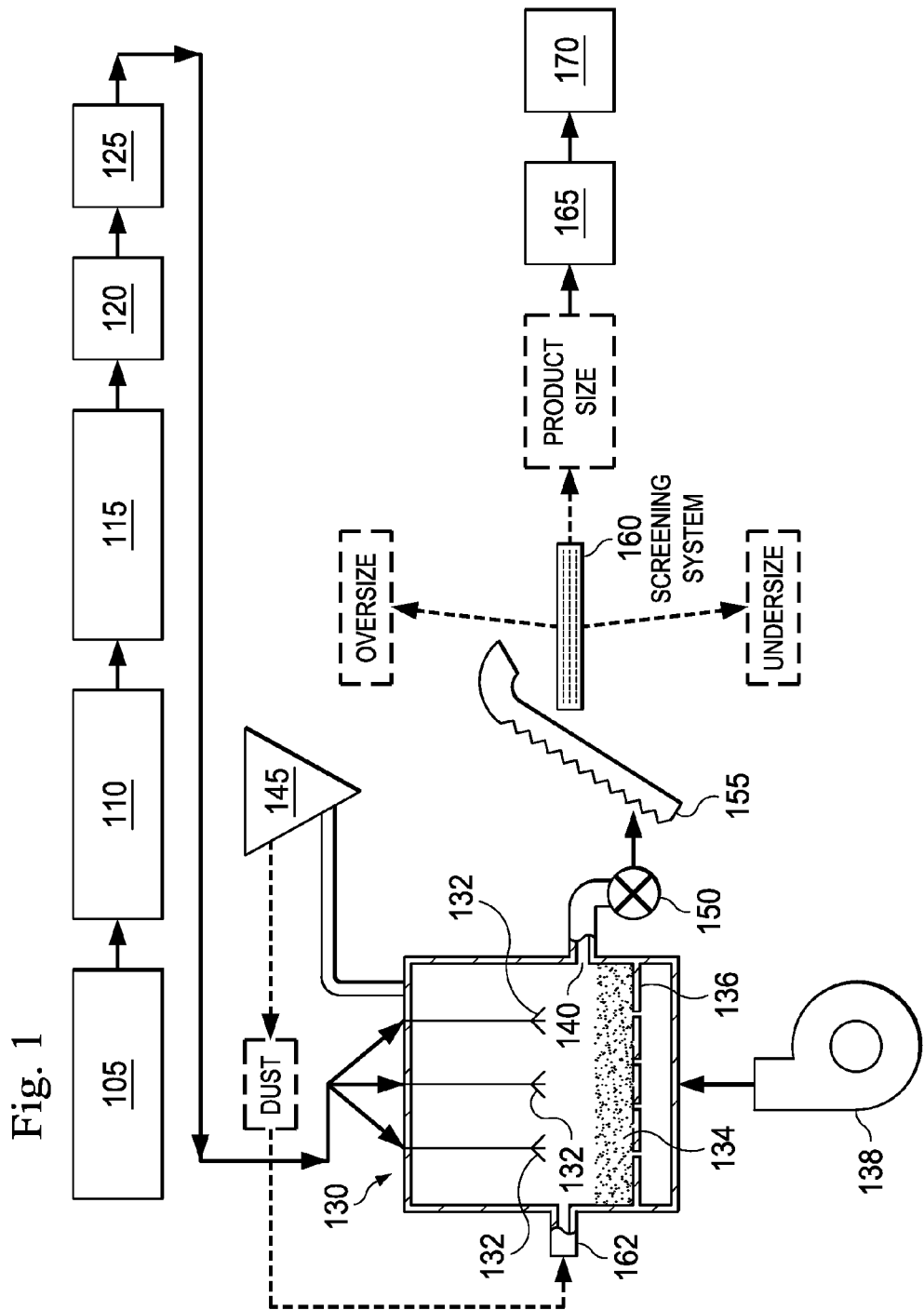
FIG. 1 is a schematic illustration of a system for preparing substantially round and spherical particles from a slurry as described herein.

In the following description, numerous specific details are set forth. However, it is understood that embodiments of the invention may be practiced without these specific details. In other instances, well-known structures and techniques have not been shown in detail in order not to obscure the understanding of this description.

Described herein are electromagnetic (EM) methods for detecting, locating, and characterizing electrically-conductive proppants used in the hydraulic fracture stimulation of gas, oil, or geothermal reservoirs. Also described herein are electrically-conductive sintered, substantially round and spherical particles and methods for preparing such electrically-conductive sintered, substantially round and spherical particles from a slurry of an alumina-containing raw material for use as proppants in the electromagnetic methods. The term "substantially round and spherical" and related forms, as used herein, is defined to mean an average ratio of minimum diameter to maximum diameter of about 0.8 or greater, or having an average sphericity value of about 0.8 or greater compared to a Krumbein and Sloss chart.

According to embodiments of the present invention, the electrically-conductive sintered, substantially round and spherical particles, referred to hereinafter as "electrically-conductive proppant" may be made from a conventional proppant such as a ceramic proppant, resin-coated ceramic proppant, sand, resin-coated sand, plastic beads and glass beads. Such conventional proppants can be manufactured according to any suitable process including, but not limited to continuous spray atomization, spray fluidization, spray drying, or compression. Suitable conventional proppants and methods for their manufacture are disclosed in U.S. Pat. Nos. 4,068,718, 4,427,068, 4,440,866, 5,188,175, and 7,036,591, the entire disclosures of which are incorporated herein by reference.

Ceramic proppants vary in properties such as apparent specific gravity by virtue of the starting raw material and the manufacturing process. The term "apparent specific gravity" as used herein is the weight per unit volume (grams per cubic centimeter) of the particles, including the internal porosity. Low density proppants generally have an apparent specific gravity of less than 3.0 g/cm³ and are typically made from kaolin clay and other alumina, oxide, or silicate ceramics. Intermediate density proppants generally have an apparent specific gravity of about 3.1 to 3.4 g/cm³ and are typically made from bauxitic clay. High strength proppants are generally made from bauxitic clays with alumina and have an apparent specific gravity above 3.4 g/cm³.

Sintered, substantially round and spherical particles can be prepared from a slurry of alumina-containing raw material. In certain embodiments, the particles have an alumina content of from about 40% by weight (wt %) to about 55 wt %. In certain other embodiments, the sintered, substantially round and spherical particles have an alumina content of from about 41.5 wt % to about 49 wt %.

In certain embodiments, the sintered, substantially round and spherical particles have a bulk density of from about 1 g/cm³, about 1.15 g/cm³, about 1.25 g/cm³, or about 1.35 g/cm³ to about 1.55 g/cm³, about 1.75 g/cm³, about 2 g/cm³, or about 2.5 g/cm³. The term "bulk density," as used herein, refers to the weight per unit volume, including in the volume considered, the void spaces between the particles. In certain other embodiments, the particles have a bulk density of from about 1.40 g/cm³ to about 1.50 g/cm³.

According to several exemplary embodiments, the substantially round and spherical particles have any suitable permeability and fluid conductivity in accordance with ISO 13503-5: "Procedures for Measuring the Long-term Conductivity of Proppants," and expressed in terms of Darcy units, or Darcies (D). The particles can have a long term permeability at 7,500 psi of at least about 1 D, at least about 2 D, at least about 5 D, at least about 10 D, at least about 20 D, at least about 40 D, at least about 80 D, at least about 120 D, or at least about 150 D. The particles can have a long term permeability at 12,000 psi of at least about 1 D, at least about 2 D, at least about 3 D, at least about 4 D, at least about 5 D, at least about 10 D, at least about 25 D, or at least about 50 D. The particles can have a long term conductivity at 7,500 psi of at least about 100 millidarcy-feet (mD-ft), at least about 200 mD-ft, at least about 300 mD-ft, at least about 500 mD-ft, at least about 1,000 mD-ft, at least about 1,500 mD-ft, at least about 2,000 mD-ft, or at least about 2,500 mD-ft. For example, the particles can have a long term conductivity at 12,000 psi of at least about 50 mD-ft, at least about 100 mD-ft, at least about 200 mD-ft, at least about 300 mD-ft, at least about 500 mD-ft, at least about 1,000 mD-ft, or at least about 1,500 mD-ft.

In certain embodiments, the sintered, substantially round and spherical particles have a crush strength at 10,000 psi of from about 5% to about 8.5%, and a long-term fluid conductivity at 10,000 psi of from about 2500 mD-ft to about 3000 mD-ft. In certain other embodiments, the sintered, substantially round and spherical particles have a crush strength at 10,000 psi of from about 5% to about 7.5%.

The sintered, substantially round and spherical particles can have any suitable apparent specific gravity. In one or more exemplary embodiments, the sintered, substantially round and spherical particles have an apparent specific gravity of less than 5, less than 4.5, less than 4.2, less than 4, less than 3.8, less than 3.5, or less than 3.2. In still other embodiments, the sintered, substantially round and spherical particles have an apparent specific gravity of from about 2.50 to about 3.00, about 2.75 to about 3.25, about 2.8 to about 3.4, about 3.0 to about 3.5, or about 3.2 to about 3.8. The term "apparent specific gravity," (ASG) as used herein, refers to a number without units that is defined to be numerically equal to the weight in grams per cubic centimeter of volume, including void space or open porosity in determining the volume.

The sintered, substantially round and spherical particles can have any suitable size. According to one or more exemplary embodiments, the substantially round and spherical particles can have a size of at least about 100 mesh, at least about 80 mesh, at least about 60 mesh, at least about 50 mesh, or at least about 40 mesh. For example, the substantially round and spherical particles can have a size from about 115 mesh to about 2 mesh, about 100 mesh to about 3 mesh, about 80 mesh to about 5 mesh, about 80 mesh to about 10 mesh, about 60 mesh to about 12 mesh, about 50 mesh to about 14 mesh, about 40 mesh to about 16 mesh, or about 35 mesh to about 18 mesh. In a particular embodiment, the substantially round and spherical particles have a size of from about 20 to about 40 U.S. Mesh.

Suitable ceramic proppants can also include proppants manufactured according to vibration-induced dripping methods, herein called "drip casting." Suitable drip casting methods and proppants made therefrom are disclosed in U.S. Pat. Nos. 8,865,631 and 8,883,693, U.S. Patent Application Publication No. 2012/0227968, and U.S. patent application Ser. Nos. 14/502,483 and 14/802,761, the entire disclosures of which are incorporated herein by reference. Proppants produced from the drip cast methods can have a specific gravity of at least about 2.5, at least about 2.7, at least about 3, at least about 3.3, or at least about 3.5. Proppants produced from the drip cast methods can have a specific gravity of less than 5, less than 4.5, or less than 4. The drip cast proppants can also have a surface roughness of less than 5 μm, less than 4 μm, less than 3 μm, less than 2.5 μm, less than 2 μm, less than 1.5 μm, or less than 1 μm. In one or more exemplary embodiments, the drip cast proppants have an average largest pore size of less than about 25 μm, less than about 20 μm, less than about 18 μm, less than about 16 μm, less than about 14 μm, or less than about 12 μm and/or a standard deviation in pore size of less than 6 μm, less than 4 μm, less than 3 μm, less than 2.5 μm, less than 2 μm, less than 1.5 μm, or less than 1 μm. In one or more exemplary embodiments, the drip cast proppants have less than 5,000, less than 4,500, less than 4,000, less than 3,500, less than 3,000, less than 2,500, or less than 2,200 visible pores at a magnification of 500× per square millimeter of proppant particulate.

The ceramic proppants, produced by the drip casting methods or the conventional methods, can have any suitable composition. The ceramic proppant can be or include silica and/or alumina in any suitable amounts. According to one or more embodiments, the ceramic proppant includes less than 80 wt %, less than 60 wt %, less than 40 wt %, less than 30 wt %, less than 20 wt %, less than 10 wt %, or less than 5 wt % silica based on the total weight of the ceramic proppant. According to one or more embodiments, the ceramic proppant includes from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to one or more embodiments, the ceramic proppant includes at least about 30 wt %, at least about 50 wt %, at least about 60 wt %, at least about 70 wt %, at least about 80 wt %, at least about 90 wt %, or at least about 95 wt % alumina based on the total weight of the ceramic proppant. According to one or more embodiments, the ceramic proppant has an alumina concentration of from about 10 wt %, about 20 wt %, about 30 wt %, or about 40 wt % to about 50 wt %, about 60 wt %, about 70 wt %, about 80 wt %, about 90 wt %, or about 95 wt % or more. According to one or more embodiments, the ceramic proppant includes from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina. In one or more embodiments, the ceramic proppant produced by the processes disclosed herein can include alumina, bauxite, or kaolin, or any mixture thereof. For example, the ceramic proppant can be composed entirely of or composed essentially of alumina, bauxite, or kaolin, or any mixture thereof. The term "kaolin" is well known in the art and can include a raw material having an alumina content of at least about 40 wt % on a calcined basis and a silica content of at least about 40 wt % on a calcined basis. The term "bauxite" is well known in the art and can be or include a raw material having an alumina content of at least about 55 wt % on a calcined basis. The term "calcined" and related forms, as used herein, refers to a raw material that has been treated at temperatures and times sufficient to remove organic material and to substantially remove water of hydration. The term "uncalcined" and related forms, as used herein, refers to a raw material that contains a residual amount of naturally-occurring volatiles, for example, from about 10 to about 40 wt %, which may include organic material and chemically bound water (also referred to as "water of hydration").

An electrically-conductive material such as a metal, a conductive polymer, conductive carbonaceous material such as graphene, or a conductive nanoparticle can be added at any suitable stage in the manufacturing process of any one of these proppants to result in proppant suitable for use according to certain embodiments of the present invention. The electrically-conductive material can also be added to any one of these proppants after manufacturing of the proppants. Suitable metals include aluminum, tin, zinc, iron, copper, silver, nickel, gold, platinum, palladium, rhodium and the like and can be added to result in an electrically-conductive proppant having any suitable metal content. The electrically-conductive proppant can have an electrically-conductive metal concentration of about 0.01 wt %, about 0.05 wt %, about 0.1 wt %, about 0.5 wt %, about 1 wt %, about 2 wt %, or about 5 wt % to about 6 wt %, about 8 wt %, about 10 wt %, about 12 wt %, or about 14 wt %.

Suitable conductive polymers include poly(3,4-ethylenedioxythiophene) poly(styrenesulfonate) (PEDOT:PSS), polyanilines (PANI), polypyrroles (PPY) and the like and can be added to result in an electrically-conductive proppant having any suitable conductive polymer content. The electrically-conductive proppant can have a conductive polymer concentration of about 0.01 wt %, about 0.05 wt %, about 0.1 wt %, about 0.5 wt %, about 1 wt %, about 2 wt %, or about 5 wt % to about 6 wt %, about 8 wt %, about 10 wt %, about 12 wt %, or about 14 wt %.

Suitable PEDOT:PSS, PANI and PYY conductive polymers are commercially available from Sigma-Aldrich. Certain specific embodiments of processes for coating proppant with a conductive polymer are described below in Example 2.

Suitable conducting nanoparticles include graphite, graphene, single or double-walled carbon nanotubes, or other material that when present in the nanoscale particle size range exhibits sufficient electrical conductivity to permit detection in the present invention. Such conducting nanoparticles can be added to result in a proppant having a conducting nanoparticle content of from about 0.01 wt %, about 0.05 wt %, about 0.1 wt %, about 0.5 wt %, about 1 wt %, about 2 wt %, or about 5 wt % to about 6 wt %, about 8 wt %, about 10 wt %, about 12 wt %, or about 14 wt % based on the weight of the electrically-conductive proppant.

Ceramic proppant may also be manufactured in a manner that creates porosity in the proppant grain. A process to manufacture a suitable porous ceramic proppant is described in U.S. Pat. No. 7,036,591, the entire disclosure of which is incorporated herein by reference. In this case the electrically-conductive material can be impregnated into the pores of the proppant grains to a concentration of about 0.01 wt %, about 0.05 wt %, about 0.1 wt %, about 0.5 wt %, about 1 wt %, about 2 wt %, or about 5 wt % to about 6 wt %, about 8 wt %, about 10 wt %, about 12 wt %, about 15 wt %, or about 20 wt % based on the weight of the electrically-conductive proppant. Water soluble coatings such as polylactic acid can be used to coat these particles to allow for delayed/timed release of conducting nano-particles for detection at different stages of the fracture treatment.

The ceramic proppants can have any suitable porosity. The ceramic proppants can include an internal interconnected porosity from about 1%, about 2%, about 4%, about 6%, about 8%, about 10%, about 12%, or about 14% to about 18%, about 20%, about 22%, about 24%, about 26%, about 28%, about 30%, about 34%, about 38%, or about 45% or more. In several exemplary embodiments, the internal interconnected porosity of the ceramic proppants is from about 5 to about 35%, about 5 to about 15%, or about 15 to about 35%. According to several exemplary embodiments, the ceramic proppants have any suitable average pore size. For example, the ceramic proppant can have an average pore size from about 2 nm, about 10 nm, about 15 nm, about 55 nm, about 110 nm, about 520 nm, or about 1,100 nm to about 2,200 nm, about 5,500 nm, about 11,000 nm, about 17,000 nm, or about 25,000 nm or more in its largest dimension. For example, the ceramic proppant can have an average pore size from about 3 nm to about 30,000 nm, about 30 nm to about 18,000 nm, about 200 nm to about 9,000 nm, about 350 nm to about 4,500 nm, or about 850 nm to about 1,800 nm in its largest dimension. According to certain embodiments described herein, the sintered, substantially round and spherical particles are made in a continuous process, while in other embodiments, the particles are made in a batch process.

In one or more exemplary embodiments, the electrically-conductive material can be added to a ceramic proppant in its method of manufacture. Referring now to FIG. 1, an exemplary system for implementing a continuous process for preparing sintered, substantially round and spherical particles from a slurry is illustrated. The exemplary system illustrated in FIG. 1 is similar in configuration and operation to that described in U.S. Pat. No. 4,440,866, the entire disclosure of which is incorporated herein by reference. The operations performed by the exemplary system illustrated in FIG. 1 can also be used to make the particles according to a batch process, as described in Example 1 below.

In the system illustrated in FIG. 1, a ceramic raw material is passed through a shredder 105 which slices and breaks apart the raw material into small chunks. The ceramic raw material can have any suitable alumina content. For example, the ceramic raw material can have an alumina concentration of from about 10 wt %, about 20 wt %, about 30 wt %, or about 40 wt % to about 50 wt %, about 60 wt %, about 70 wt %, about 80 wt %, about 90 wt %, or about 95 wt % or more. In some embodiments, when the raw material as mined, or as received, (referred to herein as "untreated" raw material) is of such consistency that it can be processed as described herein without shredding, the shredder may be bypassed. Raw material fed through a shredder such as is illustrated in FIG. 1, is referred to as "treated" raw material.

In certain embodiments, the shredder breaks apart and slices the alumina-containing raw material so as to yield pieces having a diameter of less than about five inches, although pieces having smaller and larger diameters can be further processed into a slurry as described herein. Shredders and numerous other devices for slicing, chopping or comminuting the alumina-containing raw material, as well as commercial sources for same, such as the Gleason Foundry Company, are well known to those of ordinary skill in the art.

The treated or untreated alumina-containing raw material and water are fed to a blunger 110, which has a rotating blade that imparts a shear force to and further reduces the particle size of the raw material to form a slurry. In a continuous process, the raw material and water are continuously fed to the blunger. Blungers and similar devices for making slurries of such materials, as well as commercial sources for same are well known to those of ordinary skill in the art.

In certain embodiments, the electrically-conductive material is added to the alumina-containing raw material and water in the blunger 110 to result in an electrically-conductive material concentration of about 0.1% to about 10.0% or about 5.0% to about 10.0% by weight of the solids content in the slurry or just prior to the formation of pellets as described below.

A sufficient amount of water is added to the blunger 110 to result in a slurry having a solids content in the range of from about 40% to about 60% by weight. In certain embodiments, a sufficient amount of water is added to the slurry such that the solids content of the slurry is from about 45% to about 55% by weight. In still other embodiments, a sufficient amount of water is added to the slurry such that the solids content of the slurry is about 50% by weight. The water added to the blunger 110 can be fresh water or deionized water. In a continuous process for preparing the slurry, the solids content of the slurry is periodically analyzed and the amount of water fed to the slurry adjusted to maintain the desired solids content. Methods for analyzing the solids content of a slurry and adjusting a feed of water are well-known and understood by those of ordinary skill in the art.

In certain embodiments, a dispersant is added to the slurry in the blunger 110 to adjust the viscosity of the slurry to a target range as discussed further below. In other embodiments, the viscosity of the slurry in the blunger 110 is adjusted to the target range by the addition of a dispersant and a pH-adjusting reagent.

A dispersant may be added to the slurry prior to the addition of the electrically-conductive material or other additives. In certain embodiments, the composition includes a dispersant in an amount of from about 0.15% to about 0.30% by weight based on the dry weight of the alumina-containing raw material.

Exemplary materials suitable for use as a dispersant in the compositions and methods described herein include but are not limited to sodium polyacrylate, ammonium polyacrylate, ammonium polymethacrylate, tetra sodium pyrophosphate, tetra potassium pyrophosphate, polyphosphate, ammonium polyphosphate, ammonium citrate, ferric ammonium citrate, and polyelectrolytes such as a composition of ammonium polymethacrylate and water commercially available from a variety of sources, such as, Kemira Chemicals under the trade name C-211, Phoenix Chemicals, Bulk Chemical Systems under the trade name BCS 4020 and R.T. Vanderbilt Company, Inc. under the trade name DARVAN C. Generally, the dispersant can be any material that will adjust the viscosity of the slurry to a target viscosity such that the slurry can be subsequently processed through one or more pressure nozzles of a fluidizer. In certain embodiments, the target viscosity is less than 150 centipoises (cps) (as determined on a Brookfield Viscometer with a #61 spindle). In other embodiments, the target viscosity is less than 100 cps.

According to embodiments in which a pH-adjusting reagent is used, a sufficient amount of a pH-adjusting reagent is added to the slurry to adjust the pH of the slurry to a range of from about 8 to about 11. In certain embodiments, a sufficient amount of the pH-adjusting reagent is added to the slurry to adjust the pH to about 9, about 9.5, about 10 or about 10.5. The pH of the slurry can be periodically analyzed by a pH meter, and the amount of pH-adjusting reagent fed to the slurry adjusted to maintain a desired pH. Methods for analyzing the pH of a slurry and adjusting the feed of the pH-adjusting reagent are within the ability of those of ordinary skill in the art. Exemplary materials suitable for use as a pH-adjusting reagent in the compositions and methods described herein include but are not limited to ammonia and sodium carbonate.

Generally, the target viscosity of the compositions is a viscosity that can be processed through a given type and size of pressure nozzle in a fluidizer, without becoming clogged. Generally, the lower the viscosity of the slurry, the more easily it can be processed through a given fluidizer. However, the addition of too much dispersant can cause the viscosity of the slurry to increase to a point that it cannot be satisfactorily processed through a given fluidizer. One of ordinary skill in the art can determine the target viscosity for given fluidizer types through routine experimentation.

The blunger 110 mixes the alumina-containing raw material, electrically-conductive material, water, dispersant and pH-adjusting reagent until a slurry is formed. The length of time required to form a slurry is dependent on factors such as the size of the blunger, the speed at which the blunger is operating, and the amount of material in the blunger.

From the blunger 110, the slurry is fed to a tank 115, where the slurry is continuously stirred, and a binder is added in an amount of from about 0.2% to about 5.0% by weight, based on the total dry weight of the alumina-containing raw material and the electrically-conductive material. In certain embodiments, the binder is added in an amount of from about 0.2% to about 3.0% by weight based on the total dry weight of the alumina-containing raw material and the electrically-conductive material. Suitable binders include but are not limited to polyvinyl acetate, polyvinyl alcohol (PVA), methylcellulose, dextrin and molasses. In certain embodiments, the binder is PVA having a molecular weight of from about 20,000 to 100,000 $M_n$. "$M_n$" represents the number average molecular weight which is the total weight of the polymeric molecules in a sample, divided by the total number of polymeric molecules in that sample.

The tank 115 maintains the slurry created by the blunger 110. However, the tank 115 stirs the slurry with less agitation than the blunger, so as to mix the binder with the slurry without causing excessive foaming of the slurry or increasing the viscosity of the slurry to an extent that would prevent the slurry from being fed through the pressurized nozzles of a fluidizer.

In another embodiment, the binder can be added to the slurry while in the blunger. In this embodiment, the blunger optionally has variable speeds, including a high speed to achieve the high intensity mixing for breaking down the raw material into a slurry form, and a low speed to mix the binder with the slurry without causing the above-mentioned excessive foaming or increase in viscosity.

Referring again to the tank 115 illustrated in FIG. 1, the slurry is stirred in the tank, after addition of the binder, for a time sufficient to thoroughly mix the binder with the slurry. In certain embodiments, the slurry is stirred in the tank for up to about 30 minutes following the addition of binder. In other embodiments, the slurry is stirred in the tank 115 for at least about 30 minutes. In still other embodiments, the slurry is stirred in the tank for more than about 30 minutes after addition of the binder.

Tank 115 can also be a tank system comprised of one, two, three or more tanks Any configuration or number of tanks that enables the thorough mixing of the binder with the slurry is sufficient. In a continuous process, water, and one or more of dust, oversized particles, or undersized particles from a subsequent fluidizer or other apparatus can be added to the slurry in the tank 115.

From the tank 115, the slurry is fed to a heat exchanger 120, which heats the slurry to a temperature of from about 25° C. to about 90° C. From the heat exchanger 120, the slurry is fed to a pump system 125, which feeds the slurry, under pressure, to a fluidizer 130.

A grinding mill(s) and/or a screening system(s) (not illustrated) can be inserted at one or more places in the system illustrated in FIG. 1 prior to feeding the slurry to the fluidizer to assist in breaking any larger-sized alumina-containing raw material down to a target size suitable for feeding to the fluidizer. In certain embodiments, the target size is less than 230 mesh. In other embodiments, the target size is less than 325 mesh, less than 270 mesh, less than 200 mesh or less than 170 mesh. The target size is influenced by the ability of the type and/or size of the pressure nozzle in the subsequent fluidizer to atomize the slurry without becoming clogged.

If a grinding system is employed, it is charged with a grinding media suitable to assist in breaking the raw material down to a target size suitable for subsequent feeding through one or more pressure nozzles of a fluidizer. If a screening system is employed, the screening system is designed to remove particles larger than the target size from the slurry. For example, the screening system can include one or more screens, which are selected and positioned so as to screen the slurry to particles that are smaller than the target size.

Referring again to FIG. 1, fluidizer 130 is of conventional design, such as described in, for example, U.S. Pat. No. 3,533,829 and U.K. Patent No. 1,401,303. Fluidizer 130 includes at least one atomizing nozzle 132 (three atomizing nozzles 132 being shown in FIG. 1), which is a pressure nozzle of conventional design. In other embodiments, one or more two-fluid nozzles are suitable. The design of such nozzles is well-known, for example from K. Masters: "Spray Drying Handbook", John Wiley and Sons, New York (1979).

Fluidizer 130 further includes a particle bed 134, which is supported by a plate 136, such as a perforated, straight or directional plate. Hot air flows through the plate 136. The particle bed 134 comprises seeds from which green pellets of a target size can be grown. The term "green pellets" and related forms, as used herein, refers to substantially round and spherical particles which have been formed from the slurry but are not sintered. When a perforated or straight plate is used, the seeds also serve to obtain plug flow in the fluidizer. Plug flow is a term known to those of ordinary skill in the art, and can generally be described as a flow pattern where very little back mixing occurs. The seed particles are smaller than the target size for green pellets made according to the present methods. In certain embodiments, the seed comprises from about 5% to about 20% of the total volume of a green pellet formed therefrom. Slurry is sprayed, under pressure, through the atomizing nozzles 132, and the slurry spray coats the seeds to form green pellets that are substantially round and spherical.

External seeds can be placed on the perforated plate 136 before atomization of the slurry by the fluidizer begins. If external seeds are used, the seeds can be prepared in a slurry process similar to that illustrated in FIG. 1, where the seeds are simply taken from the fluidizer at a target seed size. External seeds can also be prepared in a high intensity mixing process such as that described in U.S. Pat. No. 4,879,181, the entire disclosure of which is hereby incorporated by reference.

According to certain embodiments, external seeds are made from either a raw material having at least the same alumina content as the raw material used to make the slurry, or from a raw material having more or less alumina than the raw material used to make the slurry. In certain embodiments, the slurry has an alumina content that is at least 10%, at least 20%, or at least 30% less than that of the seeds. In other embodiments, the external seeds have an alumina content less than that of the slurry, such as at least 10%, at least 20%, or at least 30% less than that of the slurry.

Alternatively, seeds for the particle bed are formed by the atomization of the slurry, thereby providing a method by which the slurry "self-germinates" with its own seed. According to one such embodiment, the slurry is fed through the fluidizer 130 in the absence of a seeded particle bed 134. The slurry droplets exiting the nozzles 132 solidify, but are small enough initially that they get carried out of the fluidizer 130 by air flow and caught as "dust" (fine particles) by a dust collector 145, which may, for instance, be an electrostatic precipitator, a cyclone, a bag filter, a wet scrubber or a combination thereof. The dust from the dust collector is then fed to the particle bed 134 through dust inlet 162, where it is sprayed with slurry exiting the nozzles 132. The dust may be recycled a sufficient number of times, until it has grown to a point where it is too large to be carried out by the air flow and can serve as seed. The dust can also be recycled to another operation in the process, for example, the tank 115.

Referring again to FIG. 1, hot air is introduced to the fluidizer 130 by means of a fan and an air heater, which are schematically represented at 138. The velocity of the hot air passing through the particle bed 134 is from about 0.9 meters/second to about 1.5 meters/second, and the depth of the particle bed 134 is from about 2 centimeters to about 60 centimeters. The temperature of the hot air when introduced to the fluidizer 130 is from about 250° C. to about 650° C. The temperature of the hot air as it exits from the fluidizer 130 is less than about 250° C., and in some embodiments is less than about 100° C.

The distance between the atomizing nozzles 132 and the plate 136 is optimized to avoid the formation of dust which occurs when the nozzles 132 are too far away from the plate 126 and the formation of irregular, coarse particles which occurs when the nozzles 132 are too close to the plate 136. The position of the nozzles 132 with respect to the plate 136 is adjusted on the basis of an analysis of powder sampled from the fluidizer 130.

The green pellets formed by the fluidizer accumulate in the particle bed 134. In a continuous process, the green pellets formed by the fluidizer 130 are withdrawn through an outlet 140 in response to the level of product in the particle bed 134 in the fluidizer 130, so as to maintain a given depth in the particle bed. A rotary valve 150 conducts green pellets withdrawn from the fluidizer 130 to an elevator 155, which feeds the green pellets to a screening system 160, where the green pellets are separated into one or more fractions, for example, an oversized fraction, a product fraction, and an undersized fraction.

The oversized fraction exiting the screening unit 160 includes those green pellets that are larger than the desired product size. In a continuous process, the oversized green pellets may be recycled to tank 115, where at least some of the oversized green pellets can be broken down and blended with slurry in the tank. Alternatively, oversized green pellets can be broken down and recycled to the particle bed 134 in the fluidizer 130. The undersized fraction exiting the screening system 160 includes those green pellets that are smaller than the desired product size. In a continuous process, these green pellets may be recycled to the fluidizer 130, where they can be fed through an inlet 162 as seeds or as a secondary feed to the fluidizer 130.

The product fraction exiting the screening system 160 includes those green pellets having the desired product size. These green pellets are sent to a pre-sintering device 165, for example, a calciner, where the green pellets are dried or calcined prior to sintering. In certain embodiments, the green pellets are dried to a moisture content of less than about 18% by weight, or less than about 15% by weight, about 12% by weight, about 10% by weight, about 5% by weight, or about 1% by weight.

After drying and/or calcining, the green pellets are fed to a sintering device 170, in which the green pellets are sintered for a period of time sufficient to enable recovery of sintered, substantially round and spherical particles having one or more of a desired apparent specific gravity, bulk density, and crush strength. Alternatively, the pre-sintering device 165 can be eliminated if the sintering device 170 can provide sufficient calcining and/or drying conditions (i.e., drying times and temperatures that dry the green pellets to a target moisture content prior to sintering), followed by sufficient sintering conditions.

The specific time and temperature to be employed for sintering is dependent on the starting ingredients and the desired density for the sintered particles. In some embodiments, sintering device 170 is a rotary kiln, operating at a temperature of from about 1000° C. to about 1600° C., for a period of time from about 5 to about 90 minutes. In certain embodiments, a rotary kiln is operated at a temperature of about 1000° C., about 1200° C., about 1300° C., about 1400° C. or about 1500° C. In certain embodiments, the green pellets have a residence time in the sintering device of from about 50 minutes to about 70 minutes, or from about 30 minutes to about 45 minutes. After the particles exit the sintering device 170, they can be further screened for size, and tested for quality control purposes. Inert atmosphere sintering can be used to limit or prevent the oxidation of the electrically-conductive material. Techniques for replacing the oxygen rich atmosphere in the sintering device with an inert gas such as argon, nitrogen, or helium are well known to those of ordinary skill in the art. Generally, oxygen is replaced with an inert gas such that 0.005% oxygen or less remains in the sintering atmosphere.

According to certain embodiments of the present invention, the electrically-conductive material is coated onto the proppants. For example, the electrically-conductive material can be coated onto ceramic proppant after the proppant particles exit sintering device 170 and have been further screened for size, and tested for quality control measures. The coating may be accomplished by any coating technique well-known to those of ordinary skill in the art such as spraying, sputtering, vacuum deposition, dip coating, extrusion, calendaring, powder coating, transfer coating, air knife coating, roller coating, electroless plating (such as disclosed in U.S. Pat. Nos. 3,296,012, 4,812,202, and 3,617,343, the entire disclosures of which are hereby incorporated herein by reference), electroplating and brush coating.

According to several exemplary embodiments, the electrically-conductive material is deposited as a coating on the ceramic proppant or natural sands. Processes for electrolytic and electroless coating are well-known to those of ordinary skill in the art. For example, see U.S. Pat. No. 3,556,839, the entire disclosure of which is hereby incorporated by reference.

According to several exemplary embodiments and in accordance with conventional autocatalytic plating methods, a non-conductive substrate, such as a ceramic proppant sample, is suitably cleaned and roughened, then sensitized and activated by successive immersions in an aqueous solution of a reducing agent and solutions of catalytic metal such as stannous chloride and palladium chloride and rinsing in water following each such immersion. Thereafter, the substrate can be immersed in the plating bath heated to a temperature of between 55-95° C. The bath can include, for example, an aqueous solution containing a salt of nickel and a phosphorous-containing reducing agent such as sodium hypophosphite in the presence of salts such as sodium citrate and sodium acetate, where the pH of the solution is adjusted to a value of between 4 and 6. Those of ordinary skill in the art will understand that any conventional electroless nickel, copper, silver or gold plating bath solution may be utilized such as those that are commercially available from suppliers such as Uyemura, Transene or Caswell. Immersion for a period of about 1 to about 30 minutes can produce a film of nickel ranging from about 0.05 micron, about 0.1 micron, about 0.25 micron, or about 0.5 micron to about 1 micron, about 2 microns, about 3 microns, or about 5 microns or more in thickness deposited on the surface of the substrate. The plating solution can be continuously resupplied to maintain a constant plating chemical concentration, or conversely, substantially exhausted as the plating reagent is deposited on the substrate, thereby fixing the thickness of the metal film.

According to several exemplary embodiments and in accordance with conventional electroless plating methods, a non-conductive substrate, such as a ceramic proppant sample, is suitably cleaned and then sensitized by successive immersions in an aqueous solution of catalytic metal and an aqueous solution of a reducing agent such as, for example, solutions of palladium chloride and stannous chloride, and rinsing in water following each such immersion. Thereafter, the substrate is immersed in the plating bath maintained at a temperature of between 25-65° C. The bath may include, for example, an aqueous solution containing a salt of copper and an alkali metal hydroxide in the presence of one or more salts such as potassium sodium tartrate and sodium carbonate. Those of ordinary skill in the art will understand that any conventional electroless nickel, copper, silver or gold plating bath solution can be utilized such as those that are commercially available from suppliers such as Uyemura, Transene or Caswell. Immersion for a period of about 1 to about 30 minutes can produce a film of nickel ranging from about 0.05 micron, about 0.1 micron, about 0.25 micron, or about 0.5 micron to about 1 micron, about 2 microns, about 3 microns, or about 5 microns or more in thickness deposited on the surface of the substrate. The plating solution can be continuously resupplied to maintain a constant plating chemical concentration, or conversely, substantially exhausted as the plating reagent is deposited on the substrate, thereby fixing the thickness of the metal film.

The conventional autocatalytic plating methods, however, can use acidic palladium solutions that may oxidize active metal expressed in the native proppant surface and therefore can lead to poor deposition of metal onto the proppant surface. It has been found that incorporating a conditioning step into an electroless coating method can improve the deposition of metal onto the proppant surface.

Figure 2:
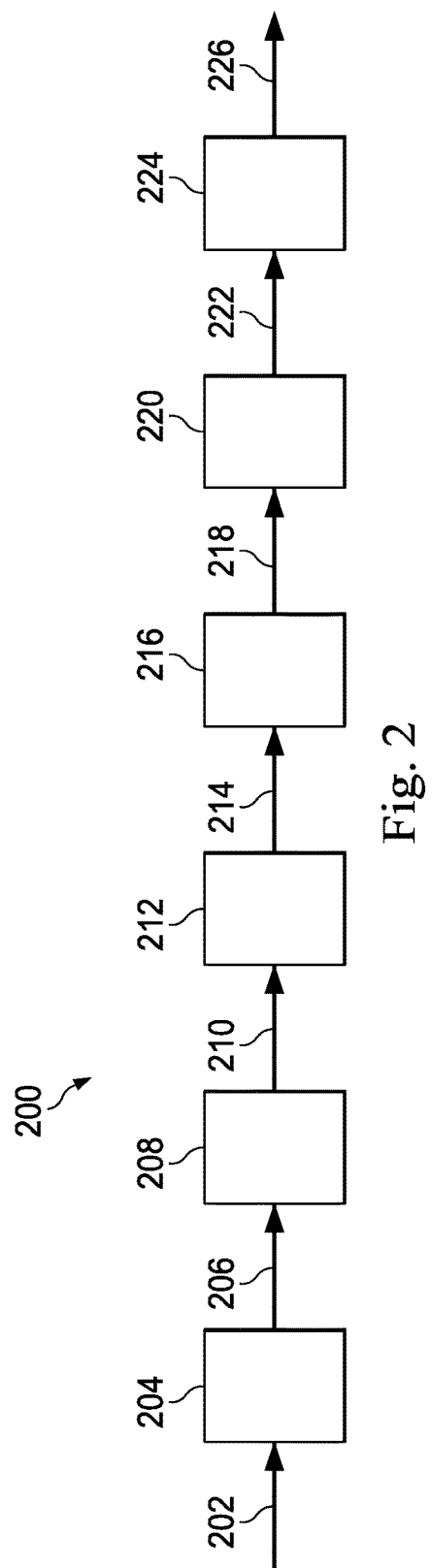
FIG. 2 is a flow chart showing steps of an electroless coating method for electrically-conductive material onto a proppant substrate.

Referring now to FIG. 2, a flow chart is depicted showing steps of a process 200 for electroless coating of the electrically-conductive material onto proppant utilizing a conditioning step. In the electroless coating process 200, a supply of proppant via line 202 can be introduced to one or more washing units 204 where the proppant via line 202 can be contacted with a first washing solution to remove dust and/or fines to provide a clean proppant via line 206. The washing unit 204 can be or include one or more tanks, one or more vessels, one or more conveyance systems, one or more conduits, or the like. The first washing solution can be or include an aqueous solution containing an acid or base, such as water containing dilute acid, or an organic phase solution, such as a liquid hydrocarbon, this washing can also be conducted at an elevated temperature. Clean proppant via line 206 can be withdrawn from the washing unit 204 and introduced to one or more pretreatment units 208 where the clean proppant via line 206 can be contacted with a conditioning solution. The pretreatment unit 208 can be or include one or more tanks, one or more vessels, one or more conveyance systems, one or more conduits, or the like. The conditioning solution can be or include an alkaline solution to adjust the pH of the surface of the proppant to alkaline levels (pH>7). The alkaline solution can include one or more of an hydroxide, ammonia, or a carbonate.

The conditioning in the pretreatment unit 208 can be further enhanced by combining or mixing a suitable surfactant with the conditioning solutions. Suitable surfactants can include, but are not limited to, anionic, cationic, nonionic, and amphoteric surfactants, or combinations thereof. According to several exemplary embodiments, suitable surfactants include but are not limited to saturated or unsaturated long-chain fatty acids or acid salts, long-chain alcohols, polyalcohols, polysorbates, dimethylpolysiloxane and polyethylhydrosiloxane. According to several exemplary embodiments, suitable surfactants include but are not limited to linear and branched carboxylic acids and acid salts having from about 4 to about 30 carbon atoms, linear and branched alkyl sulfonic acids and acid salts having from about 4 to about 30 carbon atoms, linear alkyl benzene sulfonate wherein the linear alkyl chain includes from about 4 to about 30 carbon atoms, sulfosuccinates, phosphates, phosphonates, phospholipids, ethoxylated compounds, carboxylates, sulfonates and sulfates, polyglycol ethers, amines, salts of acrylic acid, pyrophosphate and mixtures thereof. In one or more exemplary embodiments, the surfactant is a polysorbate, such as Tween™ 20 (PEG(20) sorbitan monolaurate).

The clean proppant via line 206 can contact the conditioning solution in the pretreatment unit 208 under any suitable conditions to provide a conditioned proppant via line 210. Suitable conditions can include a temperature of about 10° C., about 25° C., about 30° C., about 35° C., about 40° C., about 45° C. to about 47° C., about 50° C., about 55° C., about 60° C., about 75° C., or about 100° C. under a residence time of about 1 second (s), about 5 s, about 15 s, about 25 s, about 45 s, or about 55 s to about 65 s, about 75 s, about 100 s, about 2 minutes (min), about 5 min, or about 10 min. The conditioning solution can have a pH of at least about 7.2, at least about 8, at least about 8.5, at least about 9, at least about 10, at least about 11, at least about 12, at least about 12.5, or at least about 13.

The conditioned proppant via line 210 can be withdrawn from the pretreatment unit 208 and introduced to one or more turbidity reduction units 212 where the conditioned proppant via line 210 can be contacted with a second washing solution to further remove dust and/or fines to provide a washed proppant via line 214 having a reduced turbidity compared to the conditioned proppant via line 210. The turbidity reduction unit 212 can be or include one or more tanks, one or more vessels, one or more conveyance systems, one or more conduits, or the like. The second washing solution can be the same as or similar to the first washing solution and can include an aqueous solution, such as water, or an organic phase solution, such as a liquid hydrocarbon. The second washing solution can also have a sensitizer which aids the activator in the subsequent step. The sensitizer can be any agent that reduces the activator, such as tin chloride, sodium borohydride or sodium hypophosphite or any other known reducing agent. In one or more exemplary embodiments, the second washing solution does not contain the sensitizer. The sensitizer step would be followed by another rinse step, but in some embodiments may be omitted.

Washed proppant via line 214 can be withdrawn from the turbidity reduction unit 212 and introduced to one or more catalyst reduction units 216 where the washed proppant via line 214 can be contacted with an activation solution. The activation solution can activate the proppant by attaching catalytically active material, such as palladium, silver or iron, to the proppant surface. The activation solution can be or include one or more palladium salts, such as palladium chloride or palladium ammonium chloride, and/or silver nitrate. The activation solution can be an aqueous phase solution or an organic phase solution. The activation solution can have a palladium salt concentration of about 0.1 milligrams of $Pd^{2+}$ per liter (mg/l), about 0.5 mg/l, about 1 mg/l, about 5 mg/l, about 10 mg/l, or about 20 mg/l to about 30 mg/l, about 35 mg/l, about 40 mg/l, about 50 mg/l, or about 100 mg/l. The activation solution can also contain a reducing agent, or sensitizer. The reducing agent can be or include a tin salt, such as stannous chloride. In one or more exemplary embodiments, the activation solution does not contain the reducing agent.

The washed proppant via line 214 can contact the activation solution in the catalyst reduction unit 216 under any suitable conditions to provide an activated proppant via line 218. Suitable conditions can include a temperature of about 20° C., about 35° C., about 50° C., about 65° C., about 75° C., about 78° C. to about 82° C., about 85° C., about 90° C., about 95° C., about 100° C., or about 105° C. under a residence time of about 1 min, about 2 min, about 3 min, about 4 min, about 5 min, or about 7 min to about 8 min, about 9 min, about 10 min, about 12 min, about 15 min, or about 20 min or more and/or until the bath is substantially exhausted. The activation solution can have a pH of about 7.1, about 7.2, about 7.4, about 7.6, or about 7.8 to about 8, about 8.5, about 9, about 9.5, about 10, about 11, about 12, or about 13 or more.

The activated proppant via line 218 can be withdrawn from the activation unit 216 and introduced to one or more rinse units 220 where the activated proppant via line 218 can be contacted with a third washing solution to remove excess activation solution from the activated proppant. The rinse unit 220 can be or include one or more tanks, one or more vessels, one or more conveyance systems, one or more conduits, or the like. The third washing solution can include an aqueous solution, such as tap water or de-ionized water.

Rinsed proppant via line 222 can be withdrawn from the rinse unit 220 and introduced to one more metallization units 224 where the rinsed proppant via line 222 can be subjected to metal plating. In one or more exemplary embodiments, the rinsed proppant via line 222 can be subjected to metal plating by contacting a plating solution in any suitable manner. The plating solution can be sprayed or coated onto the rinsed proppant and/or the rinsed proppant via line 222 can be immersed or submerged into a bath of the plating solution (plating bath solution). For example, in the metallization unit 224, the rinsed proppant via line 222 can be immersed in a plating bath solution having a temperature of about 20° C., about 35° C., about 50° C., about 60° C., or about 70° C. to about 75° C., about 80° C., about 90° C., about 95° C., about 100° C., about 110° C., or about 120° C. or more under a residence time of about 1 min, about 2 min, about 4 min, about 8 min, about 12 min, or about 14 min to about 16 min, about 20 min, about 25 min, about 30 min, about 45 min, or about 60 min or more and/or until the bath is substantially exhausted. After immersion, a film of electrically-conductive material ranging from about 10 nanometers (nm), about 50 nm, about 100 nm, about 250 nm, or about 400 nm to about 500 nm, about 600 nm, about 700 nm, about 800 nm, about 900 nm, about 1,000 nm, about 1,200 nm, about 1,500 nm, about 2,000 nm, or about 3,000 nm or more can be substantially uniformly coated onto the rinsed proppant to provide the electrically-conductive proppant.

The plating solution can be an aqueous solution containing water or an organic phase solution containing one or more hydrocarbons. The plating solution can be basic or acidic and can include a metal salt, a complexing agent, a reducing agent, and a buffer. For example, the plating solution can include a salt of nickel such as nickel sulfate, nickel sulphate hexahydrate, and nickel chloride. The complexing agent can include acetate, succinate, aminoacetate, malonate, pyrophosphate, malate, or citrate or any combination thereof. The reducing agent can include sodium borohydride, dimethylamine borane, or hydrazine or any combination thereof. The buffer can include acetic acid, propionic acid, glutaric acid, succinic acid, or adipic acid or any combination thereof. Those of ordinary skill in the art will understand that any conventional electroless nickel, copper, silver or gold plating solution can also be utilized such as those that are commercially available from suppliers such as Uyemura, Transene, Caswell, and Metal-Chem.

Figure 3:
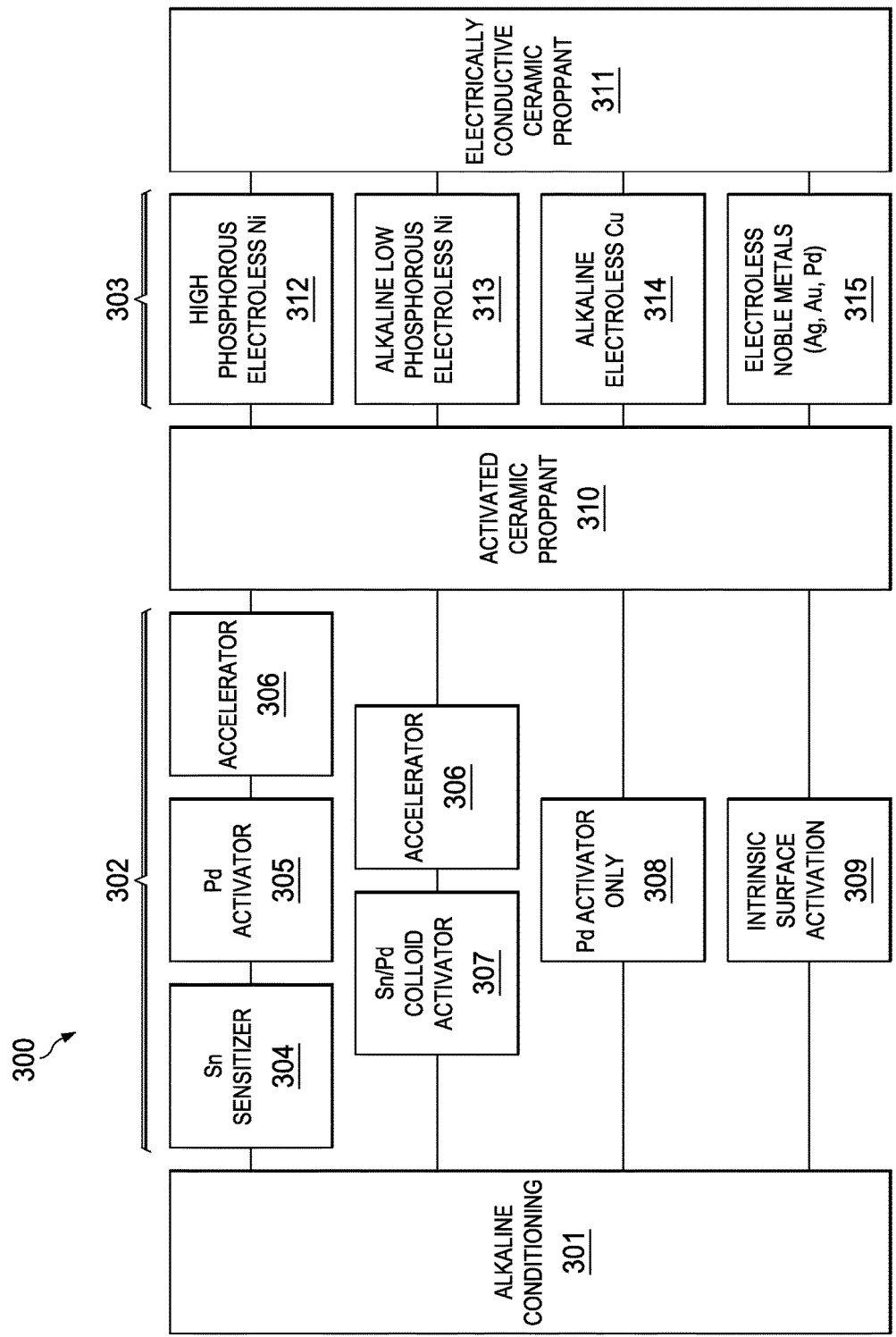
FIG. 3 is another flow chart showing alternative steps of an electroless coating method for electrically-conductive material onto a proppant substrate.

Additional and/or alternative steps can be employed in the electroless plating process. Referring now to FIG. 3, a flow chart is depicted showing steps of a process 300 for electroless coating of the electrically-conductive material onto proppant in which alternative activation and metal deposition steps are depicted. Proppant particles can be subjected to alkaline conditioning 301, which can be the same as or similar to the alkaline conditioning in the pretreatment unit 208, to provide conditioned proppant particles.

After being subjected to the alkaline conditioning step 301, the conditioned proppant particles can be subjected to an activation step 302 prior to electroless metal deposition 303. The conditioned particles can be sensitized using a sensitizer solution of tin(II) 304 to produce sensitized particles. After subsequent exposure to palladium(II) activation solution 305, palladium(II) is reduced to palladium metal ($Pd^{2+} \rightarrow Pd^0$ on the surface of the sensitized particles and tin(II) is oxidized to tin(IV) ($Sn^{2+} \rightarrow Sn^{4+}$). An accelerator solution 306 can be used to remove oxidized tin(IV) after exposure to palladium(II) activation solution 305 and prior to electroless metal deposition 303. Alternative embodiments involve a combined tin(IV) and palladium(II) activator and sensitizer colloidal suspension 307 which can be followed by the accelerator solution 306. The accelerator solution 306 can be an aqueous solution and can include one or more accelerator agents including, but not limited to, one or more organic sulfide compounds, such as bis(sodium-sulfopropyl)disulfide, 3-mercapto-1-propanesulfonic acid sodium salt, N,N-dimethyl-dithiocarbamyl propylsulfonic acid sodium salt or 3-S-isothiuronium propyl sulfonate, and mixtures thereof. Other suitable accelerator agents can include, but are not limited to, thiourea, allylthiourea, acetylthiourea, and pyridine and the like.

In certain embodiments, specific to proppant particle surfaces, combinations of alkaline conditioning and/or solution drying can enable activation using only the Pd activator as shown in step 308. The conditioned particles are activated using a solution of any suitable palladium salt, such as palladium chloride or palladium ammonium chloride, in a concentration of from about 0.1, about 0.5, about 1, about 5, about 10, about 15 or about 20 to about 25, about 30, about 35, about 40, or about 50 or more milligrams $Pd^{2+}$ per liter, where the pH of the solution can be adjusted between 7 and 14 using any suitable bases such as, for example, sodium hydroxide or ammonia.

In one or more exemplary embodiments, intrinsic surface activation 309 can be accomplished prior to electroless metal deposition 303. In this embodiment, iron or any other suitable metal ion incorporated into the proppant particles during firing or sintering that are expressed at the surface of the proppant, can serve to directly activate the particles. In one or more exemplary embodiments, the surface of the particles is activated by soaking the particles in a reducing agent solution, such as sodium borohydride, sodium hypophosphite or sodium cyanoborohydride, where this solution can be transferred directly to the electroless plating solution with the particles still wet from the solution, or dried onto the particles prior to electroless metal plating 303, or rinsed completely from the particles.

Ceramic proppant particles can contain a significant amount of oxidized iron. In one or more exemplary embodiments of intrinsic surface activation 309, these iron moieties can be reduced to elemental iron, or other reduced form [iron (II)] which is catalytically active to copper, nickel and other noble metal electroless plating solutions. By utilizing the native iron content intrinsic to the particle, it is possible to plate onto the particles without Pd activators. The reduction of surface iron ions to atomic iron can occur within a sintering device, such as sintering device 170, or subsequent to sintering, by maintaining a reducing environment in the kiln, which is characterized by the presence of carbon monoxide or other products of partial combustion. Iron on the surface of the proppant particles can also be reduced after manufacturing by exposing the surfaces of the proppant particles to carbon monoxide or hydrogen at any suitable temperatures such as, for example, about 200° C., about 300° C., about 400° C., about 500° C., or about 600° C. to about 750° C., about 900° C., about 1,100° C., or about 1,500° C.

After particle activation 302, activated proppant 310 can be converted into electrically-conductive proppant 311 by electroless metal deposition 303. Processes for electrolytic and electroless coating are well-known to those of ordinary skill in the art. See, for example, U.S. Pat. No. 3,556,839, the entire disclosure of which is incorporated herein by reference. According to several exemplary embodiments, and in accordance with conventional autocatalytic or electroless plating methods, the activated proppant sample can be coated with metal and metal alloys by various methods.

After activation 302, the substrate can be immersed in, submerged in, sprayed with, or otherwise contacted with a plating solution of the electroless metal deposition 303 to provide the electrically-conductive proppant 311. The plating solution can be heated to a temperature of from about 35° C., about 45° C., about 55° C., about 65° C., or about 75° C. to about 85° C., about 95° C., about 105° C., or about 120° C. or more. In one or more embodiments, the plating solution can be or include an acidic, nickel-containing solution with a high phosphorous content (about 5 wt % to about 12 wt % phosphorous by weight of the resulting nickel-phosphorous alloy film) 312. The high phosphorous content solution can include, for example, an aqueous solution containing a salt of nickel and a phosphorous-containing reducing agent such as sodium hypophosphite in the presence of salts such as sodium citrate and sodium acetate. The pH of the high phosphorous content plating solution can be from about 2, about 3, about 3.5, about 4, or about 4.5 to about 5, about 5.5, about 6, or about 6.5.

In one or more embodiments, the plating solution can be an alkaline, nickel-containing solution 313 with a low phosphorous content (about >1 wt % to about 4.9 wt % phosphorous by weight of the resulting nickel-phosphorous alloy film). The pH of the alkaline plating solution 313 with a low phosphorous content can be from about 7, about 7.5, about 8, about 8.5, or about 9 to about 10, about 10.5, about 11, about 12, or about 13 or more. The alkaline plating solution 313 can chelate free nickel ions to prevent solution reactivity with Pd, as can occur with Pd solution drag out, and therefore offer a preferred reaction environment for high surface area materials such as ceramic proppant. Alkaline plating solutions can require relatively longer periods of time to plate, but can lead to thinner, contiguous coatings with higher conductivity which may enhance electromagnetic detection. Those of ordinary skill in the art will understand that any conventional electroless nickel, copper, silver or gold plating solution solution may be utilized with any range of pH such as those that are commercially available from suppliers such as Metal-Chem, Enthone, Uyemura, Transene or Caswell. In one or more exemplary embodiments, the plating solution can be or include alkaline electroless copper 314 containing formaldehyde as a reducing agent. In one or more exemplary embodiments, the plating solution can include electroless noble metals 315, such as silver, gold, and platinum. For example, the plating solution can be or include a silver nitrate solution.

The electrically-conductive proppant 311 can have any suitable film thickness of electrically-conductive material disposed on the outer surfaces thereof. In one or more embodiments, the film of electrically-conductive material can be from about 10 nm, about 50 nm, about 100 nm, about 250 nm, or about 400 nm to about 500 nm, about 600 nm, about 700 nm, about 800 nm, about 900 nm, about 1,000 nm, about 1,200 nm, about 1,500 nm, about 2,500 nm, or about 3,500 nm or more in thickness when substantially uniformly coated onto the proppant to provide the electrically-conductive ceramic proppant 311. In one or more exemplary embodiments, the thickness of the substantially uniform coating of electrically-conductive material can be from about 50 nm to about 150 nm, about 400 nm to about 600 nm, about 500 nm to about 1,200 nm, about 550 nm to about 700 nm, about 750 nm to about 1,200 nm, or about 750 nm to about 1,000 nm.

The electrically-conductive material can also be incorporated into a resin material. Ceramic proppant or natural sands can be coated with the resin material containing the electrically-conductive material such as metal clusters, metal flake, metal shot, metal powder, metalloids, metal nanoparticles, quantum dots, carbon nanotubes, buckminsterfullerenes, and other suitable electrically-conductive materials to provide electrically-conductive material-containing proppant that can be detected by electromagnetic means. Processes for resin coating proppants and natural sands are well known to those of ordinary skill in the art. For example, a suitable solvent coating process is described in U.S. Pat. No. 3,929,191, to Graham et al., the entire disclosure of which is incorporated herein by reference. Another suitable process such as that described in U.S. Pat. No. 3,492,147 to Young et al., the entire disclosure of which is incorporated herein by reference, involves the coating of a particulate substrate with a liquid, uncatalyzed resin composition characterized by its ability to extract a catalyst or curing agent from a non-aqueous solution. Also, a suitable hot melt coating procedure for utilizing phenol-formaldehyde novolac resins is described in U.S. Pat. No. 4,585,064, to Graham et al., the entire disclosure of which is incorporated herein by reference. Those of ordinary skill in the art will be familiar with still other suitable methods for resin coating proppants and natural sands.

The electrically-conductive proppant 311 can have any suitable electrical conductivity. In one or more exemplary embodiments, a pack of the electrically-conductive proppant 311 can have an electrical conductivity of at least about 1 Siemen per meter (S/m), at least about 5 S/m, at least about 15 S/m, at least about 50 S/m, at least about 100 S/m, at least about 250 S/m, at least about 500 S/m, at least about 750 S/m, at least about 1,000 S/m, at least about 1,500 S/m, or at least about 2,000 S/m. The electrical conductivity of the pack of the electrically-conductive proppant 311 can also be from about 10 S/m, about 50 S/m, about 100 S/m, about 500 S/m, about 1,000 S/m, or about 1,500 S/m to about 2,000 S/m, about 3,000 S/m, about 4,000 S/m, about 5,000 S/m, or about 6,000 S/m. The pack of the electrically-conductive proppant 311 can have any suitable resistivity. In one or more exemplary embodiments, the pack of the electrically-conductive proppant 311 can have a resistivity of less than 100 Ohm-cm, less than 80 Ohm-cm, less than 50 Ohm-cm, less than 25 Ohm-cm, less than 15 Ohm-cm, less than 5 Ohm-cm, less than 2 Ohm-cm, less than 1 Ohm-cm, less than 0.5 Ohm-cm, or less than 0.1 Ohm-cm.

In one or more exemplary embodiments, increasing a load or pressure onto the pack of the electrically-conductive proppant 311 by a factor of 2, a factor of 5, or a factor of 10 can increase the electrical conductivity of the pack of the electrically-conductive proppant 311 by at least about 50%, at least about 75%, at least about 100%, at least about 150%, or at least about 200%. In one or more exemplary embodiments, increasing a load or pressure onto the pack of the electrically-conductive proppant 311 by a factor of 2, a factor of 5, or a factor of 10 can decrease the resistivity of the pack of the electrically-conductive proppant 311 by from about 1%, about 2%, or about 5% to about 10%, about 15%, or about 25%.

Figure 4:
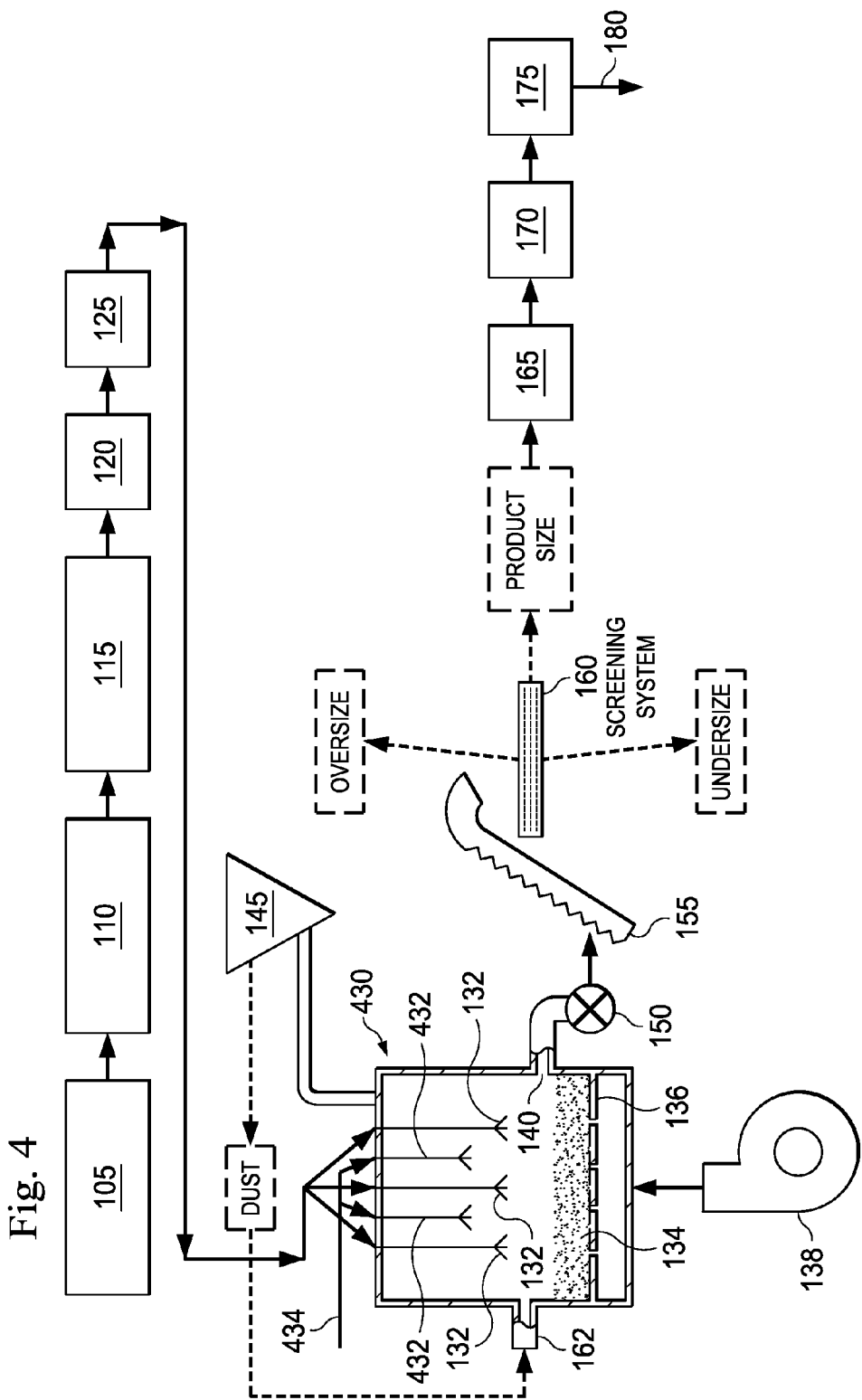
FIG. 4 is another schematic illustration of a system for preparing substantially round and spherical particles from a slurry as described herein.

Turning now to FIG. 4, the ceramic raw material is passed through the shredder 105 and fed to the blunger 110 where the ceramic raw material, water, dispersant, and/or pH-adjusting reagent is mixed until a slurry is formed. From the blunger 110, the slurry is fed to the tank 115, where the slurry is continuously stirred and the binder is added. From the tank 115, the slurry is fed to the heat exchanger 120, which heats the slurry to a desired temperature. From the heat exchanger 120, the slurry is fed to the pump system 125, which feeds the slurry to the fluidizer 430. Fluidizer 430 can be of any conventional design, such as described herein. For example, fluidizer 430 can be the same as or similar to fluidizer 130. Fluidizer 430 can include at least one atomizing nozzle 132 (three atomizing nozzles 132 being shown in FIG. 4). Fluidizer 430 can also include activation nozzles 432 (two activation nozzles 432 being shown in FIG. 4), which is also a nozzle of conventional design. Fluidizer 430 further includes the particle bed 134, which is supported by the plate 136 through which hot air can flow. Slurry is sprayed, under pressure, through the atomizing nozzles 132, and the slurry spray coats seeds to form green pellets that are substantially round and spherical and/or the slurry can self-germinate with its own seed.

The green pellets formed by the fluidizer 430 can accumulate in the particle bed 134. The activation nozzles 432 can eject an activation solution via line 434 onto the green pellets in the fluidizer 430 and in the particle bed 134 to provide activated green pellets. The activation solution via line 434 can be an aqueous phase solution or an organic phase solution. For example, the activation solution via line 434 can be or include any activation solution disclosed herein. In one or more exemplary embodiments, the activation solution via line 434 can include metals such as aluminum, tin, zinc, iron, copper, silver, nickel, gold, platinum, palladium, rhodium and the like. In one or more exemplary embodiments, the activation solution via line 434 can activate the green pellets by attaching catalytically active material, such as palladium or silver, to the green pellet surfaces. The activation solution via line 434 can also be, or include, one or more palladium salts, such as palladium chloride or palladium ammonium chloride, and/or silver nitrate. The activation solution via line 434 can have a palladium salt concentration of about 0.1 milligrams of $Pd^{2+}$ per liter (mg/l), about 0.5 mg/l, about 1 mg/l, about 5 mg/l, about 10 mg/l, or about 20 mg/l to about 30 mg/l, about 35 mg/l, about 40 mg/l, about 50 mg/l, or about 100 mg/l or more. The activation solution via line 434 can also contain a reducing agent, or sensitizer. The reducing agent can be or include a tin salt, such as stannous chloride. In one or more exemplary embodiments, the activation solution via line 434 does not contain the reducing agent. In one or more exemplary embodiments, the activation solution via line 434 can be or include the activation solution 305, the accelerator solution 306, and/or the activator and sensitizer colloidal suspension 307. In one or more exemplary embodiments, the activation solution can include palladium(II) ($Pd2^+$), tin(IV) ($Sn2^+$), elemental iron, and/or iron(II).

In a continuous process, activated green pellets formed in the fluidizer 430 are withdrawn through an outlet 140 in response to the level of product in the particle bed 134 in the fluidizer 430, so as to maintain a given depth in the particle bed. A rotary valve 150 conducts activated green pellets withdrawn from the fluidizer 430 to an elevator 155, which feeds the activated green pellets to a screening system 160, where the activated green pellets are separated into one or more fractions, for example, an oversized fraction, a product fraction, and an undersized fraction. The oversized fraction exiting the screening unit 160 includes those activated green pellets that are larger than the desired product size. In a continuous process, the oversized activated green pellets may be recycled to tank 115, where at least some of the oversized activated green pellets can be broken down and blended with slurry in the tank. Alternatively, oversized activated green pellets can be broken down and recycled to the particle bed 134 in the fluidizer 430. The undersized fraction exiting the screening system 160 includes those activated green pellets that are smaller than the desired product size. In a continuous process, these activated green pellets may be recycled to the fluidizer 430, where they can be fed through an inlet 162 as seeds or as a secondary feed to the fluidizer 430.

The product fraction exiting the screening system 160 includes those activated green pellets having the desired product size. These activated green pellets are sent to a pre-sintering device 165, for example, a calciner, where the activated green pellets are dried or calcined prior to sintering. In certain embodiments, the activated green pellets are dried to a moisture content of less than about 18% by weight, or less than about 15% by weight, about 12% by weight, about 10% by weight, about 5% by weight, or about 1% by weight to provide dried green pellets.

The dried green pellets can include the activation metal(s) and/or catalytically-active material(s). For example, the dried green pellets can include palladium, iron, silver, or the like. In one or more exemplary embodiments, the dried green pellets can include palladium metal($Pd^0$), tin(IV) ($Sn^{4+}$), iron(II) oxide, iron(II,III) oxide and/or iron(III) oxide. For example, when the activation solution 305 includes palladium (II), the palladium(II) is reduced to palladium metal ($Pd^{2+} \rightarrow Pd^0$) on the surface of the green pellets and when the activation solution 305 contains tin(II), the tin(II) can assist reduction of Pd when it is oxidized to tin(IV) ($Sn^{2+} \rightarrow Sn^{4+}$) on the surface of the green pellets. In one or more exemplary embodiments, about 1 wt %, about 2 wt %, about 4 wt %, about 8 wt %, about 15 wt %, about 30 wt %, or about 40 wt % to about 60 wt %, about 70 wt %, about 80 wt %, about 90 wt %, about 95 wt %, or about 99 wt % of the catalytically active material can be expressed on the outer surfaces of the green pellets in the calciner.

After drying and/or calcining, the green pellets are fed to a sintering device 170, in which the green pellets are sintered for a period of time sufficient to enable recovery of sintered, substantially round and spherical particles having one or more of a desired apparent specific gravity, bulk density, and crush strength. Alternatively, the pre-sintering device 165 can be eliminated if the sintering device 170 can provide sufficient calcining and/or drying conditions, followed by sufficient sintering conditions.

After the sintered pellets exit the sintering device 170, they can be further screened for size, and tested for quality control purposes. Inert atmosphere sintering can also be used to limit the amount of oxidation of the green pellets or prevent further oxidation of the catalytically active green pellets. Techniques for replacing the oxygen rich atmosphere in the sintering device with an inert gas such as argon, nitrogen, or helium are well-known to those of ordinary skill in the art. Generally, oxygen can be replaced with an inert gas such that 0.005% oxygen or less remains in the sintering atmosphere.

After production of catalytically active green pellets, and according to certain embodiments of the present invention, the electrically-conductive material is coated onto the sintered pellets, or proppants, in the plating unit 175. For example, the sintered pellets, or proppants, withdrawn from the sintering device 170 can be introduced to the plating unit 175 where the proppants are immersed in the plating solution disclosed herein that can include a temperature of between about 55-95° C. or between about 25-65° C.

Immersion for a period of about 1 to about 30 minutes can produce a film of nickel ranging from about 0.05 micron, about 0.1 micron, about 0.25 micron, or about 0.5 micron to about 1 micron, about 2 microns, about 3 microns, or about 5 microns or more in thickness deposited on the surface of the substrate. The plating solution can be continuously resupplied to maintain a constant plating chemical concentration in the plating unit 175, or conversely, substantially exhausted as the plating reagent is deposited on the substrate, thereby fixing the thickness of the metal film. The electrically-conductive proppant can be withdrawn from the plating unit 175 via line 180.

Figure 5:
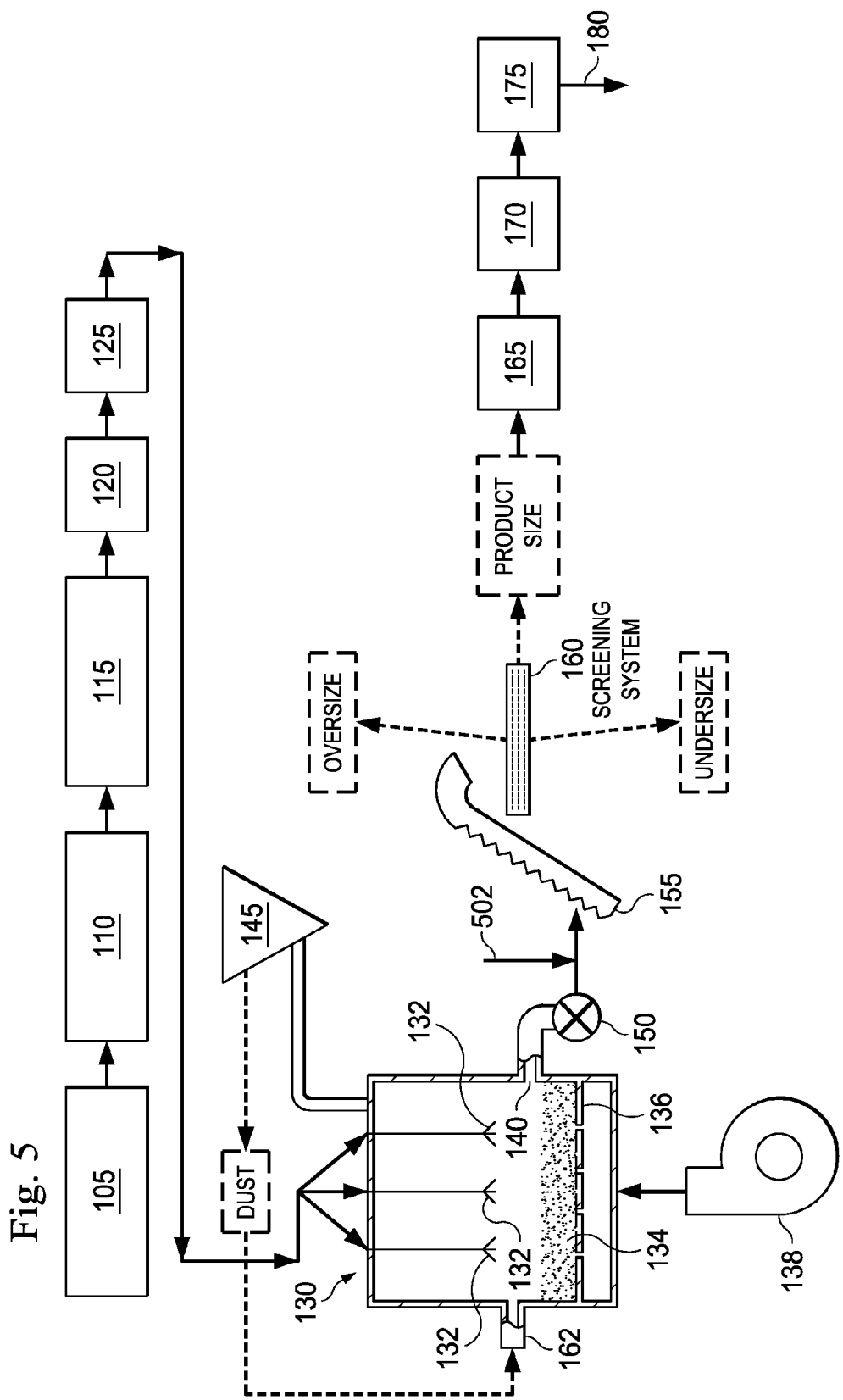
FIG. 5 is a further schematic illustration of a system for preparing substantially round and spherical particles from a slurry as described herein.
Figure 6:
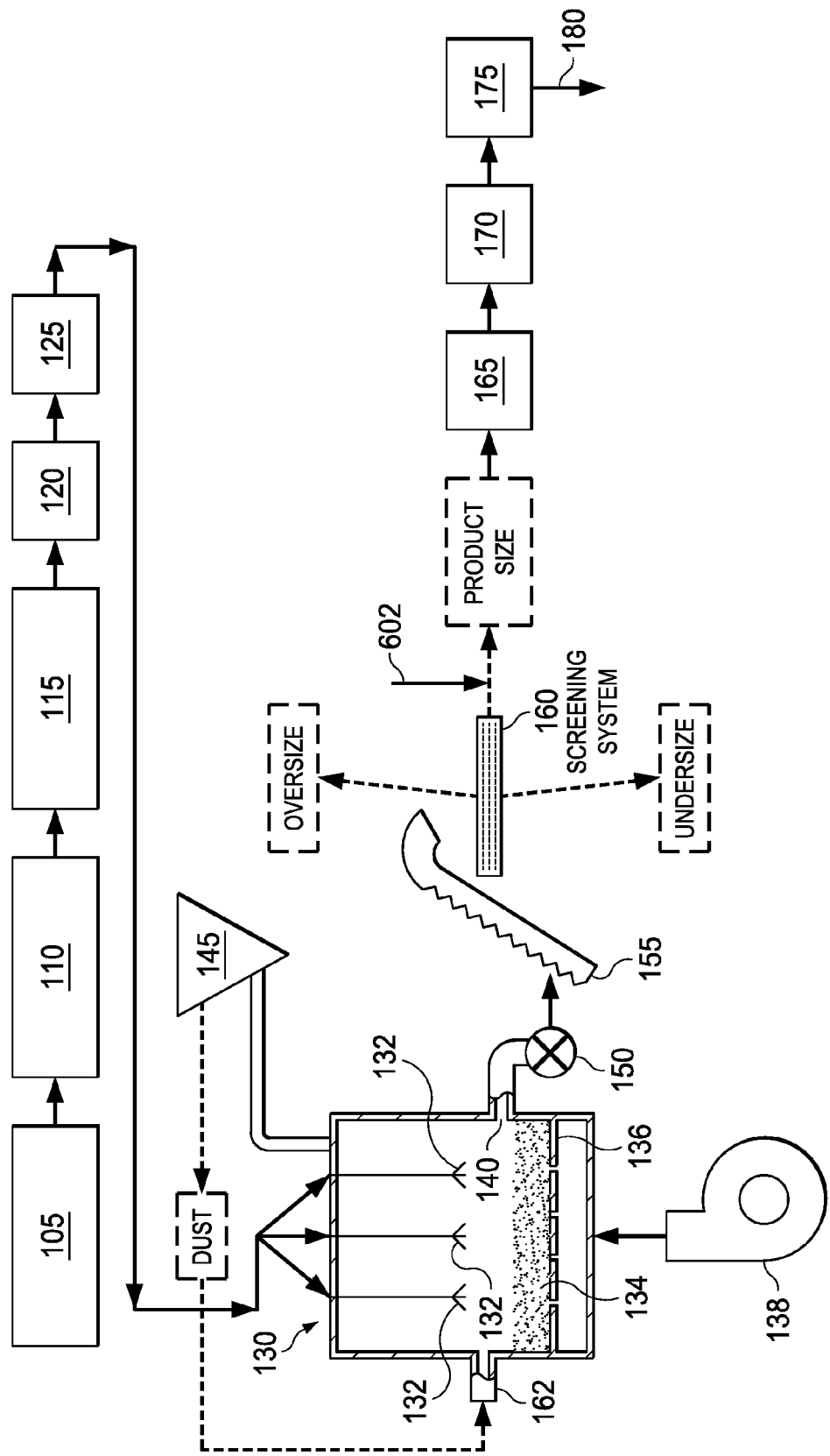
FIG. 6 is yet another schematic illustration of a system for preparing substantially round and spherical particles from a slurry as described herein.

Turning now to FIGS. 5 and 6, a slurry of ceramic raw material is formed in the blunger 110, and fed to the tank 115, where the slurry is continuously stirred and the binder is added. From the tank 115, the slurry is fed to the heat exchanger 120 and then to the pump system 125, which feeds the slurry to the fluidizer 130 to provide green pellets. Green pellets formed in the fluidizer 130 are then withdrawn through an outlet 140. The green pellets withdrawn from the outlet 140 can then come into contact with the activation solution disclosed herein in any suitable manner and at any suitable time to provide activated green pellets prior to sintering. In accordance with the system of FIG. 5, the green pellets leaving the rotary valve 150 can contact the activation solution disclosed herein via line 502 in any suitable manner. For example, the activation solution via line 502 can be sprayed or otherwise ejected onto the green pellets leaving the rotary valve 150 to provide the activated green pellets. The green pellets leaving the rotary valve 150 can also contact a liquid stream or bath of the activation solution to provide the activated green pellets. The activated pellets can then be introduced to the elevator 155. In one or more exemplary embodiments (not shown), the activation solution can be ejected onto the green pellets as the green pellets exit the elevator and/or while the green pellets are on the screening system 160 in order to provide the activated green pellets. Activated green pellets having the product size are withdrawn from the screening system 160 and are sent to the pre-sintering device 165 and/or the sintering device 170 to provide the oxidized green pellets and/or proppants.

In accordance with the system of FIG. 6, the green pellets having the product size, leaving the screening system 160 can contact the activation solution via line 602. In one or more exemplary embodiments, the product fraction exiting the screening system 160 includes those green pellets having the desired product size. These green pellets can contact the activation solution in any suitable manner. For example, the activation solution via line 602 can be sprayed or otherwise ejected onto the green pellets having the desired product size to provide the activated green pellets. The green pellets having the desired product size can also contact a liquid stream or bath of the activation solution to provide the activated green pellets. The activated green pellets are sent to the pre-sintering device 165 and/or the sintering device 170 to provide the oxidized green pellets and/or proppants.

According to certain embodiments of the present invention, the electrically-conductive material is coated onto the proppants produced in accordance with the systems of FIGS. 5 and 6. For example, the sintered pellets, or proppants, withdrawn from the sintering device 170 can be introduced to the plating unit 175 and immersed in the plating solution disposed therein that can include a temperature of between about 55-95° C. or between about 25-65° C. Immersion for a period of about 1 to about 30 minutes can produce a film of nickel ranging from about 0.05 micron, about 0.1 micron, about 0.25 micron, or about 0.5 micron to about 1 micron, about 2 microns, about 3 microns, or about 5 microns or more in thickness deposited on the surface of the substrate. The plating solution can be continuously resupplied to maintain a constant plating chemical concentration, or conversely, substantially exhausted as the plating reagent is deposited on the substrate, thereby fixing the thickness of the metal film and resulting in electrically-conductive proppant. The electrically-conductive proppant can be withdrawn from the plating unit 175 via line 180.

Figure 7:
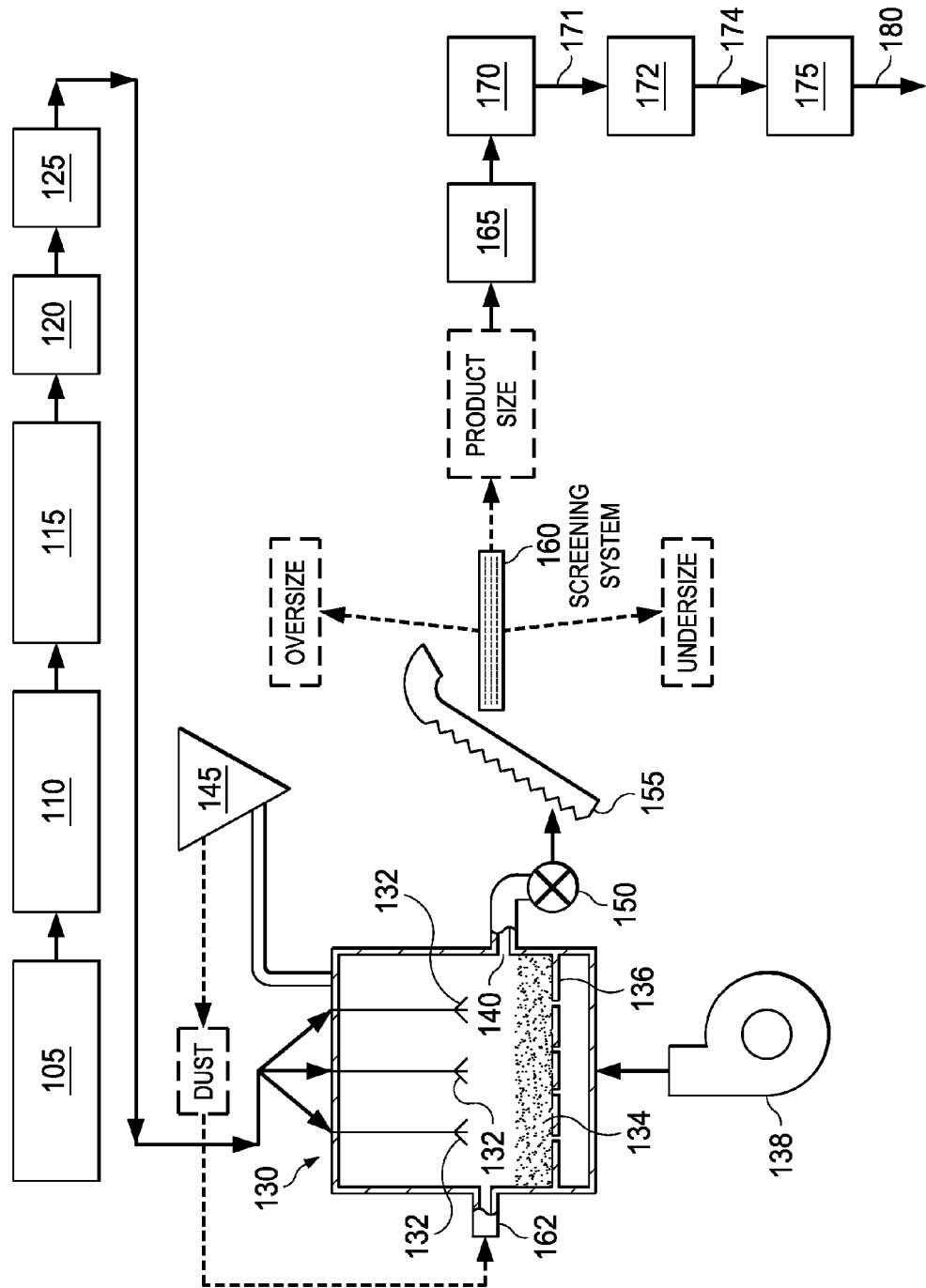
FIG. 7 is yet a further schematic illustration of a system for preparing substantially round and spherical particles from a slurry as described herein.

In accordance with the system of FIG. 7, the sintered pellets, or proppants, withdrawn from the sintering device 170 via line 171 can contact the activation solution to provide activated proppant. For example, the proppants via line 171 can be introduced to a proppant cooler 172 in which the activation solution is applied to the proppants in any suitable manner to provide cooled activated proppant via line 174. For example, the activation solution can be sprayed onto the proppants in the proppant cooler 172 via one or more spray nozzles (not shown) located inside the proppant cooler 172 to provide the cooled activated proppant via line 174. The proppant cooler 172 can be or include a rotary cooler. The rotary cooler can be located adjacent the sintering device 170. The proppant cooler 172 can operate at a temperature of from about 0° C. to about 500° C., about 25° C. to about 250° C., or about 50° C. to about 150° C., for a period of time from about 5 seconds, about 15 seconds, about 30 seconds, or about 1 minute to about 5 minutes, about 10 minutes, about 20 minutes, or about 90 minutes.

According to certain embodiments of the present invention, the electrically-conductive material is coated onto the proppants produced in accordance with the systems of FIGS. 5-7. For example, the sintered pellets, or proppants, withdrawn from the sintering device 170 and/or the proppant cooler 172 can be introduced to the plating unit 175 and immersed in the plating solution disposed therein that can include a temperature of between about 55-95° C. or between about 25-65° C. Immersion for a period of about 1 to about 30 minutes can produce a film of nickel ranging from about 0.05 micron, about 0.1 micron, about 0.25 micron, or about 0.5 micron to about 1 micron, about 2 microns, about 3 microns, or about 5 microns or more in thickness deposited on the surface of the substrate. The plating solution can be continuously resupplied to maintain a constant plating chemical concentration, or conversely, substantially exhausted as the plating reagent is deposited on the substrate, thereby fixing the thickness of the metal film and resulting in electrically-conductive proppant. The electrically-conductive proppant can be withdrawn from the plating unit 175 via line 180.

In one or more exemplary embodiments, the green pellets and/or sintered proppants can be conditioned with a conditioning solution disclosed herein at any step prior to contacting the activation solution. For example, the green pellets and/or proppants can contact the conditioning solution in the fluidizer 130, 430 to provide conditioned green pellets. The conditioned green pellets and/or proppants can then contact the activation solution in accordance with systems of FIGS. 5-7. For example, the conditioning solution can contact the green pellets to provide conditioned green pellets during, prior to, or after being introduced to the elevator 155, the screening system 160, the pre-sintering device 165, and/or the sintering device 170. The conditioning solution can be applied to green pellets and/or proppants in any suitable manner. For example, the conditioning solution can be sprayed or otherwise ejected onto the green pellets and/or proppants. In another example, the green pellets and/or proppants can contact a liquid stream or bath of the conditioning solution to provide the conditioned green pellets.

Figure 8:
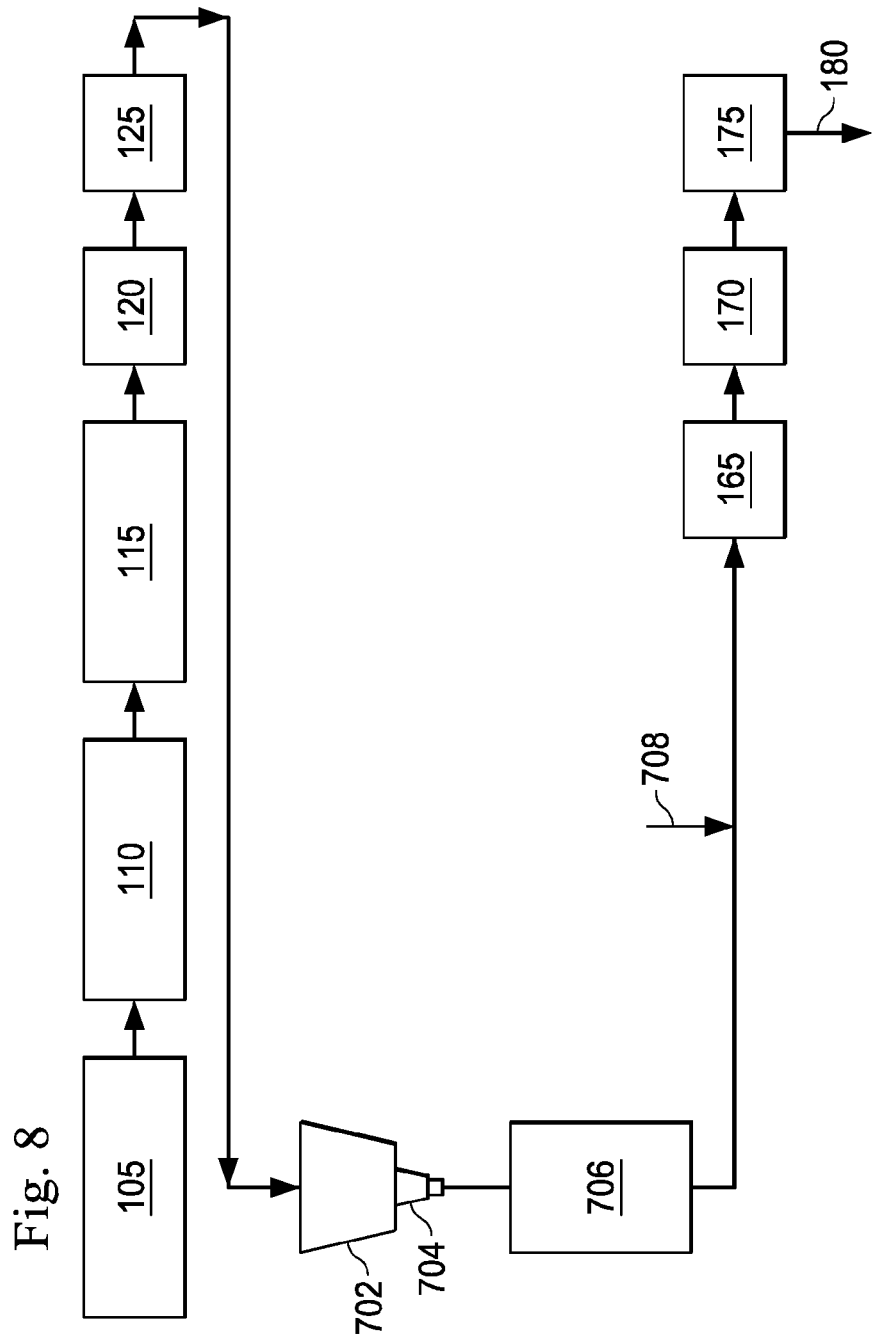
FIG. 8 is a schematic illustration of a drip cast system for preparing substantially round and spherical particles from a slurry as described herein.

FIG. 8 is a schematic illustration of a drip cast system for preparing substantially round and spherical particles from a slurry as described herein. As shown in FIG. 8, a ceramic raw material is passed through the shredder 105 and fed to the blunger 110 where the ceramic raw material, water, dispersant, and/or pH-adjusting reagent is mixed until a slurry is formed. From the blunger 110, the slurry is fed to the tank 115, where the slurry is continuously stirred and the binder is added. From the tank 115, the slurry is fed to the heat exchanger 120, which heats the slurry to a desired temperature. From the heat exchanger 120, the slurry is fed to the pump system 125, which feeds the slurry to a feed tank 702. A nozzle 704 receives a slurry from the feed tank 704, which contains the ceramic raw materials suspended in water or any other suitable aqueous solution. Pressure applied to feed tank 702 by a pressure supply system (not shown) causes the slurry to flow through nozzle 704 at a selected rate to form droplets. Below nozzle 704 is a coagulation vessel 706, which receives the droplets. A vibrator unit (not shown) is connected to the nozzle 704 and is used to supply pressure pulses to the nozzle or directly in the slurry flowing to the nozzle 704. The resulting vibration of the slurry flow through the nozzle 704 causes the stream exiting the nozzle 704 to break into droplets of uniform size as the droplets fall from the nozzle 704 and into an atmosphere surrounding the nozzle 704. The surrounding atmosphere can include any suitable gaseous medium, such as air or nitrogen. As droplets fall toward coagulation vessel 706, surface tension effects tend to form the droplets into spheres. These falling droplets, or spheres, then contact an upper liquid surface of a coagulation liquid contained in the coagulation vessel 706. The droplets solidify and form into green pellets in the coagulation liquid. The green pellets formed in the coagulation vessel are thus formed without the necessity of a sol-gel reaction, reaction gas free fall zone, foamed layer of reaction liquid or reaction liquid directed onto the droplets prior to entering the reaction liquid bath.

The slurry in the feed tank 702 can have any suitable solids content. The solids content of the slurry can range from about 15%, about 20%, about 25%, or about 35% to about 55%, about 65%, about 75%, or about 85%. In one or more exemplary embodiments, the solids content can be from about 25% to about 75%. The viscosity of the slurry can be from about 1, about 10, about 25, about 50, about 100, or about 250 to about 500, about 750, about 1,000, about 2,500 centipoise (cP) or more. Adjusting the viscosity of the slurry can aid in improving droplet formation and formation of spherical particles. The viscosity of the slurry can be optimized or adjusted via selection of reactant type and/or reactant concentration. Optimization of the dispersant type and concentration can also reduce the viscosity of the slurry. Dispersants can be selected based on cost, availability and effectiveness in reducing the viscosity of a selected slurry. Dispersants that can be used to reduce the viscosity of the slurry include sodium silicate, ammonium polyacrylate, sodium polymethacrylate, sodium citrate, sodium polysulfonate and hexametaphosphate.

The slurry in the feed tank 702 can also contain any suitable reactant that will react with a component in the coagulation liquid in coagulation vessel 706 to form a semi-solid or insoluble compound. This reactant can be or include a monosaccharide, a disaccharide, a polysaccharide, citric acid, methylcellulose, polyvinyl alcohol, polyvinyl acetate, or borate fluids or any combination or mixture thereof. In one or more exemplary embodiments, the reactant is a polysaccharide, such as sodium alginate. Sodium alginate is a naturally occurring polysaccharide that is soluble in water as the sodium salt but is cross-linked to form a gel as the calcium salt.

In one or more exemplary embodiments, the reactant can be or include any suitable polymer or co-polymer with a divalent exchange mechanism. The reactant can be or include poly(ethylene oxide), ethylene-vinyl acetate copolymers, carboxylic acid polymers and copolymers, acrylate polymers and copolymers, and methacrylate polymers and copolymers. In one or more exemplary embodiments, the reactant can be or include any suitable divalent polymer or co-polymer. In one or more exemplary embodiments, the reactant can be or include poly(maleic acid) (PMA), poly (acrylic acid) (PAA), or any combination thereof. For example, the reactant can be or include a PMA:PAA copolymer.

The slurry can include the reactant in any suitable amounts. The slurry can have a reactant concentration of about 0.01 wt %, about 0.05 wt %, about 0.1 wt %, about 0.25 wt %, about 0.5 wt %, about 0.8 wt %, about 1.2 wt %, or about 1.5 wt % to about 1.8 wt %, about 2 wt %, about 2.5 wt %, about 3 wt %, about 4 wt %, about 5 wt %, about 6 wt %, or about 8 wt %. In one or more exemplary embodiments, the slurry reactant concentration can be from about 0.2 wt % to about 4 wt %, about 0.4 wt % to about 2.8 wt %, about 0.6 wt % to about 2.4 wt %, about 0.8 wt % to about 1.8 wt %, or about 1.2 wt % to about 1.6 wt %.

Coagulation tank 706 can contain a coagulation liquid which gels the reactant chemical in the slurry. In other words, the coagulation liquid can include any suitable coagulation agent which gels the reactant. The coagulation agent can also be or include any cationic material suitable for ion exchange with the reactant. The coagulation agent can be or include a divalent, trivalent or higher cationic material. In one or more exemplary embodiments, the coagulation agent can be or include one or more salts of calcium, magnesium, strontium, aluminum, and/or iron. For example, the coagulation agent can be or include one or more of calcium chloride, magnesium chloride, or the like. The coagulation liquid can be or include an aqueous solution containing the coagulation agent. The coagulation liquid can have a coagulation agent concentration of about 0.01 wt %, about 0.05 wt %, about 0.1 wt %, about 0.5 wt %, about 1 wt %, about 2 wt %, or about 4 wt % to about 6 wt %, about 8 wt %, about 10 wt %, about 15 wt %, or about 20 wt % or more. In one or more exemplary embodiments, a coagulation liquid for sodium alginate is a calcium chloride solution at concentration levels of 0.5% to 10% by weight.

In one or more exemplary embodiments, the coagulation liquid in the coagulation tank 706 can contain a coagulation agent, a reducing agent and/or an electrically-conductive material. In one or more exemplary embodiments, the slurry disclosed herein can also contain a reducing agent and/or an electrically-conductive material.

The diameter of nozzle 704, the viscosity of the slurry, the ceramic particle content of the slurry, pressure to feed the slurry to the nozzle, along with the frequency and amplitude of vibration applied by vibrator source are adjusted to produce droplets having a desired size. These variables are preferably set at a constant value as spheres are produced to be formed into a batch of pellets of proppant material. Different batches may be produced having different size pellets. Preferably, each batch will be monosized (i.e., contained on a single sieve such as passing through a 20 mesh sieve but staying on a 25 mesh sieve). The pressure used to feed slurry to the nozzle is adjusted to create laminar flow through the nozzle. The feed pressure can range from 1 to 50 psi. The frequency is adjusted for each set of slurry conditions such that a resonance is established in the slurry stream exiting the nozzle that then produces spherical droplets. The frequency can range from 10 to 20,000 Hz. The pressure and frequency are optimized iteratively to create uniform spherical shapes. The amplitude is adjusted to improve the uniform shape of the spherical droplets formed. The flow rate of the slurry through a nozzle is a function of the nozzle diameter, slurry feed pressure, and the slurry properties such as viscosity and density. For example, for kaolin and alumina slurries through nozzles up to 500 microns in diameter, the flow rate per nozzle can range from 0.2 to 3 kg/hr, which equates to a mass flux of about 1 to about 15 kg/(mm$^2$×hr).

The distance between nozzle 704 and the top of the liquid in coagulation vessel 706 is selected to allow droplets to become spherical before reaching the top of the liquid. The distance can be from 1 to 20 cm, but is more typically in the range of 1 to 5 cm so as to reduce distortion of the droplet shape upon impact with the liquid surface, thereby eliminating the need for a reaction gas, foam layer, or tangentially directed reaction liquid prior to the droplets entering the coagulation vessel 706. The reactant chemical in the droplets of slurry reacts with the coagulation liquid in the coagulation vessel 706 and a semi-solid surface is formed on the droplets, which helps retain the spherical shape and prevents agglomeration of the pellets. Preferably, the residence time of the pellets in coagulation vessel 706 is sufficient to allow the pellets to become rigid enough to prevent deformation of the spherical shape when they are removed and dried, i.e., semi-rigid. In some embodiments, the pellets may fall into a coagulation liquid solution flowing vertically upward so that settling of the particle through the liquid will be retarded to produce a longer residence time in the coagulation vessel 706.

Green pellets formed using the drip cast system of FIG. 8 can be washed to remove excess coagulation agent and conveyed to other devices where they can be contacted with the conditioning solution(s) and/or the activation solution(s) disclosed herein to provide conditioned and/or activated green pellets. In one or more exemplary embodiments, the green pellets can be contacted with the activation solution via line 708 from an activation solution tank or vessel (not shown). The green pellets can contact the activation solution in any suitable manner. For example, the activation solution via line 708 can be sprayed or otherwise ejected onto the green pellets to provide the activated green pellets. The green pellets can also contact a liquid stream or bath of the activation solution to provide the activated green pellets. In one or more exemplary embodiments, the activated green pellets can be dried and/or calcined in the pre-sintering device 165 and later sintered in the sintering device 170 to provide the oxidized green pellets and/or proppant having catalytically active material.

The oxidized green pellets, or proppants, withdrawn from the sintering device 170 can be introduced to the plating unit 175 and immersed in the plating solution disposed therein that can include a temperature of between about 55-95° C. or between about 25-65° C. Immersion for a period of about 1 to about 30 minutes can produce a film of nickel ranging from about 0.05 micron, about 0.1 micron, about 0.25 micron, or about 0.5 micron to about 1 micron, about 2 microns, about 3 microns, or about 5 microns or more in thickness deposited on the surface of the substrate. The plating solution can be continuously resupplied to maintain a constant plating chemical concentration, or conversely, substantially exhausted as the plating reagent is deposited on the substrate, thereby fixing the thickness of the metal film and resulting in electrically-conductive proppant. The electrically-conductive proppant can be withdrawn from the plating unit 175 via line 180.

Figure 9:
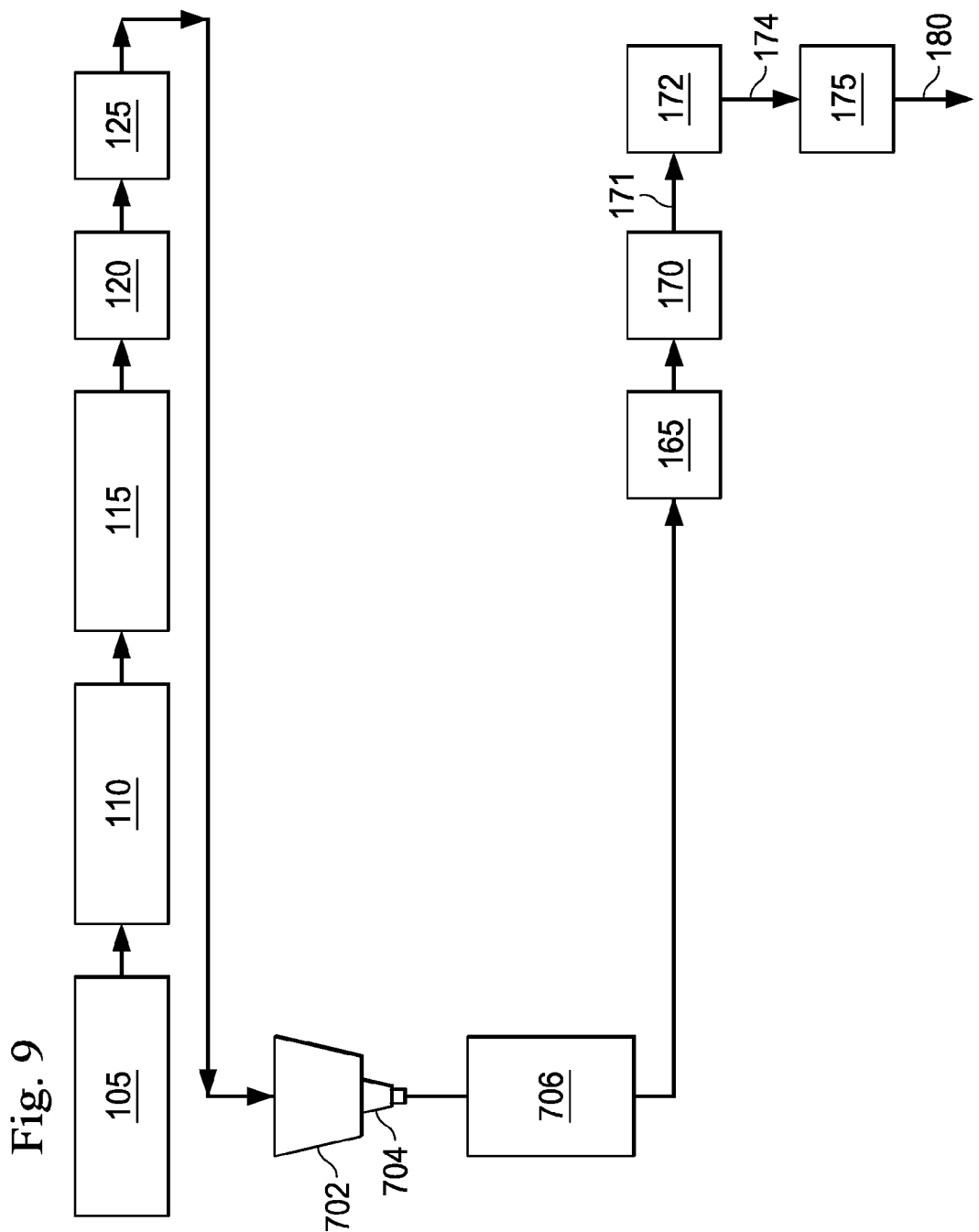
FIG. 9 is another schematic illustration of a drip cast system for preparing substantially round and spherical particles from a slurry as described herein.

FIG. 9 depicts a modified version of the drip cast system of FIG. 8 in which the sintered pellets, or proppants, are withdrawn from the sintering device 170 via line 171 to contact the activation solution in the proppant cooler 172 to provide activated proppant via line 174 from activation solution tank or vessel (not shown). For example, the activation solution can be sprayed onto the proppants in the proppant cooler 172 via one or more spray nozzles (not shown) located inside the proppant cooler 172 to provide the cooled activated proppant via line 174. The proppant cooler 172 can be or include a rotary cooler. The activation solution can be directly introduced to the spray nozzle or combined with any suitable dilution solution, such as water, to control the spray rate, spray concentration, spray distance, and spray distribution within the rotary cooler. The position of the spray nozzle within the rotary cooler can also be selected to precisely control the temperature of the proppant being contacted by the activation solution, and hence the drying rate of the activation solution on the surface of the proppant. The rotary cooler can be located adjacent the sintering device 170. The proppant cooler 172 can operate at a temperature of from about 0° C. to about 500° C., about 25° C. to about 250° C., or about 50° C. to about 150° C., for a period of time from about 5 seconds, about 15 seconds, about 30 seconds, or about 1 minute to about 5 minutes, about 10 minutes, about 20 minutes, or about 90 minutes. The activated proppant withdrawn from the proppant cooler 172 via line 174 can be introduced to the plating unit 175 and immersed in the plating solution disposed therein that can include a temperature of between about 55-95° C. or between about 25-65° C. Immersion for a period of about 1 to about 30 minutes can produce a film of nickel ranging from about 0.05 micron, about 0.1 micron, about 0.25 micron, or about 0.5 micron to about 1 micron, about 2 microns, about 3 microns, or about 5 microns or more in thickness deposited on the surface of the substrate. The plating solution can be continuously resupplied to maintain a constant plating chemical concentration, or conversely, substantially exhausted as the plating reagent is deposited on the substrate, thereby fixing the thickness of the metal film and resulting in electrically-conductive proppant. The electrically-conductive proppant can be withdrawn from the plating unit 175 via line 180.

In one or more exemplary embodiments, the green pellets and/or sintered proppants can be treated in a bath of activation solution disclosed herein at any step prior to immersion in the plating solution from plating unit 175. The activation solution can be applied to green pellets and/or proppants in any suitable manner. For example, the activation solution can be sprayed or otherwise ejected onto the green pellets and/or proppants in accordance with systems of FIGS. 8 and 9. In another example, the green pellets and/or proppants can contact a liquid stream or bath of the activation solution prior to immersion in the plating solution.

In one or more exemplary embodiments, the green pellets and/or sintered proppants can be conditioned with a conditioning solution disclosed herein at any step prior to contacting the activation solution in accordance with the systems of FIGS. 8 and 9. The conditioning solution can be applied to green pellets and/or proppants in any suitable manner. For example, the conditioning solution can be sprayed or otherwise ejected onto the green pellets and/or proppants. In another example, the green pellets and/or proppants can contact a liquid stream or bath of the conditioning solution to provide the conditioned green pellets.

In one or more exemplary embodiments, the plating unit 175 disclosed herein can include one or more spray nozzles (not shown) adapted to spray or atomize the plating solution onto the proppants in any suitable manner. In one or more exemplary embodiments, the plating unit 175 can be supplemented or replaced with one or more spray nozzles adapted to spray the plating solution onto the green pellets and/or proppants. For example, the spray nozzles can be located at any suitable stage of any of the processes illustrated in FIGS. 4-9. The spray nozzles can spray the plating solution onto the green pellets, the calcined green pellets, the dried green pellets, and/or the sintered proppant before, during, or after the pre-sintering device 165 and/or the sintering device 170.

Figure 10:
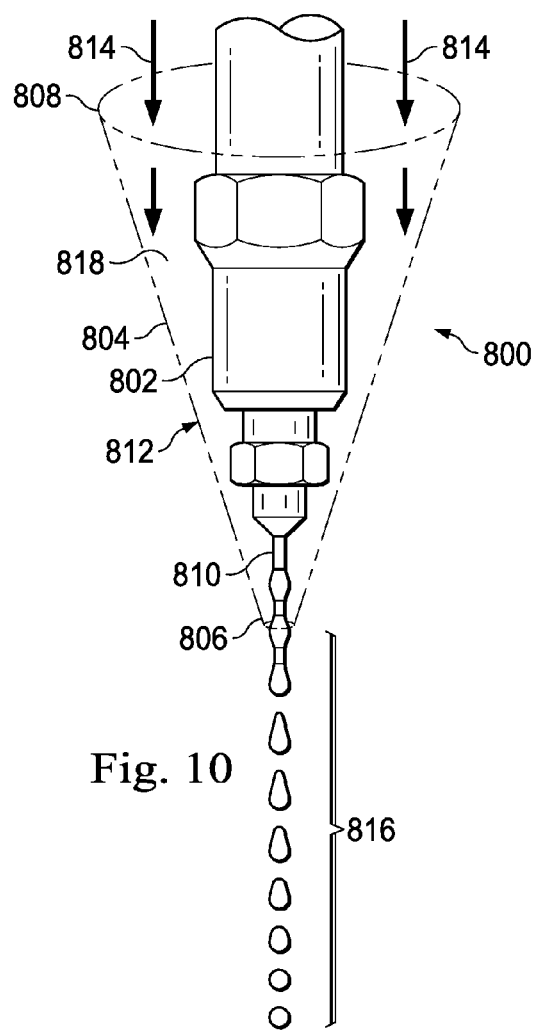
FIG. 10 is an illustration of a nozzle apparatus including a drip cast nozzle disposed within a treatment nozzle.

FIG. 10 is an illustration of a nozzle apparatus 800 including a drip cast nozzle 802 disposed within a treatment nozzle 804. The drip cast nozzle 802 can include a terminal end 810 from which slurry droplets are expelled. In one or more exemplary embodiments, the drip cast nozzle 802 can be same as or similar to the nozzle 704. The drip cast nozzle 802 can be disposed within the treatment nozzle 804 such that a circumference of the treatment nozzle 804 surrounds the drip cast nozzle 802. The drip cast nozzle 802 and the treatment nozzle 804 can be axially aligned with one another. A gap or annulus 818 can exist between an inner surface of the treatment nozzle 804 and an outer surface of the drip cast nozzle 802. The treatment nozzle 804 can have any suitable shape. For example, the treatment nozzle 804 can be or include a cylindrical and/or frusto-conical body having a first end 808 and a second end 806. The second end 806 of the treatment nozzle 804 can be disposed proximate the terminal end 810 of the drip cast nozzle 802.

In exemplary operation, a liquid, such as the conditioning solution(s) and/or the activation solution(s) disclosed herein, can be introduced to the treatment nozzle 804 via the first end 808 in a direction as indicated by arrows 814. The liquid can form a liquid film 812 on the inner surface of the treatment nozzle 804 that flows through at least a portion of the annulus 818 toward the second end 806. When the liquid film 812 approaches the second end 806, the liquid film contacts and envelopes around droplets exiting the drip cast nozzle 802 to provide coated droplets 816. The coated droplets 816 fall and then enter a coagulation vessel where the coated droplets 816 partially solidify to form activated and/or conditioned green pellets in accordance with the drip cast method(s) disclosed herein.

Figure 11:
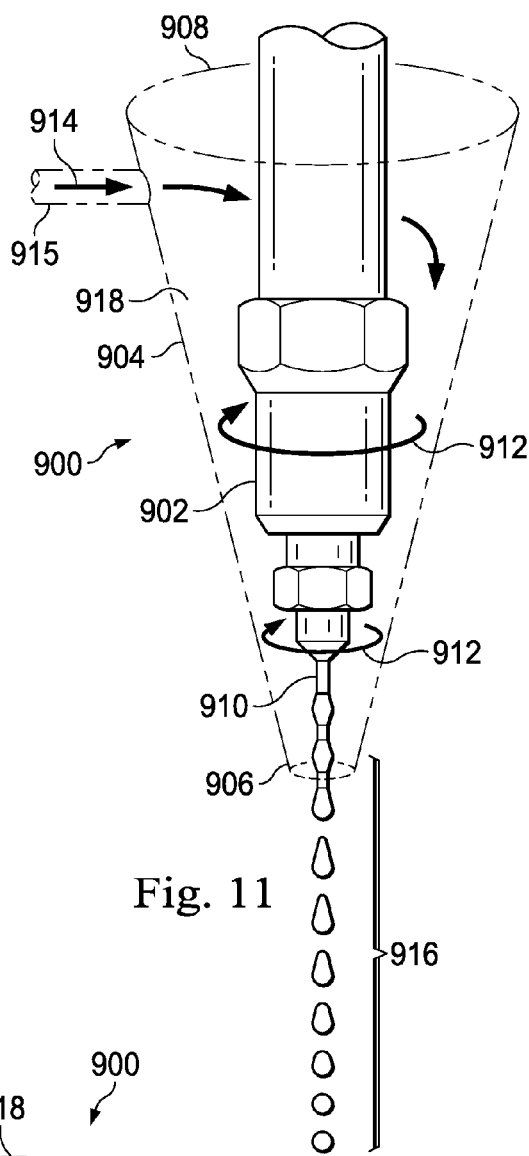
FIG. 11 is an illustration of another nozzle apparatus including a drip cast nozzle disposed within a treatment nozzle having an inlet.
Figure 12:
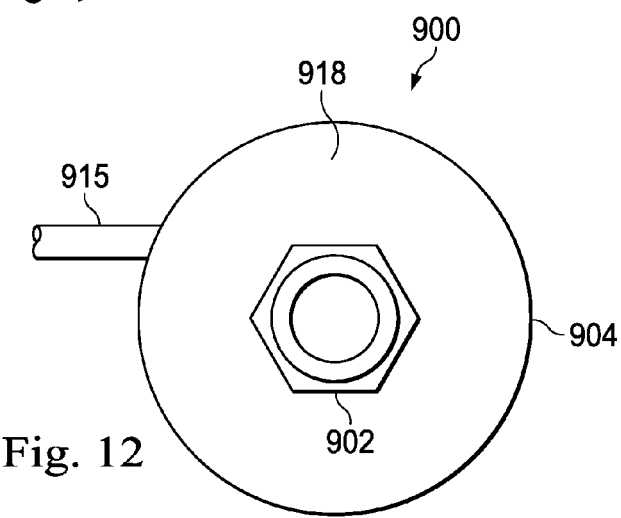
FIG. 12 depicts a top view of the nozzle apparatus of FIG. 11.

FIG. 11 is an illustration of a nozzle apparatus 900 including a drip cast nozzle 902 disposed within a treatment nozzle 904 having an inlet 915. FIG. 12 depicts a top view of the nozzle apparatus 900 showing inlet 915 tangentially coupled to the treatment nozzle 904. The drip cast nozzle 902 can include a terminal end 910 from which slurry droplets are expelled. In one or more exemplary embodiments, the drip cast nozzle 902 can be same as or similar to the nozzles 704, 802. The drip cast nozzle 902 can be circumferentially disposed about the treatment nozzle 904. The drip cast nozzle 902 and the treatment nozzle 904 can be axially aligned with one another. A gap or annulus 918 can exist between an inner surface of the treatment nozzle 904 and an outer surface of the drip cast nozzle 902. The treatment nozzle 904 can have any suitable shape. For example, the treatment nozzle 904 can be or include a cylindrical and/or frusto-conical body having a first end 908 and a second end 906. The second end 906 of the treatment nozzle 904 can be disposed proximate the terminal end 910 of the drip cast nozzle 902.

In exemplary operation, a liquid, such as the conditioning solution(s) and/or the activation solution(s) disclosed herein, can be tangentially introduced to the treatment nozzle 904 via the inlet 915 that is fluidly coupled to the treatment nozzle 904 proximate the first end 908 in a direction as indicated by arrow 914. The liquid can form a liquid film on the inner surface of the treatment nozzle 904 that flows in the form of a vortex through at least a portion of the annulus 918 toward the second end 906 as indicated by arrows 912. When the liquid film reaches the second end 906, the liquid film contacts and envelopes around droplets exiting the drip cast nozzle 902 to provide coated droplets 916. The coated droplets 916 fall and then enter a coagulation vessel where the coated droplets 916 partially solidify to form activated and/or conditioned green pellets in accordance with the drip cast method(s) disclosed herein.

Figure 13:
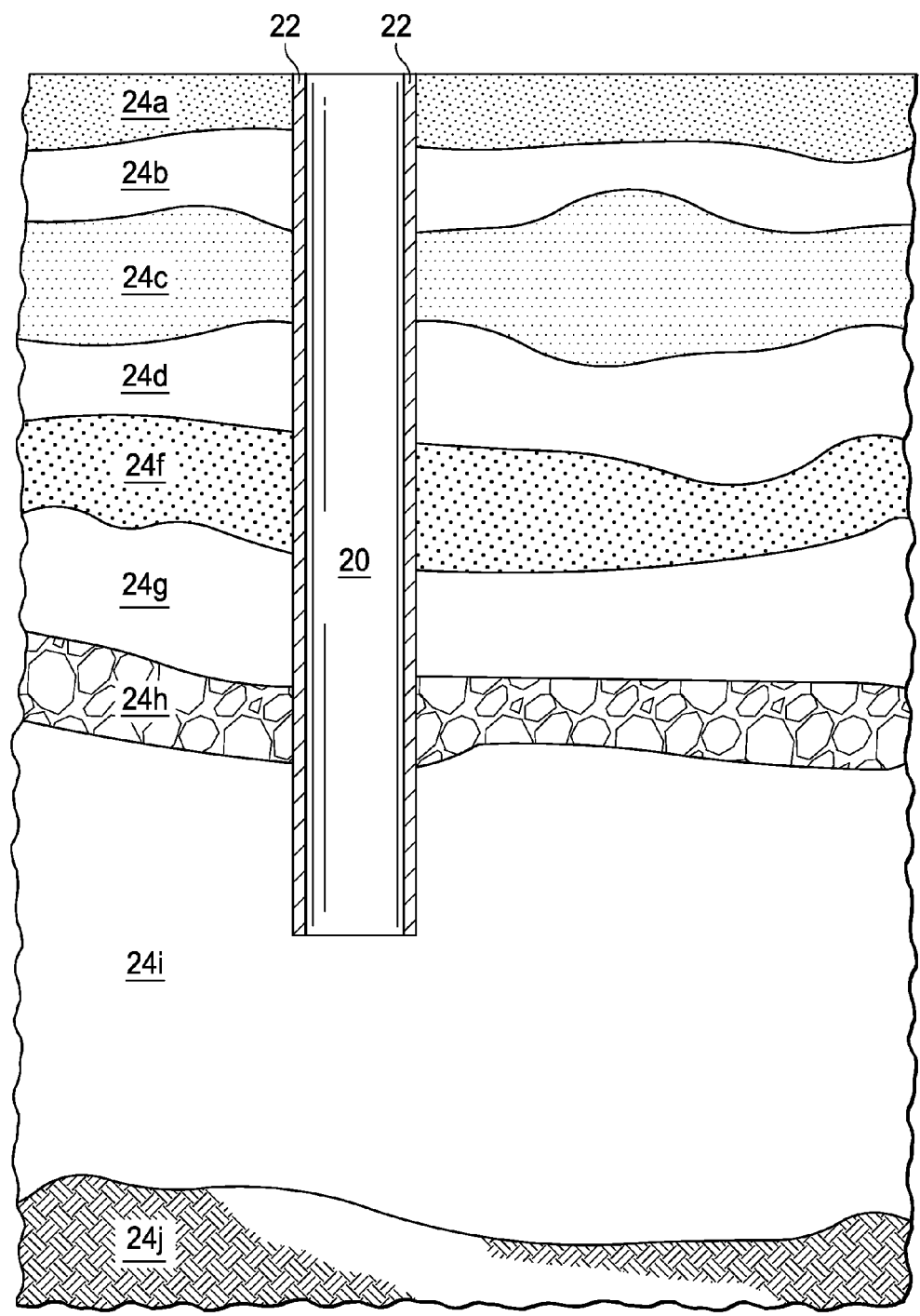
FIG. 13 is a diagram of the geometric layout of a vertical or deviated well in which layers of the earth having varying electrical and mechanical properties are depicted.

The electromagnetic methods described herein involve electrically energizing the earth at or near a fracture at depth and measuring the electric and magnetic responses at the earth's surface or in adjacent wells/boreholes. The electromagnetic methods described herein are typically used in connection with a cased wellbore, such as well 20 shown in FIG. 13. Specifically, casing 22 extends within well 20 and well 20 extends through geological strata 24a-24d and 24f-24i in a manner that has three dimensional components.

Figure 14:
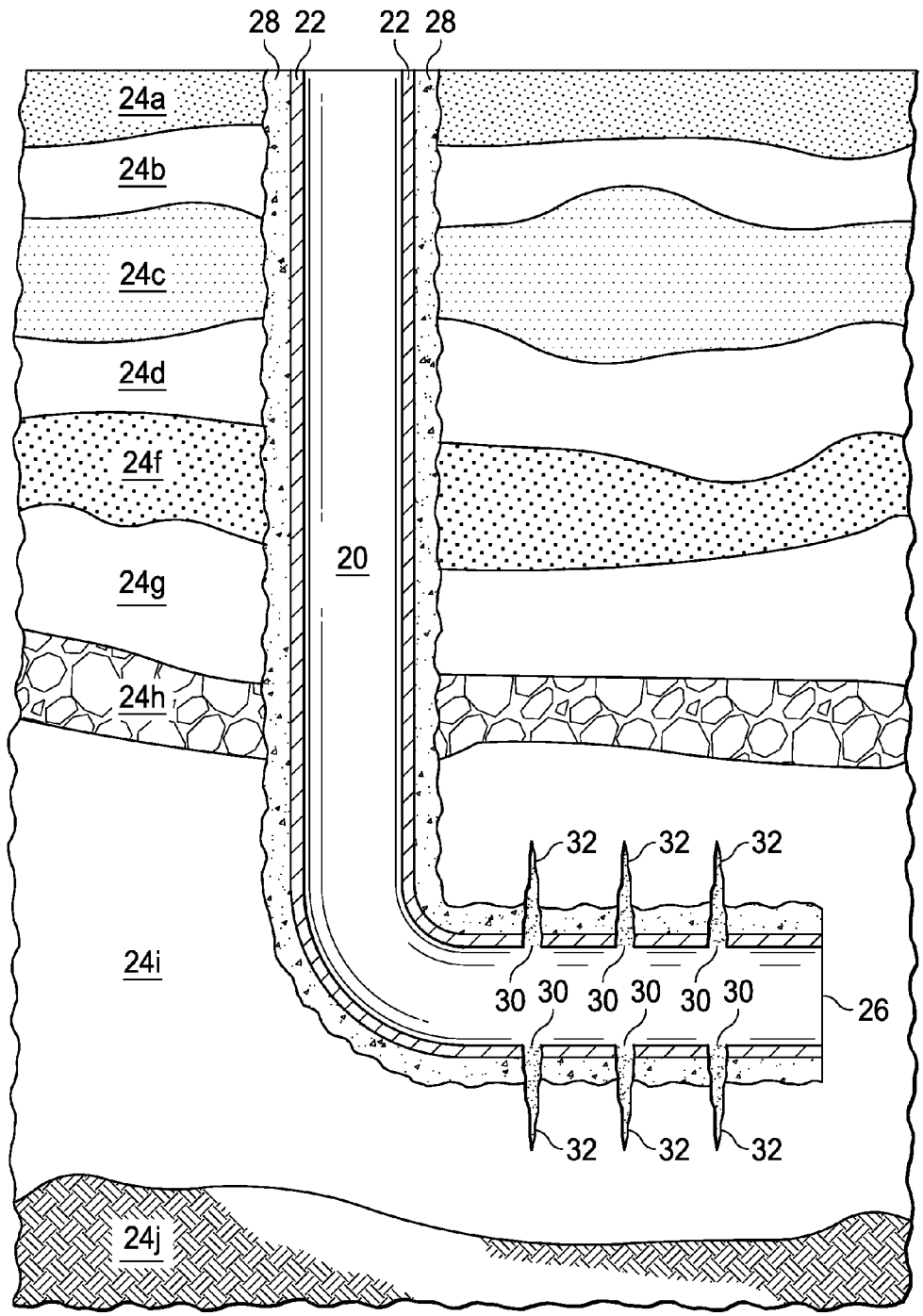
FIG. 14 is a schematic of an installed horizontal wellbore casing string traversing a hydrocarbon bearing zone with proppant filled fractures in which layers of the earth having varying electrical and mechanical properties are depicted.

Referring now to FIG. 14, a partial cutaway view is shown with production well 20 extending vertically downward through one or more geological layers 24a-24d and 24f-24i and horizontally in layer 24i. While wells are conventionally vertical, the electromagnetic methods described herein are not limited to use with vertical wells. Thus, the terms "vertical" and "horizontal" are used in a general sense in their reference to wells of various orientations.

The preparation of production well 20 for hydraulic fracturing can include drilling a bore 26 to a desired depth and then in some cases extending the bore 26 horizontally so that the bore 26 has any desired degree of vertical and horizontal components. A casing 22 can be cemented 28 into well 20 to seal the bore 26 from the geological layers 24a-24d and 24f-24i in FIG. 14. The casing 22 can have a plurality of perforations 30 and/or sliding sleeves (not shown). The perforations 30 are shown in FIG. 14 as being located in a horizontal portion of well 20 but those of ordinary skill in the art will recognize that the perforations can be located at any desired depth or horizontal distance along the bore 26, but are typically at the location of a hydrocarbon bearing zone in the geological layers 24, which may be within one or more of the geological layers 24a-24d and 24f-24j. Those of ordinary skill in the art will also recognize that the well 20 can include no casing, such as in the case of an open-hole well. The hydrocarbon bearing zone may contain oil and/or gas, as well as other fluids and materials that have fluid-like properties. The hydrocarbon bearing zone in geological layers 24a-24d and 24f-24j is hydraulically fractured by pumping a fluid into casing 22 and through perforations 30 at sufficient rates and pressures to create fractures 32 and then incorporating into the fluid an electrically-conductive proppant which will prop open the created fractures 32 when the hydraulic pressure used to create the fractures 32 is released.

The hydraulic fractures 32 shown in FIG. 14 are oriented radially away from the metallic well casing 22. This orientation is exemplary in nature. In practice, hydraulically-induced fractures 32 may be oriented radially as in FIG. 14, laterally or intermediate between the two. Various orientations are exemplary and not intended to restrict or limit the electromagnetic methods described herein in any way.

According to certain embodiments of the electromagnetic method of the present invention and as shown schematically in FIG. 15, electric current is carried down wellbore 20 to an energizing point which will generally be located within 10 meters or more (above or below) of perforations 30 in casing 22 via a seven strand wire line insulated cable 34, such as those which are well known to those of ordinary skill in the art and are widely commercially available from Camesa Wire, Rochester Wire and Cable, Inc., WireLine Works, Novametal Group, and Quality Wireline & Cable Inc. In other exemplary embodiments, the wire line insulated cable 34 can contain 1 to 6 strands or 8 or more strands. A sinker bar 36 connected to the wire line cable 34 contacts or is in close proximity to the well casing 22 whereupon the well casing 22 becomes a current line source that produces subsurface electric and magnetic fields. In other exemplary embodiments, the wire line cable 34 can be connected to or otherwise attached to a centralizer and/or any other suitable downhole tool in addition to or in lieu of the sinker bar 26. These fields interact with the fracture 32 containing electrically-conductive proppant to produce secondary electric and magnetic fields that will be used to detect, locate, and characterize the proppant-filled fracture 32.

Figure 15:
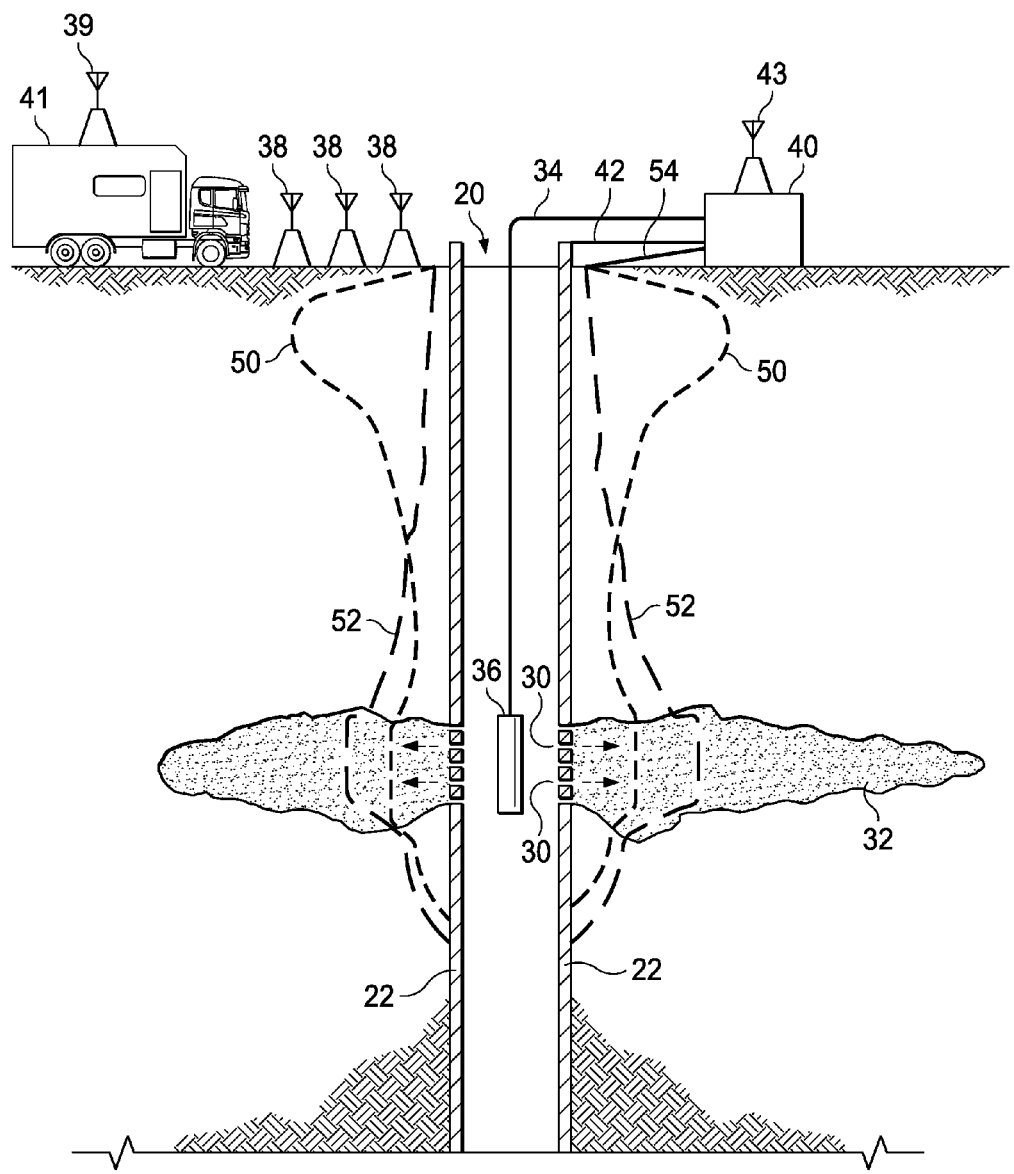
FIG. 15 is a schematic cross-sectional illustration of a hydraulic fracture mapping system which depicts two embodiments for introducing electric current into a wellbore, namely energizing the wellbore at the surface and energizing via a wireline with a sinker bar near perforations in the wellbore.

According to certain embodiments of the electromagnetic method of the present invention and as shown schematically in FIG. 15, a power control box 40 is connected to casing 22 by a cable 42 so that electric current is injected into the fracture well 20 by directly energizing the casing 22 at the well head. In one embodiment, the power control box 40 is connected wirelessly by a receiver/transmitter 43 to a receiver/transmitter 39 on equipment truck 41. Those of ordinary skill in the art will recognize that other suitable means of carrying the current to the energizing point may also be employed.

Figure 16:
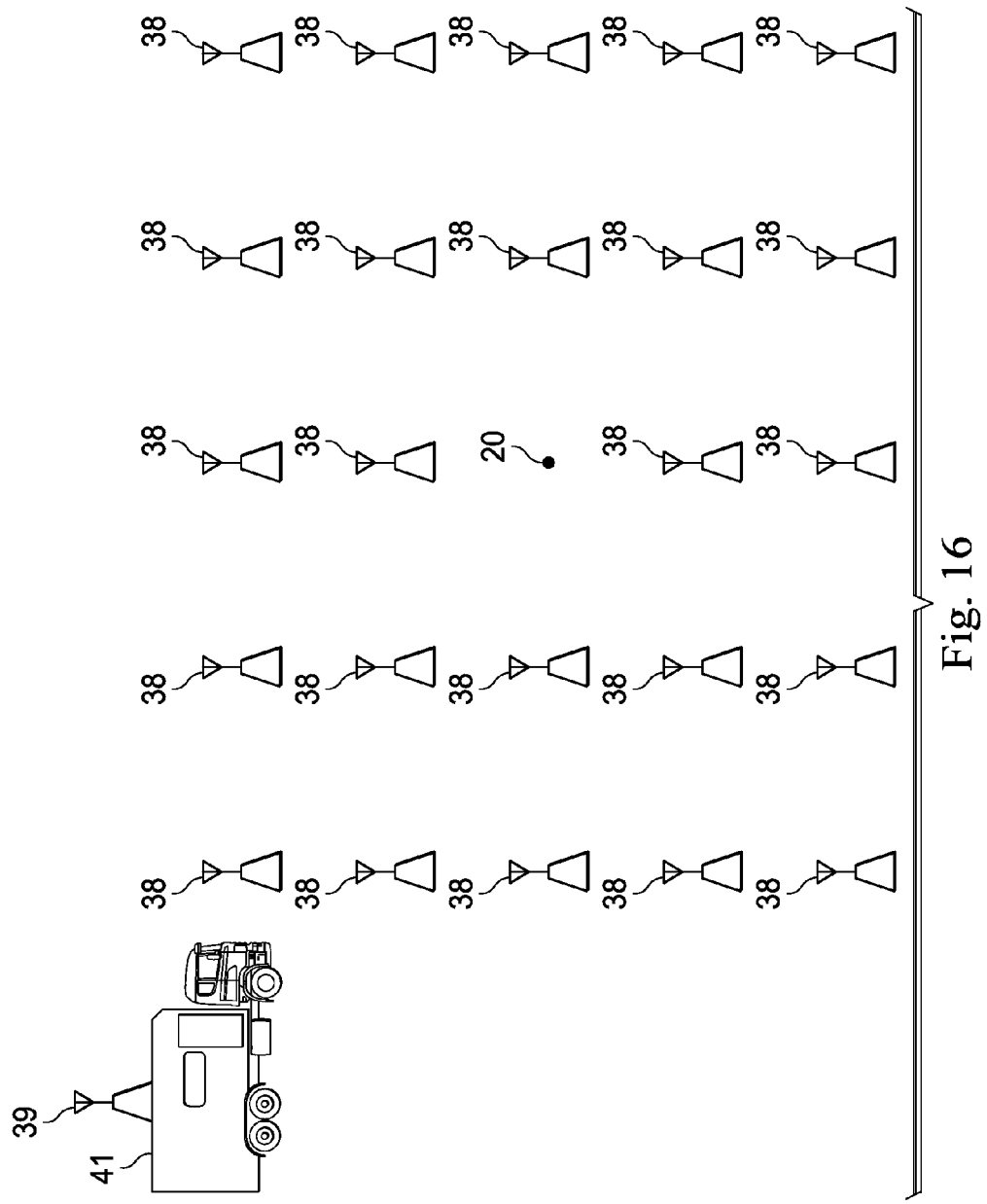
FIG. 16 is a schematic plan illustration of a hydraulic fracture mapping system.

As shown schematically in FIGS. 15-17, a plurality of electric and magnetic field sensors 38 will be located on the earth's surface in a rectangular or other suitable array covering the area around the fracture well 20 and above the anticipated fracture 32. In one embodiment, the sensors 38 are connected wirelessly to a receiver/transmitter 39 on equipment truck 41. The maximum dimension of the array (aperture) in general should be at least 80 percent of the depth to the fracture zone. The sensors 38 will measure the x, y and z component responses of the electric and magnetic fields. It is these responses that will be used to infer location and characterization of the electrically-conductive proppant through comparison to numerical simulations and/or inversion of the measured data to determine the source of the responses. The responses of the electric and magnetic field components will depend upon: the orientation of the fracture well 20, the orientation of the fracture 32, the electrical conductivity, magnetic permeability, and electric permittivity of layers 24a-24d and 24f-24j, the electrical conductivity, magnetic permeability, and electric permittivity of the proppant filled fracture 32, and the volume of the proppant filled fracture 32. Moreover, the electrical conductivity, magnetic permeability and electric permittivity of the geological layers residing between the surface and the target formation layers 24a-24d and 24f-24j influence the recorded responses. From the field-recorded responses, details of the proppant filled fracture 32 can be determined.

In another embodiment, electric and magnetic sensors can be located in adjacent well/boreholes.

Figure 18A:
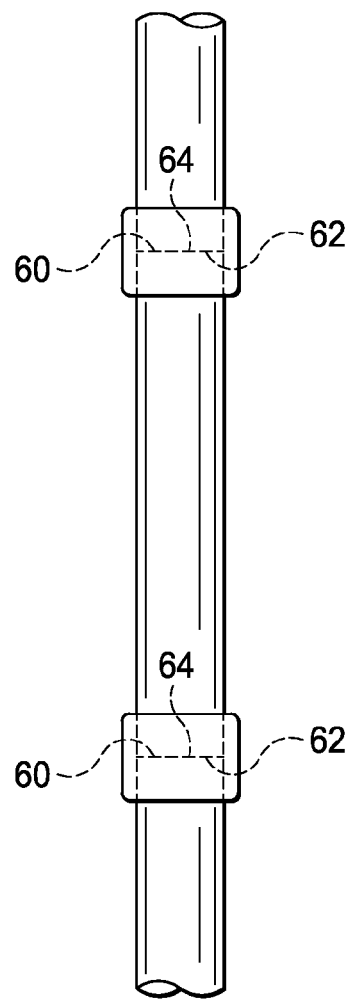
FIG. 18A is a schematic illustration of an electrically insulated casing joint.
Figure 18B:
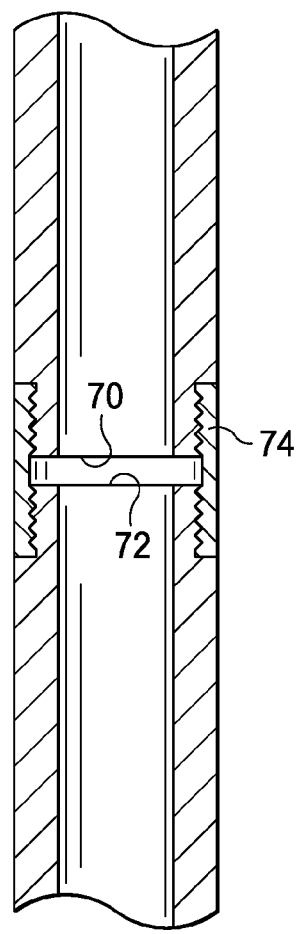
FIG. 18B is a schematic illustration of an electrically insulated casing collar.

Depending upon the conductivity of the earth surrounding the well casing 22, the current may or may not be uniform as the current flows back to the surface along the well casing 22. According to both embodiments shown in FIG. 15, current leakage occurs along wellbore 20 such as along path 50 or 52 and returns to the electrical ground 54 which is established at the well head. As described in U.S. patent application Ser. No. 13/206,041 filed Aug. 9, 2011 and entitled "Simulating Current Flow Through a Well Casing and an Induced Fracture," the entire disclosure of which is incorporated herein by reference, the well casing is represented as a leaky transmission line in data analysis and numerical modeling. Numerical simulations have shown that for a conducting earth (conductivity greater than approximately 0.05 siemens per meter (S/m)), the current will leak out into the formation, while if the conductivity is less than approximately 0.05 S/m the current will be more-or-less uniform along the well casing 22. As shown in FIGS. 18A and 18B, to localize the current in the well casing 22, electrically insulating pipe joints or pipe collars may be installed. According to the embodiment shown in FIG. 18A, an insulating joint can be installed by coating the mating surfaces 60 and 62 of the joint with a material 64 having a high dielectric strength, such as any one of the well-known and commercially available plastic or resin materials which have a high dielectric strength and which are of a tough and flexible character adapted to adhere to the joint surfaces so as to remain in place between the joint surfaces. As described in U.S. Pat. No. 2,940,787, the entire disclosure of which is incorporated herein by reference, such plastic or resin materials include epoxies, phenolics, rubber compositions, and alkyds, and various combinations thereof. Additional materials include polyetherimide and modified polyphenylene oxide. According to the embodiment shown in FIG. 18B, the mating ends 70 and 72 of the joint are engaged with an electrically-insulated casing collar 74. The transmission line representation is able to handle various well casing scenarios, such as vertical only, slant wells, vertical and horizontal sections of casing, and, single or multiple insulating gaps.

The detection, location, and characterization of the electrically-conductive proppant in a fracture will depend upon several factors, including but not limited to the net electrical conductivity of the fracture, fracture volume, the electrical conductivity, magnetic permeability, and electric permittivity of the earth surrounding the fracture and between the fracture and surface mounted sensors. The net electrical conductivity of the fracture means the combination of the electrical conductivity of the fracture, the proppant and the fluids when all are placed in the earth minus the electrical conductivity of the earth formation when the fracture, proppant and fluids were not present. Also, the total electrical conductivity of the proppant filled fracture is the combination of the electrical conductivity created by making a fracture, plus the electrical conductivity of the new/modified proppant plus the electrical conductivity of the fluids, plus the electro-kinetic effects of moving fluids through a porous body such as a proppant pack. The volume of an overly simplified fracture with the geometric form of a plane can be determined by multiplying the height, length, and width (i.e. gap) of the fracture. A three dimensional (3D) finite-difference electromagnetic algorithm that solves Maxwell's equations of electromagnetism can be used for numerical simulations. In order for the electromagnetic response of a proppant-filled fracture at depth to be detectable at the Earth's surface, the net fracture conductivity multiplied by the fracture volume within one computational cell of the finite difference (FD) grid must be larger than approximately 100 Sm² for a Barnett shale-like model where the total fracture volume is approximately 38 m³. For the Barnett shale model, the depth of the fracture is 2000 m. These requirements for the numerical simulations can be translated to properties in a field application for formations other than the Barnett shale.

The propagation and/or diffusion of electromagnetic (EM) wavefields through three-dimensional (3D) geological media are governed by Maxwell's equations of electromagnetism.

According to one embodiment of the present invention, the measured three dimensional components of the electric and magnetic field responses can be analyzed with imaging methods such as an inversion algorithm based on Maxwell's equations and electromagnetic migration and/or holography to determine proppant pack location. Inversion of acquired data to determine proppant pack location involves adjusting the earth model parameters, including but not limited to the proppant location within a fracture or fractures and the net electrical conductivity of the fracture, to obtain the best fit to forward model calculations of responses for an assumed earth model. As described in Bartel, L. C., Integral wave-migration method applied to electromagnetic data, SEG Technical Program Expanded Abstracts, 1994, 361-364, the electromagnetic integral wave migration method utilizes Gauss's theorem where the data obtained over an aperture is projected into the subsurface to form an image of the proppant pack. Also, as described in Bartel, L. C., Application of EM Holographic Methods to Borehole Vertical Electric Source Data to Map a Fuel Oil Spill, SEG Technical Program Expanded Abstracts, 1987, 49-51, the electromagnetic holographic method is based on the seismic holographic method and relies on constructive and destructive interferences where the data and the source wave form are projected into an earth volume to form an image of the proppant pack. Due to the long wavelengths of the low frequency electromagnetic responses for the migration and holographic methods, it may be necessary to transform the data into another domain where the wavelengths are shorter. As described in Lee, K. H., et al., A new approach to modeling the electromagnetic response of conductive media, Geophysics, Vol. 54, No. 9 (1989), this domain is referred to as the q-domain. Further, as described in Lee, K. H., et al., Tomographic Imaging of Electrical Conductivity Using Low-Frequency Electromagnetic Fields, Lawrence Berkeley Lab, 1992, the wavelength changes when the transformation is applied.

Also, combining Maxwell's equations of electromagnetism with constitutive relations appropriate for time-independent isotropic media yields a system of six coupled first-order partial differential equations referred to as the "EH" system. The name derives from the dependent variables contained therein, namely the electric vector E and the magnetic vector H. Coefficients in the EH system are the three material properties, namely electrical current conductivity, magnetic permeability, and electric permittivity. All of these parameters can vary with 3D spatial position. The inhomogeneous terms in the EH system represent various body sources of electromagnetic waves, and include conduction current sources, magnetic induction sources, and displacement current sources. Conduction current sources, representing current flow in wires, cables, and borehole casings, are the most commonly-used sources in field electromagnetic data acquisition experiments.

An explicit, time-domain, finite-difference (FD) numerical method is used to solve the EH system for the three components of the electric vector E and the three components of the magnetic vector H, as functions of position and time. A three-dimensional gridded representation of the electromagnetic medium parameters, referred to as the "earth model" is required, and can be constructed from available geophysical logs and geological information. A magnitude, direction, and waveform for the current source are also input to the algorithm. The waveform can have a pulse-like shape (as in a Gaussian pulse), or can be a repeating square wave containing both positive and negative polarity portions, but is not limited to these two particular options. Execution of the numerical algorithm generates electromagnetic responses in the form of time series recorded at receiver locations distributed on, or within, the gridded earth model. These responses represent the three components of the E or H vector, or their time-derivatives.

Repeated execution of the finite-difference numerical algorithm enables a quantitative estimate of the magnitude and frequency-content of electromagnetic responses (measured on the earth's surface or in nearby boreholes) to be made as important modeling parameters are varied. For example, the depth of current source can be changed from shallow to deep. The current source can be localized at a point, or can be a spatially-extended transmission line, as with an electrically charged borehole casing. The source waveform can be broad-band or narrow-band in spectral content. Finally, changes to the electromagnetic earth model can be made, perhaps to assess the shielding effect of shallow conductive layers. The goal of such a modeling campaign is to assess the sensitivity of recorded electromagnetic data to variations in pertinent parameters. In turn, this information is used to design optimal field data acquisition geometries that have enhanced potential for imaging a proppant-filled fracture at depth.

The electric and magnetic responses are scalable with the input current magnitude. In order to obtain responses above the background electromagnetic noise, a large current on the order of 10 to 100 amps may be required. The impedance of the electric cable to the current contact point and the earth contact resistance will determine the voltage that is required to obtain a desired current. The contact resistance is expected to be small and will not dominate the required voltage. In addition, it may be necessary to sum many repetitions of the measured data to obtain a measurable signal level over the noise level. In the field application and modeling scenarios, a time-domain current source waveform can be used. A typical time-domain waveform consists of an on time of positive current followed by an off time followed by an on time of negative current. In other words, + current, then off, then − current, then off again. The repetition rate to be used would be determined by how long the current has to be on until a steady-state is reached or alternatively how long the energizing current has to be off until the fields have died to nearly zero. In this exemplary method, the measured responses would be analyzed using both the steady-state values and the decaying fields following the current shut-off. The advantage of analyzing the data when the energizing current is zero (decaying fields) is that the primary field contribution (response from the transmitting conductor; i.e., the well casing) has been eliminated and only the earth responses are measured. In addition, the off period of the time domain input signal permits analysis of the direct current electrical fields that can arise from electro-kinetic effects, including but not limited to, flowing fluids and proppant during the fracturing process. Fracture properties (orientation, length, volume, height and asymmetry will be determined through inversion of the measured data and/or a form of holographic reconstruction of that portion of the earth (fracture) that yielded the measured electrical responses or secondary fields. According to certain embodiments, a pre-fracture survey will be prepared to isolate the secondary fields due to the fracture. Those of ordinary skill in the art will recognize that other techniques for analyzing the recorded electromagnetic data, such as use of a pulse-like current source waveform and full waveform inversion of observed electromagnetic data can also be used.

A field data acquisition experiment was conducted to test the transmission line representation of a well casing current source. The calculated electric field and the measured electric field are in good agreement. This test demonstrates that the transmission line current source implementation in the 3D finite-difference electromagnetic code gives accurate results. The agreement, of course, depends upon an accurate model describing the electromagnetic properties of the earth. In this field data acquisition experiment, common electrical logs were used to characterize the electrical properties of the earth surrounding the test well bore and to construct the earth model.

The following examples are included to demonstrate illustrative embodiments of the present invention. It will be appreciated by those of ordinary skill in the art that the techniques disclosed in these examples are merely illustrative and are not limiting. Indeed, those of ordinary skill in the art should, in light of the present disclosure, appreciate that many changes can be made in the specific embodiments that are disclosed, and still obtain a like or similar result without departing from the spirit and scope of the invention.

Example 1

Conventional low density and medium density ceramic proppants which are commercially available from CARBO Ceramics Inc. of Houston, Tex. under the trade names CARBOLITE® (CL) 20/40, CARBOHYDROPROP® (HP or HYDROPROP) 40/80, CARBOPROP® 20/40 and CARBOPROP 40/70 were coated with thin layers of metals using RF magnetron sputtering. Three metal targets were used for the depositions, namely aluminum, copper and nickel. The depositions were performed in a sputter chamber using a 200 W RF power, a deposition pressure of 5 mTorr, and an argon background flow rate of 90 sccm. The sputter chamber had three articulating 2 inch target holders that can be used to coat complex shapes. The system also had a rotating, water-cooled sample stage that was used in a sputter-down configuration. Prior to coating the proppants, deposition rates for the three metals were determined by sputtering the metals onto silicon wafers and measuring the coating thickness by scanning electron microscope (SEM) cross-sectional analysis with a Zeiss Neon 40 SEM.

The proppants were loaded into the sputter chamber in a 12 inch diameter aluminum pan with 1 inch tall sides. Approximately 130 g of proppant was used for each coating run. This amount of proppant provided roughly a single layer of proppant on the base of the pan. The proppant was "stirred" during the deposition using a 6 inch long fine wire metal that was suspended above the pan and placed into contact with the proppant in the pan. The coating deposition times were doubled compared to what was determined from the silicon wafer coating thickness measurements to account for roughly coating the proppants on one side, rolling them over, and then coating the other side. Coatings of approximately 100 nm and approximately 500 nm were deposited on each type of proppant with each of the three metals.

Following the coating process, the proppant was inspected visually and by optical microscopy. The results indicated that the proppant having a thinner coating of approximately 100 nm had a generally non-uniform coating while the proppant with the thicker coating of approximately 500 nm had a uniform coating.

Example 2

Conventional low density and medium density ceramic proppants which are commercially available from CARBO Ceramics Inc. of Houston, Tex. under the trade names CARBOLITE 20/40, CARBOHYDROPROP 40/80, CARBOPROP 20/40 and CARBOPROP 40/70 were sensitized and activated by immersing in a 2.0% stannous chloride solution for about 3 minutes, rinsing in water, immersing in a 0.01% palladium chloride solution for about 3 minutes and finally thoroughly rinsing in water.

An electroless nickel plating bath solution was prepared that included 25 g of nickel sulphate hexahydrate, 20 g of sodium hypophosphate, 11 g. of sodium citrate dihydrate and 10 g of sodium acetate per liter of distilled water. The pH of the plating bath was adjusted to 5 using sulfuric acid and the plating bath was then heated to a temperature of 90° C. The previously sensititized and activated proppant samples were then added to the bath and coated for 1-30 minutes to yield an electrically-conductive nickel coated proppant. Following the coating process, the coated proppant samples were inspected visually and by optical microscopy.

Example 3

Conventional low density and medium density ceramic proppants which are commercially available from CARBO Ceramics, Inc. of Houston, Tex. under the trade names CARBOLITE 20/40, CARBOHYDROPROP 40/80, CARBOPROP 20/40 and CARBOPROP 40/70 were sensitized and activated by immersing in a 2.0% stannous chloride solution for about 3 minutes, rinsing in water, immersing in a 0.01% palladium chloride solution for about 3 minutes and finally thoroughly rinsing in water.

An electroless copper plating bath solution was prepared that included 53 g of potassium sodium tartrate, 19 g of copper sulfate, 13 g of sodium hydroxide and 21 g of sodium carbonate per liter of distilled water. The plating bath was then prepared by adding 10-40 ml of formaldehyde per liter of the concentrate. The plating bath was then heated to 45° C. The previously sensitized and activated proppants were then added to the bath and coated for 1-30 minutes to yield an electrically-conductive copper-coated proppant. Following the coating process, the coated proppant samples were inspected visually and by optical microscopy.

Example 4

In this example, 57 grams of CARBOLITE 20/40 was immersed in 20 ml of deionized water containing 10 mg of sodium borohydride and 1 μL of Tween™ 20 (PEG(20) sorbitan monolaurate). This mixture was then evaporated onto the surface of the particles by drying in an 85° C. oven. These dried particles were then transferred to a bath formed from the Caswell Electroless Nickel Plating Kit, which is commercially available from Caswell Inc. of Lyons, N.Y., where plating initiated instantaneously. This example demonstrates that the surface of the ceramic particles can be activated without the use palladium or other precious metals.

It was found that the surface of the particles can be activated by soaking the particles in a reducing agent solution, such as sodium borohydride or sodium cyanoborohydride, where this solution can either be dried onto the particles or the particles moistened with this solution can be transferred to an electroless plating bath, both of which are sufficient to induce plating.

Example 5

It was found that certain ceramic mixtures used to make proppants contain a significant amount of oxidized iron, or iron moieties. These iron moieties can be reduced to elemental iron, which is catalytically active to copper and nickel electroless plating solutions. In this example, 57 grams of CARBOPROP 20/40 was placed into an alumina boat that was inserted into a tube furnace under an atmosphere of 5% hydrogen in argon. The temperature was raised to 700° C. over a period of two hours and the CARBOPROP 20/40 was permitted to soak for two hours. The furnace was permitted to cool naturally and the sample was in a condition to be plated after removal from the furnace.

This example shows that by utilizing native iron content, proppant particles can be plated without the need for additional activators, such as Pd. The reduction of surface iron ions to atomic iron can be induced near the end of a manufacturing process by maintaining a reducing environment in a kiln, which can be characterized by the presence of carbon monoxide or other products of partial combustion. The iron on the surface of the proppant particles can also be reduced after manufacturing by exposure to carbon monoxide or hydrogen at elevated temperatures, which can be from about 300° C. to about 1100° C. Finally, the iron on the surface of the particles can be reduced by placing the particles in a solution of a reducing agent, such as sodium borohydride. After reduction of these surface iron sites, the particles can be plated using electroless plating solutions.

When used as a proppant, the particles described herein can be handled in the same manner as conventional proppants. For example, the particles can be delivered to the well site in bags or in bulk form along with the other materials used in fracturing treatment. Conventional equipment and techniques can be used to place the particles in the formation as a proppant. For example, the particles are mixed with a fracture fluid, which is then injected into a fracture in the formation.

Example 6

Conventional low density ceramic proppants which are commercially available from CARBO Ceramics Inc. of Houston, Tex. under the trade names of CARBOLITE 20/40 and CARBOHYDROPROP 40/80 were coated with thin layers of a conductive polymer using a planetary bench mixer with a "B" flat beater and a heating mantle. Approximately 500 g of proppant was used for each coating run. Coatings of 0.1% by weight and 0.4% by weight of the proppant were prepared as shown in Table I below:

TABLE I

| Conductive polymer | 0.1% coating | 0.4% coating |
|---|---|---|
| PEDOT:PSS<br>Obtained from Sigma-Aldrich as a 1.2% solution in water | 42 g | 167 g |

TABLE I-continued

| Conductive polymer | 0.1% coating | 0.4% coating |
|---|---|---|
| PANI<br>Obtained from Sigma-Aldrich in an emeraldine base, as a 5% solution in tetrahydrofuran (THF) and doped with a 4-dodecylbenzene sulfonic acid in a 1:1 molar ratio | 10 g | 40 g |
| PPY<br>Obtained from Sigma-Aldrich as a doped 5% dispersion in water | 10 g | 40 g |

In each case, the proppant was heated to a temperature of 150-200° C. in an oven and was added to a steel mixing bowl. An adhesion promoter, such as aminopropyl triethoxy silane, an amino-functional coupling agent, and glycidyloxypropyl trimethoxy silane, a functional organosilane coupling agent, was added to the heated proppant to enhance the bond between the inorganic substrate and the organic polymer. The mixing bowl was set in an external heating mantle to allow the heat to remain in the system as additives were added. The "B" flat beater traveled along the side of the wall surfaces of the mixing bowl in circular orbits at an intermediate speed of approximately 280 rpm while the mixing bowl stayed in place, thereby allowing complete mixing in a short time. A typical batch schedule is shown in Table II below:

TABLE II

Coating Schedule on Ceramics:

| Ingredient | Time of Addition |
|---|---|
| Substrate | 0 s |
| Adhesion Promoter | 7 s |
| Conductive Polymer | 15 s |
| End Cycle | 5-10 min |

Additionally, 0.1% and 0.4% coatings were made by adding PEDOT:PSS to a phenol-formaldehyde (Novolac) coating using a planetary mixer with "B" flat beater and a heating mantle as described above. Approximately 500 g of proppant was used for each coating run. For a 0.1% and 0.4% by weight coating of the proppant, approximately 42 g and 167 g of PEDOT:PSS, respectively, were added to 500 g of proppant with 20 g of phenol-formaldehyde (Novolac) resin cross-linked with hexamine (13% hexamine based on phenol-formaldehyde (Novolac) resin) with and without adhesion promoters as mentioned above. A typical batch schedule is shown in Table III below:

TABLE III

Coating Schedule on Ceramics with Phenol-Formaldehyde Resin:

| Ingredient | Time of Addition |
|---|---|
| Substrate | 0 s |
| Phenol-Formaldehyde resin | 0 s |
| Adhesion Promoter | 7 s |
| Hexamine (cross-linker) | 30 s |
| Conductive Polymer | 1.5-2 min |
| End Cycle | 5-10 min |

Following the coating process, the coated proppant samples were inspected visually and by optical microscopy.

Example 7

Figure 19:
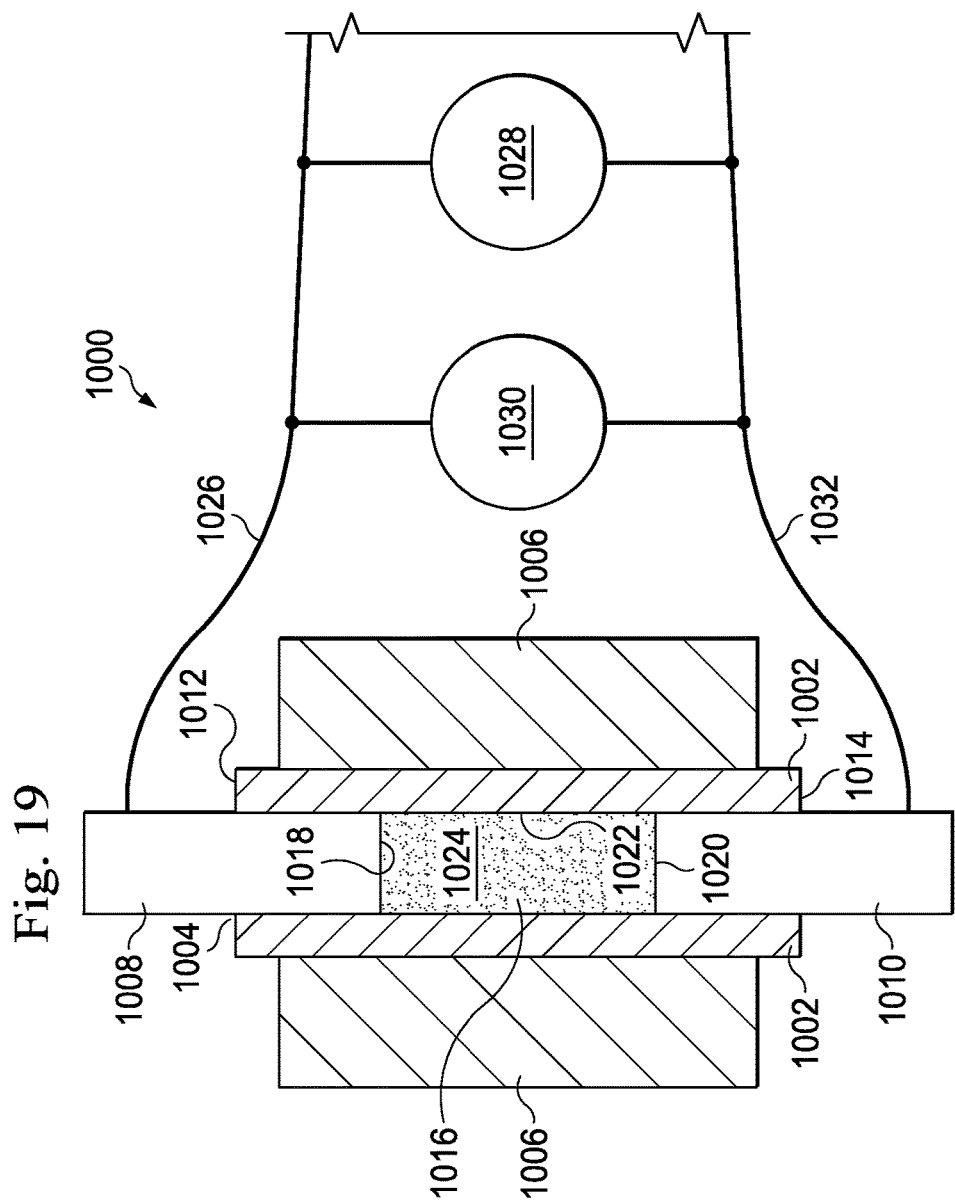
FIG. 19 is a schematic illustration of a test system for measuring proppant electrical resistance.

The electrical conductivity of various proppant samples prepared according to Examples 1-3, 6 and 7 as well as uncoated proppant samples was measured using the test device shown in FIG. 19. As shown in FIG. 19, the test system 1000 included an insulating boron nitride die 1002, having an inside diameter of 0.5 inches and an outside diameter of 1.0 inches, disposed in a bore 1004 in a steel die 1006 in which the bore 1004 had an inside diameter of 1.0 inches. Upper and lower steel plungers 1008 and 1010 having an outside diameter of 0.5 inches were inserted in the upper and lower ends 1012, 1014, respectively, of the insulating boron nitride die 1002 such that a chamber 1016 is formed between the leading end 1018 of the upper plunger 1008, the leading end 1020 of the lower plunger 1010 and the inner wall 1022 of the boron nitride sleeve 1002. Upper plunger 1008 was removed from the insulating boron nitride die 1002 and proppant was loaded into the chamber 1016 until the proppant bed 1024 reached a height of about 1 to 2 cm above the leading end 1020 of the lower plunger 1010. The upper plunger 1008 was then reinstalled in the insulating boron nitride die 1002 until the leading end 1018 of the upper plunger 1008 engaged the proppant 1024. A copper wire 1026 was connected to the upper plunger 1008 and one pole of each of a current source 1028 and a voltmeter 1030. A second copper wire 1032 was connected to the lower plunger 1010 and the other pole of each of the current source 1028 and the voltmeter 1030. The current source can be any suitable DC current source well-known to those of ordinary skill in the art such as a Keithley 237 High Voltage Source Measurement Unit in the DC current source mode and the voltmeter can be any suitable voltmeter well known to those of ordinary skill in the art such as a Fluke 175 True RMS Multimeter which may be used in the DC mV mode for certain samples and in the ohmmeter mode for higher resistance samples.

The current source was powered on and the resistance of the test system 1000 with the proppant bed 1024 in the chamber 1016 was then determined. The resistance of the proppant 1024 was then measured with the Multimeter as a function of pressure using the upper plunger 1008 and lower plunger 1010 both as electrodes and to apply pressure to the proppant bed 1024. Specifically, $R=V/I$—the resistance of the system with the plungers touching is subtracted from the values measured with the proppant bed 1024 in the chamber 1016 and the resistivity, $\rho=R*A/t$ where A is the area occupied by the proppant bed 1024 and t is the thickness of the proppant bed 1024 between the upper plunger 1008 and the lower plunger 1010.

The results were as follows:

Electrical measurements of base proppants without the addition of any conductive material were conducted at 100 V DC on samples that were 50 volume % proppant in wax that were pressed into discs nominally 1 inch in diameter and approximately 2 mm thick. Using these values to calculate the resistivity and using the measured resistivity for pure wax, the values below were extrapolated by plotting log (resistivity) vs. volume fraction proppant and extrapolating to a volume fraction of one:

CARBOPROP 40/70: $2 \times 10^{12}$ Ohm-cm
CARBOPROP 20/40: $0.6 \times 10^{12}$ Ohm-cm
CARBOHYDROPROP: $1.8 \times 10^{12}$ Ohm-cm
CARBOECONOPROP: $9 \times 10^{12}$ Ohm-cm It should be noted that the resistivities of the samples measured above are very high and not suitable for detection in the present invention.

Electrical measurements of base proppants with coatings of aluminum in thicknesses of 100 nm and 500 nm prepared according to Example 1, and base proppants with coatings of 0.1% or 0.4% of poly(3,4-ethylenedioxythiophene) (PEDOT), with or without amino silane were conducted. The results are shown in Table IV below and FIG. 20.

TABLE IV

| Description | Resistivity (ohm-cm) | | | | |
| --- | --- | --- | --- | --- | --- |
| | 0 psi | 1500 psi | 2500 psi | 3000 psi | 5000 psi |
| Base Material-no coating/no modification | $9 \times 10^{12}$ | Not measured | Not measured | Not measured | Not measured |
| CL w/0.1% PEDOT | Not measured | 1000 to 5000 | 1000 to 5000 | 1000 to 5000 | 1000 to 5000 |
| CL w/0.1% PEDOT/amino silane | Not measured | 10,000 to 100,000 | 10,000 to 50,000 | 10,000 to 25,000 | Not measured |
| CL w/0.4% PEDOT | Not measured | 1000 to 5000 | 1000 to 5000 | 1000 to 5000 | 1000 to 5000 |
| CL w/0.4% PEDOT/amino silane | Not measured | 5000 to 10,000 | ~5000 | ~5000 | Not measured |
| CL w/100 nm Al coat | Not measured | 1,000 | 1,000 | 1,000 | Not measured |
| CL w/500 nm Al coat | 5 to 10 | ~0 | 0.1-0 | 0.1-0 | 0.1-0 |
| CL w/500 nm Al coat | Not measured | ~0 | 0.27 | Not measured | Not measured |
| HP w/100 nm Al coat | Not measured | >1,000,000 | >1,000,000 | >1,000,000 | >1,000,000 |
| HP w/500 nm Al coat | Not measured | 0-1 | 0.30 | 0-1 | 0-1 |

Figure 20:
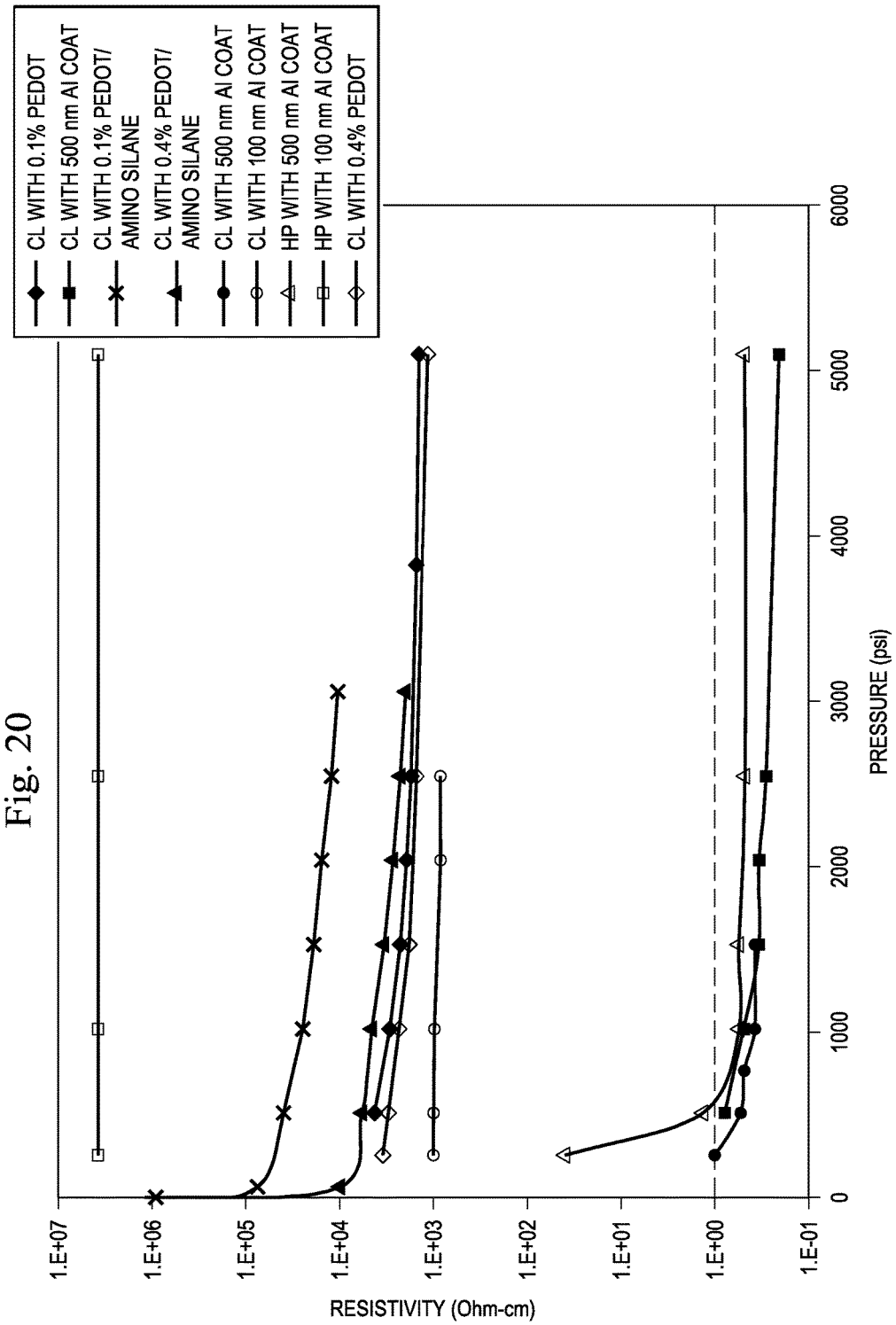
FIG. 20 is a graph of resistivity (Ohm-cm) vs. closure pressure (psi) for various proppant samples.

As can be seen from FIG. 20, the best results in terms of conductivity were obtained with CARBOLITE 20/40 and CARBOHYDROPROP 40/80 having a 500 nm thick coating of aluminum.

Electrical measurements of mixtures of base proppants with varying percentages of such base proppants with coatings of aluminum in thicknesses of 500 nm prepared according to Example 1 were conducted. The results are shown in Tables V and VI below and FIGS. 21-22.

Table V shows data for mixtures of CARBOLITE 20/40 with a 500 nm coating of aluminum and CARBOLITE 20/40 with no added conductive material. For each sample shown in Table V, 3 g. of the sample material was placed in the 0.5 inch die to provide an area of 0.196 square inches. The applied current for each test was 5 mA and the tests were conducted at room temperature.

TABLE V

| Load (lbs) | Pressure (psi) | Voltage (mV) | Resistance (Ohm) | Resistivity (Ohm-cm) |
|---|---|---|---|---|
| 80% 500 nm Al-coated CARBOLITE with 20% CARBOLITE 20/40 ||||||
| 100 | 509 | 6.1 | 1.22 | 1.107 |
| 200 | 1019 | 5.6 | 1.12 | 1.016 |
| 300 | 1528 | 5.0 | 1.00 | 0.907 |
| 400 | 2037 | 4.7 | 0.94 | 0.853 |
| 500 | 2546 | 4.5 | 0.90 | 0.817 |
| 60% 500 nm Al-coated CARBOLITE with 40% CARBOLITE 20/40 ||||||
| 200 | 1019 | 20.0 | 4.00 | 3.630 |
| 300 | 1528 | 17.8 | 3.56 | 3.230 |
| 400 | 2037 | 17.0 | 3.40 | 3.085 |
| 500 | 2546 | 16.1 | 3.22 | 2.922 |
| 600 | 3056 | 15.8 | 3.16 | 2.867 |
| 40% 500 nm Al-coated CARBOLITE with 60% CARBOLITE 20/40 ||||||
| 100 | 509 | 253 | 50.60 | 46.516 |
| 200 | 1019 | 223 | 44.60 | 41.000 |
| 300 | 1528 | 218 | 43.60 | 40.080 |
| 400 | 2037 | 226 | 45.20 | 41.552 |
| 500 | 2546 | 221 | 44.20 | 40.632 |

Table VI shows data for mixtures of HYDROPROP 40/80 with a 500 nm coating of aluminum and HYDROPROP 40/80 with no added conductive material. For each sample shown in Table VI, 3 g. of the sample material was placed in the 0.5 inch die to provide an area of 0.196 square inches. The applied current for each test was 5 mA and the tests were conducted at room temperature.

TABLE VI

| Load (lbs) | Pressure (psi) | Voltage (mV) | Resistance (Ohm) | Resistivity (Ohm-cm) |
|---|---|---|---|---|
| 80% 500 nm Al-coated HYDROPROP 40/80 with 20% HYDROPROP 40/80 ||||||
| 100 | 509 | 5.9 | 1.18 | 1.083 |
| 200 | 1019 | 5.3 | 1.06 | 0.973 |
| 300 | 1528 | 4.9 | 0.98 | 0.900 |
| 400 | 2037 | 4.6 | 0.92 | 0.845 |
| 500 | 2546 | 4.4 | 0.88 | 0.808 |
| 60% 500 nm Al-coated HYDROPROP 40/80 with 40% HYDROPROP 40/80 ||||||
| 200 | 1019 | 17.5 | 3.50 | 3.167 |
| 300 | 1528 | 15.6 | 3.12 | 2.823 |
| 400 | 2037 | 14.5 | 2.90 | 2.624 |
| 500 | 2546 | 13.8 | 2.76 | 2.497 |
| 40% 500 nm Al-coated HYDROPROP 40/80 with 60% HYDROPROP 40/80 ||||||
| 200 | 1019 | 550 | 110.00 | 99.532 |
| 300 | 1528 | 470 | 94.00 | 85.055 |
| 400 | 2037 | 406 | 81.20 | 73.473 |
| 500 | 2546 | 397 | 79.40 | 71.844 |

Figure 21:
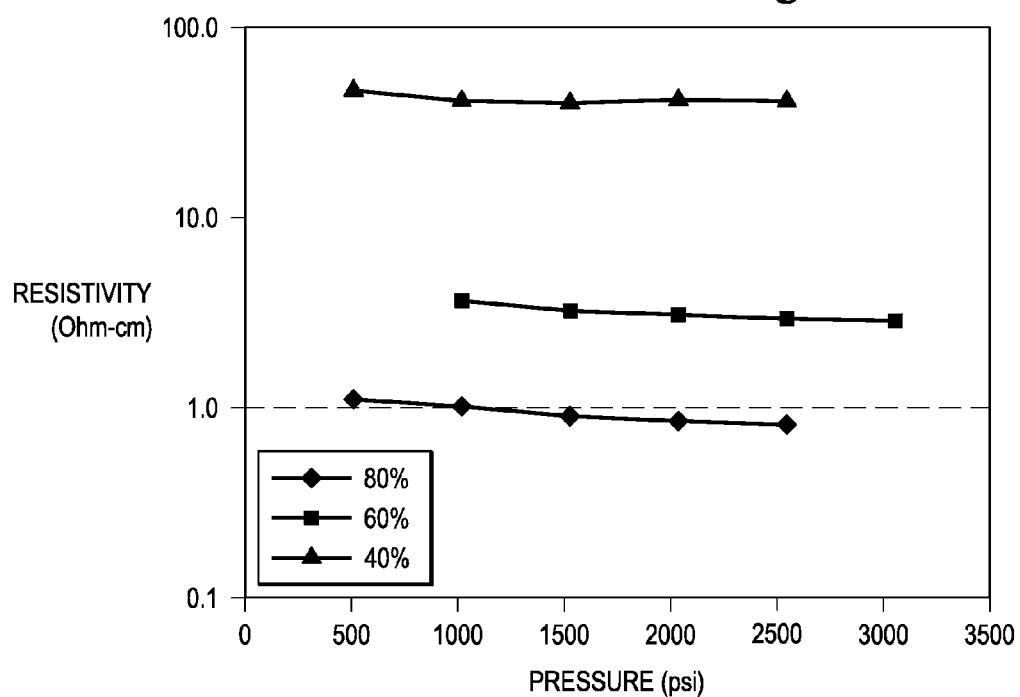
FIG. 21 is a graph of resistivity (Ohm-cm) vs. closure pressure (psi) for mixtures of CARBOLITE 20/40 coated with aluminum and standard ECONOPROP 20/40 samples.
Figure 22:
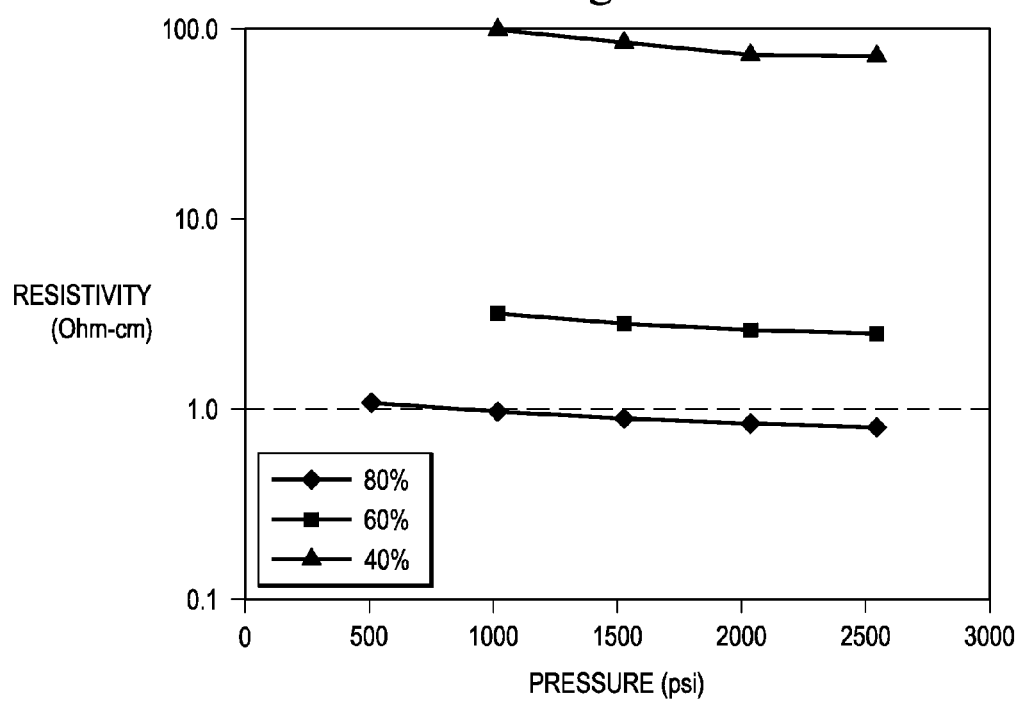
FIG. 22 is a graph of resistivity (Ohm-cm) vs. closure pressure (psi) for mixtures of HYDROPROP 40/80 coated with aluminum and standard HYDROPROP 40/80 samples.

As can be seen from TABLES V and VI as well as FIGS. 21-22, the resistivity of the proppant packs, regardless of the relative amounts of coated or un-coated proppant, tends to decrease with increasing closure pressure. In addition, as the relative amount of uncoated proppant increases and the relative amount of coated proppant decreases, the resistivity of the proppant packs increases dramatically. Lastly, the lowest resistivity is achieved with 100% Al-coated proppant. No mixture of coated and uncoated proppant results in a resistivity measurement less than 100% Al-coated proppant.

Electrical measurements of proppants with coatings of nickel and copper were also conducted. The results are shown in TABLE VII below and FIG. 23. TABLE VII shows data for CARBOLITE 20/40 with a coating of nickel and CARBOLITE 20/40 with a coating of copper. For each sample shown in TABLE VII, the sample material was placed in the 0.5 inch die. The applied voltage for each test was 0.005V.

TABLE VII

| Load (lbs) | Pressure (psi) | Current (mA) | Resistance (Ohm) | Conductivity (Seimens/m) |
|---|---|---|---|---|
| Ni-coated CARBOLITE 20/40 ||||||
| 100 | 509 | 5.9 | 0.85 | 766.04 |
| 200 | 1019 | 6.1 | 0.75 | 966.44 |
| 300 | 1528 | 7.4 | 0.68 | 1182.18 |
| 400 | 2037 | 7.8 | 0.64 | 1327.66 |
| 500 | 2546 | 8.1 | 0.62 | 1449.91 |
| 800 | 4074 | 8.6 | 0.58 | 1684.37 |
| 1000 | 5093 | 8.9 | 0.56 | 1847.51 |
| Cu-coated CARBOLITE 20/40 ||||||
| 100 | 509 | 9.3 | 0.54 | 2098.05 |
| 200 | 1019 | 10.6 | 0.47 | 3330.51 |
| 300 | 1528 | 10.9 | 0.46 | 3766.11 |
| 400 | 2037 | 11.1 | 0.45 | 4108.19 |
| 500 | 2546 | 8.1 | 0.45 | 4298.15 |
| 800 | 4074 | 11.2 | 0.43 | 4962.66 |
| 1000 | 5093 | 11.5 | 0.43 | 5222.51 |

Figure 24:
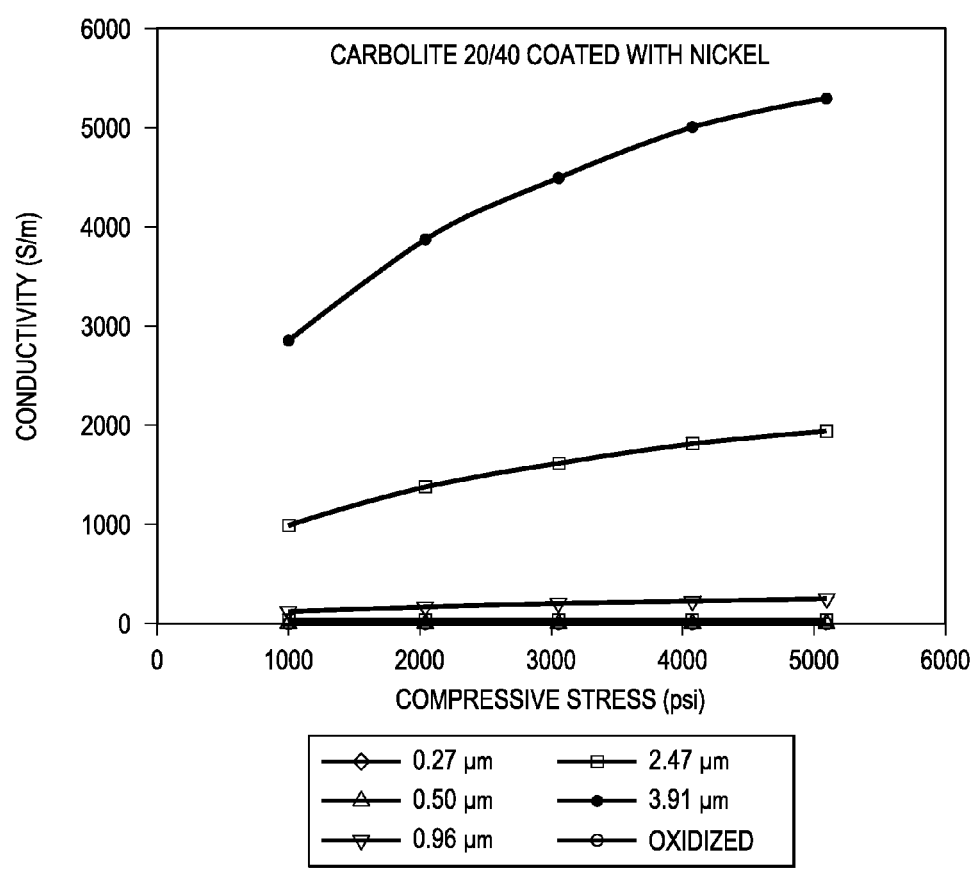
FIG. 24 is a graph of conductivity (Siemens/m) vs. pressure (psi) for CARBOLITE 20/40 samples coated with varied thicknesses of nickel.

Electrical measurements of proppants having coatings of varied thicknesses of nickel were also conducted. The results are shown in TABLE VIII below and FIG. 24. TABLE VIII shows data for CARBOLITE 20/40 with a coating of nickel at thicknesses of 0.27 microns, 0.50 microns, 0.96 microns, 2.47 microns, and 3.91 microns. The sample "9006" in FIG. 24 became oxidized and because of this was not sufficiently conductive for purposes of this example. For each sample shown in TABLE VIII, the sample material was placed in the 0.5 inch die. The applied voltage for each test was 0.01V.

TABLE VIII

| Load (lbs) | Pressure (psi) | Current (mA) | Resistance (Ohm) | Conductivity (Seimens/m) |
|---|---|---|---|---|
| CARBOLITE 20/40 with 0.27 micron thick Ni-coating ||||||
| 200 | 1019 | 1.0E−07 | 1.00E+08 | 3.738E−06 |
| 400 | 2037 | 0.004 | 2.56E+03 | 0.146 |
| 600 | 3056 | 0.021 | 4.76E+02 | 0.786 |
| 800 | 4074 | 0.040 | 2.50E+02 | 1.498 |
| 1000 | 5093 | 0.055 | 1.82E+02 | 2.060 |
| CARBOLITE 20/40 with 0.50 micron thick Ni-coating ||||||
| 200 | 1019 | 0.06 | 1.82E+02 | 2.060 |
| 400 | 2037 | 0.23 | 4.35E+01 | 8.674 |
| 600 | 3056 | 0.39 | 2.56E+01 | 14.800 |
| 800 | 4074 | 0.52 | 1.92E+01 | 19.833 |
| 1000 | 5093 | 0.61 | 1.64E+01 | 23.347 |
| CARBOLITE 20/40 with 0.96 micron thick Ni-coating ||||||
| 200 | 1019 | 2.8 | 3.57 | 117.198 |
| 400 | 2037 | 3.9 | 2.56 | 171.292 |
| 600 | 3056 | 4.5 | 2.22 | 203.110 |
| 800 | 4074 | 4.9 | 2.04 | 225.317 |
| 1000 | 5093 | 5.3 | 1.89 | 248.375 |
| CARBOLITE 20/40 with 2.47 micron thick Ni-coating ||||||
| 200 | 1019 | 13.2 | 7.58E−01 | 994.508 |
| 400 | 2037 | 15.3 | 6.54E−01 | 1374.809 |

TABLE VIII-continued

| Load (lbs) | Pressure (psi) | Current (mA) | Resistance (Ohm) | Conductivity (Seimens/m) |
|---|---|---|---|---|
| 600 | 3056 | 16.3 | 6.13E−01 | 1612.612 |
| 800 | 4074 | 17.0 | 5.88E−01 | 1809.833 |
| 1000 | 5093 | 17.4 | 5.75E−01 | 1936.619 |
| CARBOLITE 20/40 with 3.91 micron thick Ni-coating | | | | |
| 200 | 1019 | 19.5 | 0.513 | 2850.607 |
| 400 | 2037 | 20.9 | 0.478 | 3862.317 |
| 600 | 3056 | 21.5 | 0.465 | 4480.414 |
| 800 | 4074 | 21.9 | 0.457 | 4988.307 |
| 1000 | 5093 | 22.1 | 0.452 | 5279.416 |

Figure 25:
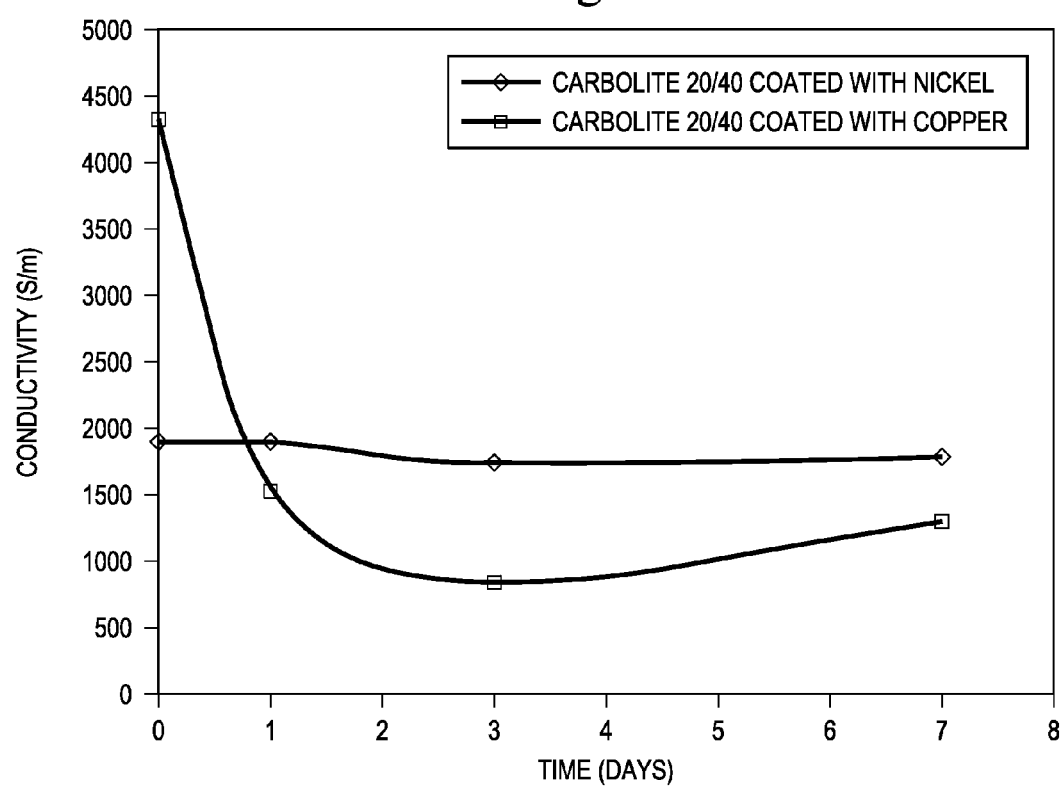
FIG. 25 is a graph of conductivity (Siemens/m) vs. exposure time to frac fluid at a fixed Closure Pressure (psi) for CARBOLITE 20/40 samples coated with nickel and copper.

Electrical measurements of proppants with coatings of nickel and copper were also conducted as a function of KCl exposure. The results are shown in TABLE IX below and FIG. 25. TABLE IX shows data for CARBOLITE 20/40 with a coating of nickel and CARBOLITE 20/40 with a coating of copper. Each sample was exposed to a 2% KCl solution having a pH of 10 and a temperature of 120° C. for 0 day, 1 day, 3 days, and 7 days. For each sample shown in TABLE IX, the sample material was placed in the 0.5 inch die under a pressure of 3560 psi.

TABLE IX

| Time (days) | Ni-coated CARBOLITE Conductivity (Seimens/m) | Cu-coated CARBOLITE Conductivity (Seimens/m) |
|---|---|---|
| 0 | 1880 | 4314 |
| 1 | 1874 | 1536 |
| 3 | 1718 | 812 |
| 7 | 1763 | 1272 |

Figure 23:
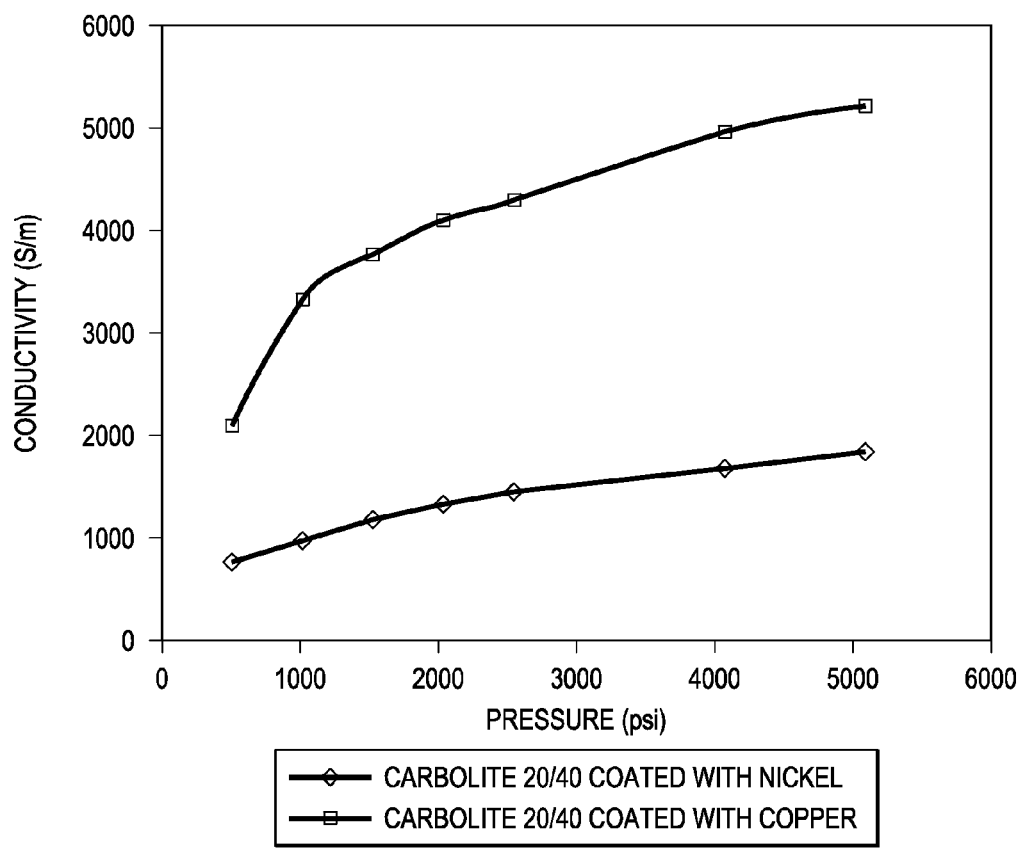
FIG. 23 is a graph of conductivity (Siemens/m) vs. pressure (psi) for CARBOLITE 20/40 coated with nickel and CARBOLITE 20/40 coated with copper.

As can be seen from TABLE VII and FIG. 23, the copper coating provides a greater conductivity than the conductivity provided by the nickel. As can be seen from TABLE VIII and FIG. 24, increasing thicknesses of the nickel coating provides increased conductivity. And as can be seen from TABLES VII and VIII as well as FIGS. 23 and 24, the conductivity of the proppant packs, regardless of the relative amounts of coated or un-coated proppant, tends to increase with increasing closure pressure. Lastly, exposure to the KCl solution greatly reduces the conductivity of copper coated proppant, but has little noticeable effect on the conductivity of the nickel coated proppant.

In an exemplary method of fracturing a subterranean formation, a hydraulic fluid is injected into the formation at a rate and pressure sufficient to open a fracture therein, and a fluid containing sintered, substantially round and spherical particles prepared in accordance with the method(s) described herein and having one or more of the properties as described herein is injected into the fracture to prop the fracture in an open condition.

Exemplary embodiments of the present disclosure further relate to any one or more of the following paragraphs:

1. A method of manufacturing electrically-conductive proppant particles, comprising: preparing a slurry comprising water, a binder, and a raw material having an alumina content; atomizing the slurry into droplets; coating seeds comprising alumina with the droplets to form a plurality of green pellets; contacting the plurality of green pellets with an activation solution comprising at least one catalytically active material to provide activated green pellets comprising the at least one catalytically active material; sintering the activated green pellets to provide a plurality of proppant particles, wherein the sintering oxidizes the catalytically active material; and contacting the plurality of proppant particles with a plating solution comprising one or more electrically-conductive material to provide electrically-conductive proppant particles.

2. The method according to paragraph 1, wherein the electrically conductive proppant particles comprise a substantially uniform coating of the electrically-conductive material having a thickness of at least 10 nm formed on the outer surface of each said proppant particles.

3. The method according to paragraphs 1 or 2, wherein the at least one catalytically active material is selected from the group consisting of iron, tin, palladium, and silver and any combination thereof.

4. The method according to paragraph 3, wherein the contacting of the plurality of green pellets with the activation solution comprises spraying the green pellets with the activation solution, wherein the activation solution is an aqueous solution.

5. The method according to any one of paragraphs 1 to 4, wherein the plurality of green pellets are contacted with an alkaline solution having a pH greater than 8 prior to contacting the activation solution.

6. The method according to any one of paragraphs 1 to 5, wherein the electrically-conductive material comprises a metal selected from the group consisting of aluminum, tin, zinc, copper, silver, nickel, gold, platinum, palladium and rhodium.

7. The method according to paragraph 6, wherein the plating solution is an alkaline solution comprising nickel.

8. A method of manufacturing electrically-conductive proppant particles, comprising: preparing a slurry comprising water, a binder, and a raw material having an alumina content; atomizing the slurry into droplets; coating seeds comprising alumina with the droplets to form a plurality of green pellets; sintering the green pellets to provide a plurality of proppant particles; contacting the plurality of proppant particles with an activation solution comprising at least one catalytically active material to provide activated proppant particles comprising the at least one catalytically active material; and contacting the plurality of activated proppant particles with a plating solution comprising one or more electrically-conductive material to provide electrically-conductive proppant particles.

9. The method according to paragraph 8, wherein the electrically conductive proppant particles comprise a substantially uniform coating of the electrically-conductive material having a thickness of at least 10 nm formed on the outer surface of each said proppant particles.

10. The method according to paragraphs 8 or 9, wherein the at least one catalytically active material is selected from the group consisting of iron, tin, palladium, and silver and any combination thereof.

11. The method according to paragraph 10, wherein the contacting of the plurality of proppant particles with the activation solution comprises spraying the green pellets with the activation solution, wherein the activation solution is an aqueous solution.

12. The method according to any one of paragraphs 8 to 11, wherein the plurality of green pellets are contacted with an alkaline solution having a pH greater than 8 prior to sintering.

13. The method according to any one of paragraphs 8 to 12, wherein the electrically-conductive material comprises a metal selected from the group consisting of aluminum, tin, zinc, copper, silver, nickel, gold, platinum, palladium and rhodium.

14. The method according to paragraph 13, wherein the plating solution is an alkaline solution comprising nickel.

15. A method of manufacturing proppant particles, comprising: providing a slurry of ceramic raw material, the slurry containing a reactant; flowing the slurry through a nozzle in a gas while vibrating the slurry to form droplets; receiving the droplets in a vessel containing a liquid having an upper surface in direct contact with the gas, the liquid containing a coagulation agent; reacting the reactant with the coagulation agent to cause coagulation of the reactant in the droplets; transferring the droplets from the liquid; drying the droplets to form green pellets; contacting the green pellets with an activation solution comprising at least one catalytically active material to provide activated green pellets comprising the at least one catalytically active material; and sintering the activated green pellets in a selected temperature range to form the proppant particles.

16. The method according to paragraph 15, further comprising contacting the proppant particles with a plating solution comprising one or more electrically-conductive material to provide electrically-conductive proppant particles.

17. The method according to paragraph 16, wherein the electrically conductive proppant particles comprise a substantially uniform coating of the electrically-conductive material having a thickness of at least 10 nm formed on the outer surface of each said proppant particles.

18. The method according to any one of paragraphs 15 to 17, wherein the reactant comprises polysaccharide, a polycarboxylic acid, or both.

19. The method according to any one of paragraphs 15 to 18, wherein the coagulation agent comprises one or more salts of calcium, magnesium, strontium, aluminum, or iron.

20. The method according to any one of paragraphs 15 to 19, wherein the slurry is vibrated as it flows from the nozzle by vibrating the nozzle and wherein the slurry flows from the nozzle at a rate of about 1 to about 15 kg/(mm$^2 \times$hr).

21. The method according to any one of paragraphs 15 to 20, wherein the ceramic raw material is selected from the group consisting of bauxite, kaolin, and alumina, and mixtures thereof.

22. The method according to any one of paragraphs 15 to 21, wherein the at least one catalytically active material is selected from the group consisting of iron, tin, palladium, and silver and any combination thereof.

23. The method according to paragraph 22, wherein the contacting of the plurality of green pellets with the activation solution comprises spraying the green pellets with the activation solution, wherein the activation solution is an aqueous solution.

24. The method according to any one of paragraphs 15 to 23, wherein the green pellets contact an alkaline solution having a pH greater than 8 prior to contacting the activation solution.

25. The method according to paragraph 16, wherein the electrically-conductive material comprises a metal selected from the group consisting of aluminum, tin, zinc, copper, silver, nickel, gold, platinum, palladium and rhodium.

26. The method according to paragraph 25, wherein the plating solution is an alkaline solution comprising nickel.

27. A method of manufacturing electrically-conductive proppant particles, comprising: providing a slurry of ceramic raw material, the slurry containing a reactant; providing an activation solution, the activation solution comprising at least one catalytically active material; flowing the slurry through a first nozzle in a gas while vibrating the slurry to form droplets; flowing a film of the activation solution through a second nozzle surrounding the first nozzle; contacting the film of activation solution with the droplets to form activated droplets; receiving the activated droplets in a vessel containing a liquid comprising a coagulation agent; reacting the reactant with the coagulation agent to cause coagulation of the reactant in the activated droplets; transferring the activated droplets from the liquid; drying the activated droplets to form activated green pellets; sintering the activated green pellets in a selected temperature range to form the proppant particles; and contacting the proppant particles with a plating solution comprising one or more electrically-conductive material to provide electrically-conductive proppant particles.

28. A method of manufacturing electrically-conductive proppant particles, comprising: providing a slurry of ceramic raw material, the slurry containing a reactant; flowing the slurry through a nozzle in a gas while vibrating the slurry to form droplets; receiving the droplets in a vessel containing a liquid having an upper surface in direct contact with the gas, the liquid containing a coagulation agent; reacting the reactant with the coagulation agent to cause coagulation of the reactant in the droplets; transferring the droplets from the liquid; drying the droplets to form green pellets; sintering the green pellets in a selected temperature range to form a plurality of proppant particles; contacting the plurality of proppant particles with an activation solution comprising at least one catalytically active material to provide activated proppant particles comprising the at least one catalytically active material; and contacting the plurality of activated proppant particles with a plating solution comprising one or more electrically-conductive material to provide electrically-conductive proppant particles.

29. The method according to paragraph 28, wherein the electrically conductive proppant particles comprise a substantially uniform coating of the electrically-conductive material having a thickness of at least 10 nm formed on the outer surface of each said proppant particles.

30. The method according to paragraphs 28 or 29, wherein the reactant comprises polysaccharide, a polycarboxylic acid, or both.

31. The method according to any one of paragraphs 28 to 30, wherein the coagulation agent comprises one or more salts of calcium, magnesium, strontium, aluminum, or iron.

32. The method according to any one of paragraphs 28 to 31, wherein the slurry is vibrated as it flows from the nozzle by vibrating the nozzle and wherein the slurry flows from the nozzle at a rate of about 1 to about 15 kg/(mm$^2 \times$hr).

33. The method according to any one of paragraphs 28 to 32, wherein the ceramic raw material is selected from the group consisting of bauxite, kaolin, and alumina, and mixtures thereof.

34. The method according to any one of paragraphs 28 to 33, wherein the at least one catalytically active material is selected from the group consisting of iron, tin, palladium, and silver and any combination thereof.

35. The method according to any one of paragraphs 28 to 34, wherein the contacting of the plurality of proppant particles with the activation solution comprises spraying the proppant particles with the activation solution, wherein the activation solution is an aqueous solution.

36. The method according to any one of paragraphs 28 to 35, wherein the plurality of green pellets are contacted with an alkaline solution having a pH greater than 8 prior to sintering.

37. The method according to any one of paragraphs 28 to 36, wherein the electrically-conductive material comprises a metal selected from the group consisting of aluminum, tin, zinc, copper, silver, nickel, gold, platinum, palladium and rhodium.

38. The method according to any one of paragraphs 28 to 37, wherein the plating solution is an alkaline solution comprising nickel.

39. A method of manufacturing electrically-conductive proppant particles, comprising: providing a slurry of ceramic raw material, the slurry containing a reactant; flowing the slurry through a nozzle in a gas while vibrating the slurry to form droplets; receiving the droplets in a vessel containing a liquid having an upper surface in direct contact with the gas, the liquid containing a coagulation agent, a reducing agent and electrically-conductive material; reducing electrically-conductive material on ceramic raw material in the slurry; reacting the reactant with the coagulation agent to cause coagulation of the reactant in the droplets; transferring the droplets from the liquid; drying the droplets to form green pellets containing electrically-conductive material; and sintering the green pellets in a selected temperature range to form a plurality of electrically-conductive proppant particles.

The foregoing description and embodiments are intended to illustrate the invention without limiting it thereby. It will be understood that various modifications can be made in the invention without departing from the spirit or scope thereof.

What is claimed is:

1. A method of manufacturing electrically-conductive proppant particles, comprising:
   preparing a slurry comprising water, a binder, and a raw material having an alumina content;
   atomizing the slurry into droplets;
   coating seeds comprising alumina with the droplets to form a plurality of green pellets;
   contacting the plurality of green pellets with an activation solution comprising at least one catalytically active material to provide activated green pellets comprising the at least one catalytically active material;
   sintering the activated green pellets to provide a plurality of proppant particles, wherein the sintering oxidizes the catalytically active material; and
   contacting the plurality of proppant particles with a plating solution comprising one or more electrically-conductive material to provide electrically-conductive proppant particles.

2. The method of claim 1, wherein the electrically conductive proppant particles comprise a coating of the electrically-conductive material having a thickness of at least 10 nm formed on the outer surface of each said proppant particles.

3. The method of claim 1, wherein the at least one catalytically active material comprises palladium.

4. The method of claim 3, wherein the contacting of the plurality of green pellets with the activation solution comprises spraying the green pellets with the activation solution, wherein the activation solution is an aqueous solution.

5. The method of claim 1, wherein the plurality of green pellets are contacted with an alkaline solution having a pH greater than 8 prior to contacting the activation solution.

6. The method of claim 1, wherein the electrically-conductive material comprises nickel.

7. The method of claim 6, wherein the plating solution is an alkaline solution comprising nickel.

8. The method of claim 1, wherein the electrically-conductive material comprises nickel and the electrically conductive proppant particles comprise a coating of the electrically-conductive material having a thickness of from about 10 nm to about 1,500 nm formed on the outer surface of each said proppant particles.

9. The method of claim 8, wherein the electrically-conductive material has a thickness of from about 10 nm to about 700 nm.

10. The method of claim 1, wherein the activation solution is substantially free of reducing agent.

11. A method of manufacturing electrically-conductive proppant particles, comprising:
    preparing a slurry comprising water, a binder, and a raw material having an alumina content;
    atomizing the slurry into droplets;
    coating seeds comprising alumina with the droplets to form a plurality of green pellets;
    sintering the green pellets to provide a plurality of proppant particles;
    contacting the plurality of proppant particles with an activation solution comprising at least one catalytically active material and drying the activation solution on the particles to provide activated proppant particles comprising the at least one catalytically active material; and
    contacting the plurality of activated proppant particles with a plating solution comprising one or more electrically-conductive material to provide electrically-conductive proppant particles.

12. The method of claim 11, wherein the electrically conductive proppant particles comprise a coating of the electrically-conductive material having a thickness of at least 10 nm formed on the outer surface of each said proppant particles.

13. The method of claim 11, wherein the at least one catalytically active material comprises palladium.

14. The method of claim 13, wherein the contacting of the plurality of proppant particles with the activation solution comprises spraying the green pellets with the activation solution, wherein the activation solution is an aqueous solution.

15. The method of claim 11, wherein the plurality of green pellets are contacted with an alkaline solution having a pH greater than 8 prior to sintering.

16. The method of claim 11, wherein the electrically-conductive material comprises nickel.

17. The method of claim 16, wherein the plating solution is an alkaline solution comprising nickel.

18. The method of claim 11, wherein contacting the plurality of proppant particles with an activation solution is performed while drying the activation solution.

19. The method of claim 11, wherein the activation solution is substantially free of reducing agent.

* * * * *